(12) United States Patent
Gehrmann et al.

(10) Patent No.: US 11,807,916 B2
(45) Date of Patent: Nov. 7, 2023

(54) POWDER CONSISTING OF A NICKEL-COBALT ALLOY, AND METHOD FOR PRODUCING THE POWDER

(71) Applicant: VDM Metals International GmbH, Werdohl (DE)

(72) Inventors: Bodo Gehrmann, Plettenberg (DE); Tatiana Hentrich, Werdohl (DE); Christina Schmidt, Bochum (DE); Katrin Brunnert, Iserlohn (DE)

(73) Assignee: VDM METALS INTERNATIONAL GMBH, Werdohl (DE)

( * ) Notice: Subject to any disclaimer, the term of this patent is extended or adjusted under 35 U.S.C. 154(b) by 125 days.

(21) Appl. No.: 17/606,820

(22) PCT Filed: Jul. 1, 2020

(86) PCT No.: PCT/DE2020/100577
§ 371 (c)(1),
(2) Date: Oct. 27, 2021

(87) PCT Pub. No.: WO2021/004581
PCT Pub. Date: Jan. 14, 2021

(65) Prior Publication Data
US 2022/0243306 A1   Aug. 4, 2022

(30) Foreign Application Priority Data

Jul. 5, 2019   (DE) ..................... 10 2019 118 224.7
Jun. 26, 2020   (DE) ..................... 10 2020 116 868.3

(51) Int. Cl.
| | |
|---|---|
| B22F 1/05 | (2022.01) |
| C22C 19/05 | (2006.01) |
| B33Y 70/00 | (2020.01) |
| B22F 9/08 | (2006.01) |
| B22F 1/065 | (2022.01) |

(52) U.S. Cl.
CPC ................ C22C 19/05 (2013.01); B22F 1/05 (2022.01); B22F 1/065 (2022.01); B22F 9/082 (2013.01); B33Y 70/00 (2014.12); C22C 19/056 (2013.01); *B22F 2009/0844* (2013.01); *B22F 2301/15* (2013.01); *B22F 2304/10* (2013.01)

(58) Field of Classification Search
CPC ........... B22F 1/05; B22F 1/065; C22C 19/056
See application file for complete search history.

(56) References Cited

U.S. PATENT DOCUMENTS

| | | | |
|---|---|---|---|
| 6,562,157 B2 | 5/2003 | Nonomura et al. | |
| 8,147,749 B2 | 4/2012 | Reynolds | |
| 9,238,854 B2 | 1/2016 | Kwon et al. | |
| 11,193,186 B2 | 12/2021 | Kiese et al. | |
| 11,306,380 B2 | 4/2022 | Gehrmann et al. | |
| 2008/0166258 A1 | 7/2008 | Tanimoto et al. | |
| 2009/0123690 A1 | 5/2009 | Scholl et al. | |
| 2009/0277301 A1 | 11/2009 | Scholl et al. | |
| 2010/0303666 A1 | 12/2010 | Bain et al. | |
| 2013/0228302 A1 | 9/2013 | Rickenbacher et al. | |
| 2015/0354031 A1 | 10/2015 | Gehrmann et al. | |
| 2018/0298470 A1 | 10/2018 | Suzuki et al. | |
| 2019/0040501 A1 | 2/2019 | Gehrmann et al. | |

FOREIGN PATENT DOCUMENTS

| | | |
|---|---|---|
| CA | 937426 A | 11/1973 |
| CA | 945784 A | 4/1974 |
| CA | 1253363 A | 5/1989 |
| CA | 2704874 A1 | 11/2010 |
| CA | 2901259 A1 | 8/2014 |
| CA | 2874304 C | 8/2017 |
| CN | 1840719 A | 10/2006 |
| CN | 104561662 A | 4/2015 |
| CN | 106735273 A | 5/2017 |
| CN | 107904448 A | 4/2018 |
| CN | 108115136 A | 6/2018 |
| CN | 108165830 A | 6/2018 |
| CN | 108543950 A | 9/2018 |
| DE | 2108973 A | 9/1971 |
| DE | 2108978 A | 9/1971 |
| DE | 699 08 134 T2 | 1/2004 |
| DE | 601 00 884 T2 | 7/2004 |

(Continued)

OTHER PUBLICATIONS

English translation of the International Preliminary Report on Patentability and Written Opinion of the International Searching Authority in PCT/DE2020/100577, dated Jan. 20, 2022.

(Continued)

*Primary Examiner* — Jessee R Roe
(74) *Attorney, Agent, or Firm* — Collard & Roe, P.C.

(57) ABSTRACT

Nickel-cobalt alloy for powder, wherein the contents (in wt %) are defined as follows:
C>0-max. 0.1%
S max. 0.015%
Cr 13-23%
Ni the rest (>30%)
Mn max. 1.0%
Si max. 1.0%
Mo 1-6%
Ti>0-3%
Nb+Ta 3-8%
Cu max. 0.5%
Fe>0-max. 10%
Al>0-<4.0%
V up to 4%
Zr>0-max. 0.1%
Co>12-<35%
W up to 4%
Hf up to 3.0%
O max. 0.1%
N>0-max. 0.1%
Mg>0-max. 0.01%
B>0-max. 0.02%
P>0-max. 0.03%
Ar 0-max. 0.08%
Se max. 0.0005%

(Continued)

Bi max. 0.00005%
Pb max. 0.002%

16 Claims, 6 Drawing Sheets

(56) References Cited

FOREIGN PATENT DOCUMENTS

| DE | 10 2015 016 729 A1 | 6/2017 | |
|---|---|---|---|
| EP | 2 314 725 A1 | 4/2011 | |
| EP | 2 949 768 A1 | 12/2015 | |
| GB | 813948 A | 5/1959 | |
| WO | 2006/072586 A2 | 7/2006 | |
| WO | 2008/006801 A1 | 1/2008 | |
| WO | 2012/047352 A2 | 4/2012 | |
| WO | 2014/124626 A1 | 8/2014 | |
| WO | WO-2014124626 A1 * | 8/2014 | ......... B23K 35/3033 |
| WO | 2019/020145 A1 | 1/2019 | |
| WO | 2019/110050 A1 | 6/2019 | |

OTHER PUBLICATIONS

R. A. Ricks, A. J. Porter, R. C. Ecob, The Growth of y' Precipitates in Nickel-Base Superalloys; Acta Metall., 31, 43-53 (1983).

L. A. Al-Juboori, T. Niendorf, F. Brenne; On the Tensile Properties of Inconel 718 Fabricated by EBM for As-Built and Heat-Treated Components; Metallurgical and Materials Transactions B, vol. 49B, 2018.

M. M. Attallah et al. "Additive manufacturing of Ni-based superalloys: The outstanding issues", MRS Bull., vol. 41, No. 10, pp. 758-764, 2016.

Use of multi-focus technology in laser and electron beam welding to influencmelt pool dynamics using the example of precipitation-curing nickel-based superalloys (FokuWob), DVS Forschungsvereinigung, vol. 229, downloaded Feb. 4, 2022, 2 pages (Abstract).

International Search Report in PCT/DE2020/100577, dated Oct. 1, 2020.

G. Cam and M. Kocak, "Progress in joining of advanced materials", International Materials Reviews, 1998, vol. 43, No. 1, 45 pages.

N.C. Sekhar and R. C. Reed, "Power beam welding of thick section nickel base superalloys", Science and Technology of Welding and Joining, 2002, vol. 7, No. 2, pp. 77-87.

* cited by examiner

[Aluminium % bv = Aluminum % by weight
Titanium % bv = Titanium % by weight
schwierig zu schweissen = difficult to weld
schweissbar = weldable]

[Leg. = Alloy]

[Chg. = Batch]

[Chg. = Batch]

POWDER CONSISTING OF A NICKEL-COBALT ALLOY, AND METHOD FOR PRODUCING THE POWDER

CROSS REFERENCE TO RELATED APPLICATIONS

This application is the National Stage of PCT/DE2020/100577 filed on Jul. 1, 2020, which claims priority under 35 U.S.C. § 119 of German Application Nos. 10 2019 118 224.7 filed on Jul. 5, 2019 and 10 2020 116 868.3 filed on Jun. 26, 2020, the disclosures of which are incorporated by reference. The international application under PCT article 21(2) was not published in English.

BACKGROUND OF THE INVENTION

1. Field of the Invention

The invention relates to a chemical composition for powder of a nickel-cobalt alloy and its modification for increased high-temperature properties such as strength, oxidation resistance at higher application temperatures with simultaneously good processability.

2. Description of the Related Art

On the basis of their excellent mechanical strength (by virtue of solid-solution strengthening and precipitation hardening) in combination with oxidation and corrosion resistance due to Cr oxide layer, nickel and nickel-cobalt alloys-Alloy 718, Waspaloy, Udimet 720, Alloy 939, Alloy 738LC—are used extensively at higher temperatures up to approximately 900° C. (depending on material). These alloys have been developed and constantly optimized for the processing by means of casting and forging or only casting and the solidification conditions existing there.

The greatly predominating precipitation-hardening effect in nickel and nickel-cobalt alloys is based on the γ' phase (gamma' phase) with nominal stoichiometry of $Ni_3Al$ and the $L1_2$ lattice structure, which due to slight mismatch does not need any preferential sites, and it precipitates homogeneously in the grains. Due to diverse substitution possibilities, Ni and Al atoms in the materials are replaced with corresponding alloy contents by Co, Ti, Ta and Nb. With the increase of the contents of Al, Ti, Ta, Nb, etc., the solvus temperature and the volume fraction of the γ' phase increase; moreover, the precipitation kinetics are normally increased, and so the precipitation of the γ' phase is unavoidable in the high γ' (gamma') containing alloys such as alloy 939 or 738LC even during rapid cooling.

In generative fabrication methods, not only the chemical composition of the alloy but also the precipitation kinetics of the γ' phase play a large role, since the danger of crack formation exists during processing on the basis of segregation effects and due to additional stresses caused by precipitation of the γ' phase. This generally makes the welding of γ'-containing nickel and nickel-cobalt alloys difficult.

The strongly segregating elements such as B, Zr, Si and Mn reduce the weldability of nickel and nickel-cobalt alloys. B and Zr are used for the improvement of the high-temperature properties. Si and Mn are used for the deoxidation of the melt. Moreover, the processing capability during generative fabrication methods is impaired by the minor elements such as S, O, N, P and Pb.

DE 10 2015 016 729 A1 discloses a method for the manufacture of metallic semifinished products from an alloy having more than 50% nickel, containing the following process steps:
- an electrode is generated by VIM,
- for reduction of stresses and for overaging, the electrode is subjected in a furnace to a heat treatment in the temperature range between 400 and 1250° C. for a period of 10 to 336 hours,
- in a manner depending on dimensions, especially depending on diameter, the electrode is cooled in air or in the furnace to a temperature between room temperature and lower than 1250° C., especially lower than 900° C.,
- the cooled electrode is then remelted by VAR at a remelting rate of 3.0 to 10 kg/minute to obtain a VAR ingot,
- the VAR ingot is heat-treated in a furnace in the temperature range between 400 and 1250° C. for a period of 10 to 336 hours,
- in a manner depending on dimensions, especially depending on diameter, the VAR ingot is cooled in air or in the furnace to a temperature between room temperature and lower than 1250° C., especially lower than 900° C.,
- the VAR ingot is remelted once again at a remelting rate of 3.0 to 10 kg/minute,
- the remelted VAR ingot is subjected to a heat treatment in the temperature range between 400 and 1250° C. for a period of 10 to 336 hours,
- the VAR ingot is then brought by hot and/or cold working to the desired product shape and dimension.

EP 2949768 A1 discloses the adapted composition of the alloy named Alloy 738LC with a γ' volume fraction between 60 and 70% for the manufacture of nearly crack-free structural parts by reduction of strongly segregating elements. The following formulas are used for this purpose: C/B=10-32, C/Hf>2, C/Zr>8, C/Si>1.

CA 2704874 A1 discloses a nickel-base alloy and components formed from it with the example entitled "Components manufactured by powder metallurgy for the application in the gas turbine", which is characterized by improved high-temperature life including creep behavior and creep crack-growth behavior, consisting of (in wt %) Co 16.0-30.0%, Cr 11.5-15.0%, Ta 4.0-6.0%, Al 2.0-4.0%, Ti 1.5-6.0%, W up to 5.0%, Mo 1.0-7.0%, Nb up to 3.5%, Hf up to 1.0%, C 0.02-0.20%, B 0.01-0.05%, Zr 0.02-0.10%, Ni the rest, wherein the Ti:Al ratio is between 0.5 and 2.0.

CA 1253363 discloses a nickel-base alloy with the γ' volume fraction between 42% and 48%, consisting of (in wt %) Co 10.0-14.0%, Cr 14.0-18.0%, Ta up to 3.0%, Al 2.0-3.0%, Ti 2.0-3.0%, W 3.0-5.0%, Mo 3.0-5.0%, Nb 2.0-3.0%, Hf up to 50 ppm, C up to 0.1%, B 0.01-0.05%, Zr 0.02-0.08%, S up to 50 ppm, Mg up to 50 ppm, Ni the rest.

US 2008/0166258 A1 discloses a nickel-base alloy for the manufacture of heat-resisting springs of wire, consisting of (in wt %) Co 5.0-18.0%, Cr 13.0-25.0%, Al 0.1-3.0%, Ti 0.5-4.00, W 0.15-2.5%, Mo 1.5-7.0%, Nb 0.3-6.0%, Cu 0.03-2.0%, Fe up to 5.0%, C up to 0.1%, P up to 0.01%, B 0.001-0.02%, Zr 0.01-0.3%, S up to 0.01%, N up to 0.1%, Mn up to 1.5%, Si up to 1.0%, Mg up to 0.05%, Ca up to 0.05%, 0 up to 0.1%, H up to 0.05%, Ni the rest.

CA 2874304 C discloses a nickel-base alloy with improved creep strength and resistance to reheating cracks, consisting of (in wt %) Co 5.0-25.0%, Cr 15.0-28.0%, Ta up to 8.0%, Al 0.2-2.0%, Ti 0.2-3.0%, W up to 15.0%, Mo 3.0-15.0%, Nb up to 3.0%, Fe up to 15.0%, Re up to 8.0%, C 0.001-0.15%, Hf up to 1.0%, B 0.0005-0.01%, Zr up to 2.0%, Y up to 0.5%, La up to 0.5%, Ce up to 0.5%, Nd up to 0.5%, S up to 0.01%, N up to 0.03%, Mn 0.01-3.0%, Si 0.01-2.0%, Mg up to 0.05%, Ca up to 0.05%, Ni the rest.

GB 813948 A discloses a nickel-base sintered alloy, consisting of (in wt %) Co up to 55.0%, Cr 4.0-30.0%, Al 0.3-8.0%, Ti 0.5-8.0%, W up to 5.0%, Mo up to 20.0%, Nb up to 5.0%, Fe up to 40.0%, C 0.01-0.5%, B 0.01-0.8%, Zr up to 0.5%, Ni the rest.

DE 2108978 A and DE 2108973 A disclose a method for the manufacture of superalloys, in which metallic melt is atomized by an argon jet, and the formed droplets are quenched rapidly by a large water reservoir situated on the floor. After the atomization process, the powder is washed several times with acetone, then dried and fractionated on an 80-mesh screen and subsequently hammer-forged at high temperatures.

WO 2014/124626 A1 discloses a NiCo alloy for use in aircraft engines. The alloy has the following composition (in wt %): Ni—30.0-65.0%, Fe up to 10.0%, Co 12.0-35.0%, Cr 13.0-23.0%, Mo 1.0-6.0%, W—up to 4.0%, Nb+Ta 4.0-6.0%, Al up to 3.0%, Mn up to 1.0%, Ti 2.0%, Si up to 1.0%, C up to 0.1%, P up to 0.03%, Mg up to 0.01%, B up to 0.02%, Zr up to 0.1%. This alloy, which is also known as alloy 780, has an excellent high-temperature strength up to 750° C., oxidation resistance, workability and weldability. Good workability and weldability of VDM Alloy 780 is based among other factors on relatively large mismatch (0.4% in comparison with from −0.04% up to +0.34% for Udimet 720 and other high γ'-containing alloys) (R. A. Ricks, A. J. Porter, R. C. Ecob, Acta Metall., 31, 43-53 (1983).

SUMMARY OF THE INVENTION

The task of the invention is to provide a powder for the generative fabrication of components on the basis of VDM Alloy 780 as well as its modification for increased high-temperature properties such as strength, oxidation resistance at higher application temperatures with simultaneously good processability for generative fabrication methods (manufacture of crack-free structural parts) and their high-quality and economical manufacture. In this regard, it is important not only to meet the special requirements applicable to distribution of the particle size, particle shape and pourability of the powder, but also to adjust the optimum combinations of alloying elements such that the alloy modifications are adapted in customized manner to the requirements of the final structural part or to the processability.

This task is accomplished by a nickel-cobalt alloy for powder, wherein the contents (in wt %) are defined as follows:

C>0-max. 0.1%
S max. 0.015%
Cr 13-23%
Ni the rest (>30%)
Mn max. 1.0%
Si max. 1.0%
Mo 1-6%
Ti>0-3%
Nb+Ta 3-8%
Cu max. 0.5%
Fe>0-max. 10%
Al>0-<4.0%
V up to 4%
Zr>0-max. 0.1%
Co>12-<35%
W up to 4%
Hf up to 3.0%
O max. 0.1%
N>0-max. 0.1%
Mg>0-max. 0.01%
B>0-max. 0.02%
P>0-max. 0.03%
Ar 0-max. 0.08%
Se max. 0.0005%
Bi max. 0.00005%
Pb max. 0.002%

Advantageously, the following elements may be adjusted as shown below (values in wt %):

C max. 0.05%
S max. 0.010%
Cr 16-22%
Mn max. 0.6%
Si max. 0.4%
Mo 2-6%
Fe>0-5%
Ti 0.0005-2.0%, especially up to <1%
Al 1.6-3.5%
Co 15-27%
Ni the rest (>30)

BRIEF DESCRIPTION OF THE DRAWINGS

FIG. 3 is a diagram (Diagram 2a) showing calculated values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 3a;

DETAILED DESCRIPTION OF THE PREFERRED EMBODIMENTS

Figure 1:
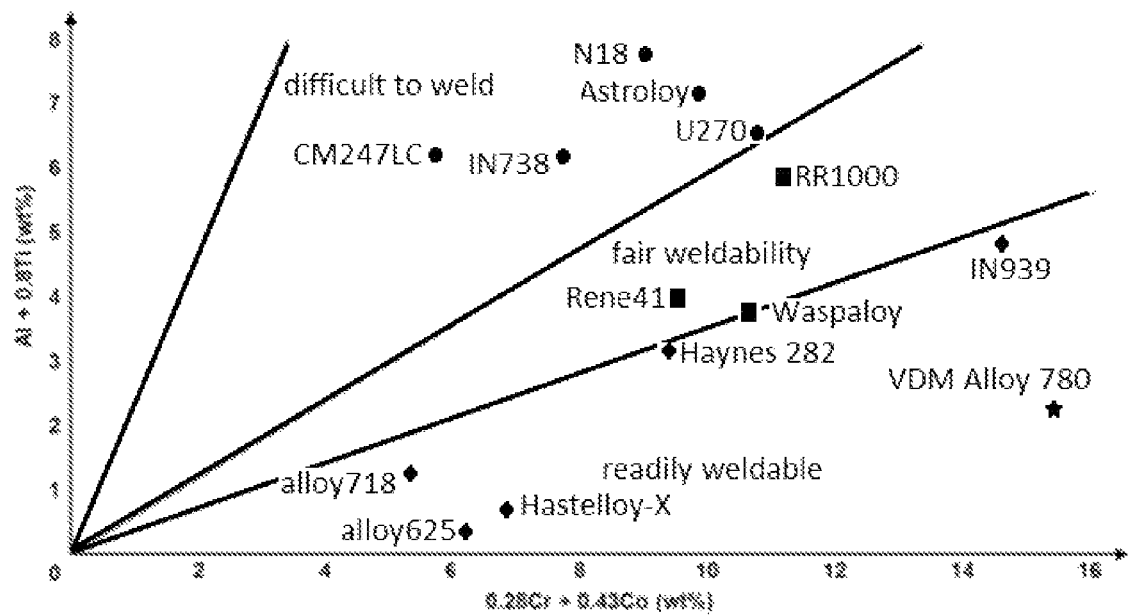
FIG. 1 is a diagram (Diagram 1) showing an analysis range of the alloys Analysis range of the alloys and their weldability (according to M. M. Attallah et al. "Additive manufacturing of Ni-based superalloys: The outstanding issues", MRS Bull., vol. 41, no. 10, pp. 758-764, 201.
Figure 2:
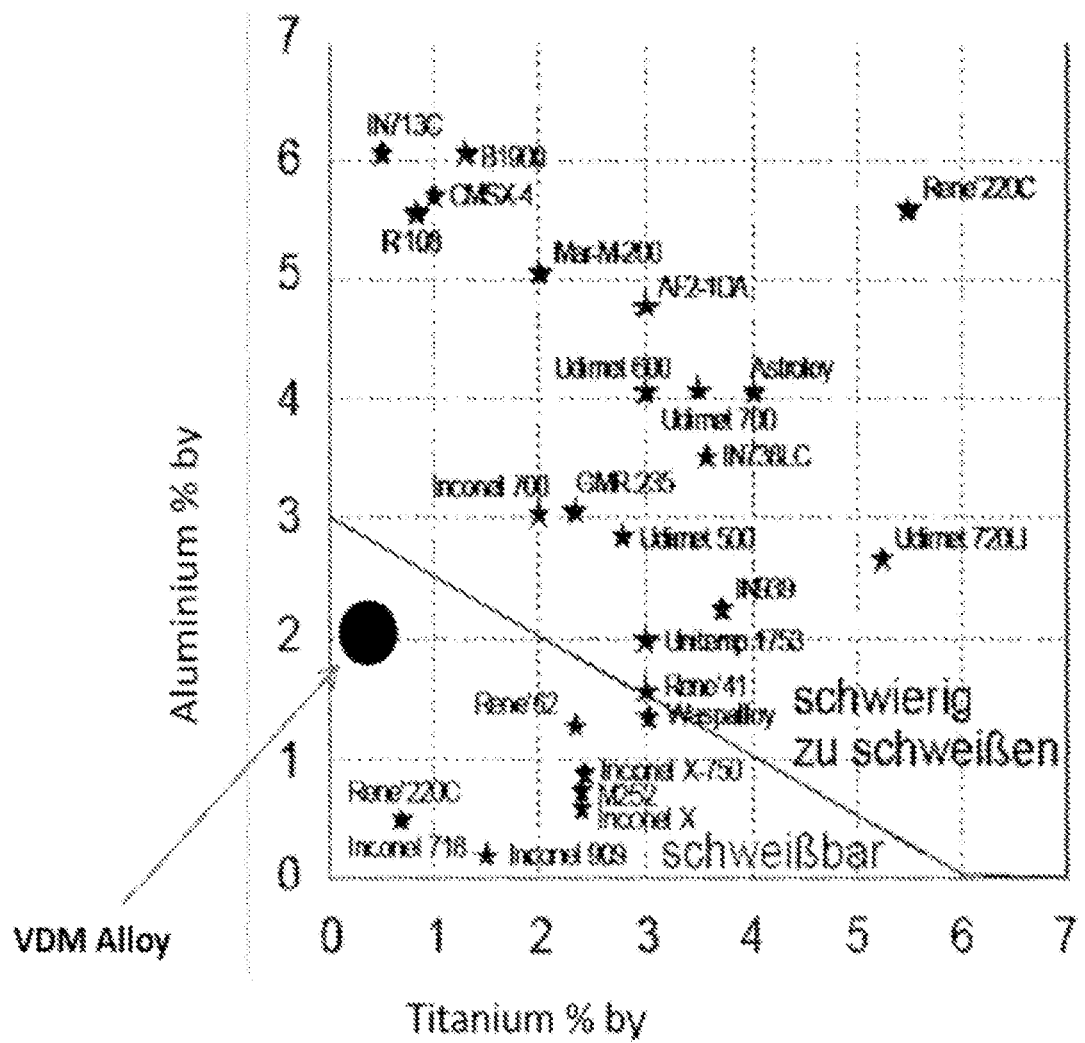
FIG. 2 is a diagram (Diagram 2) showing hot-crack sensitivity caused by gamma' phase (according to Cam & Sekhar)

In the following, an example of a powder from an nickel-cobalt alloy on the basis of Alloy 780 is presented (values in wt %):

Ni 30-65%
Fe>0-max. 5%
Co>15-<27%
Cr 16-22%
Mo 2-6%
W up to 4%
Hf up to 2.5%
Nb+Ta 5-7.5%
Al 1.6-3.5%
Mn max. 0.6%

Ti 0.0005-2.0%, especially <1.0%
Si 0.0005-0.4%
C>0-max. 0.05%
P>0-max. 0.025%
N>0-max. 0.1%
Mg>0-max. 0.008%
B>0-max. 0.02%
Ar max. 0.05%
Zr>0-max. 0.1%
The following relationships must be fulfilled:
Mo+W≥2.5
0.0005<B+Zr+P<0.15
S+Se+Bi+Pb<0.1
900° C.<γ' solvus<1130° C.
20%<γ' volume fraction<45% in the precipitation-annealed condition Table 1 presents, as the prior art, the conventional benchmark alloys that, due to better high-temperature properties and/or processability, may be substituted by adaptation and modification according to the invention of the chemical composition of VDM Alloy 780 in the application in generative fabrication methods. Particular attention is paid there to the γ' volume fraction, since it plays an important role for the high-temperature strength. Moreover, a further subdivision in the high-temperature range is necessary (Groups no. 2 and 3 as well as 4 and 5). In this regard, a design of the microstructure in the range of creep strength or low-cycle fatigue is of benefit, depending on structural part use. This is achieved by the stability of the delta phase. Delta phase is precipitated at the grain boundaries, pins them and significantly slows the crack propagation.

The nitrogen must be smaller than or equal to 0.100%, in order to ensure the manufacturability and usability of the alloy. Too high nitrogen content leads to the formation of nitrides, which negatively influence the properties of the alloy. A too low nitrogen content increases the costs. The nitrogen content is therefore ≥0.00001%. The following restrictions of the nitrogen content are conceivable:
0.00001-0.1
0.00002-0.1
0.00005-0.1
0.00008-0.1
0.0001-0.1
0.0002-0.1
0.0005-0.1
0.0008-0.1
0.001-0.1
0.002-0.1
0.005-0.1
0.008-0.1
0.010-0.1
0.00001-0.10
0.00001-0.08
0.00001-0.05
0.00001-0.03
0.00001-0.02

Both in the powder and in fabricated components (3D printed samples), the particle sizes both of nitrides and of carbides and/or carbonitrides are very small (approximately <8 μm). In some cases, the above-mentioned particles may not be present or may be visible only after heat treatment.

TABLE 1

| | Alloy grouping | | | | | |
|---|---|---|---|---|---|---|
| Benchmark alloy | Alloy 718 Waspaloy Udimet 720 25% < γ' | VDM Alloy 780 25% < γ' vol.(%) < 30%, | Alloy 939 30% < γ' vol.(%) ≤ 35%, no eta phase | | Alloy 738LC 35% < γ' vol.(%) ≤ 45%, no eta phase | |
| Microstructural requirements | vol.(%) < 30%, Delta vol. < 6% | Delta vol. < 6% No eta phase | With delta ph. | Without delta ph. | With delta ph. | Without delta ph. |
| Group no. | 0 | 1 | 2 | 3 | 4 | 5 |

The oxygen content must be smaller than or equal to 0.100%, in order to ensure the manufacturability and usability of the alloy. A too low oxygen content increases the costs. The oxygen content is therefore 0.00001%. The following restrictions of the oxygen content are conceivable:
0.00001-0.1
0.00002-0.1
0.00005-0.1
0.00008-0.1
0.0001-0.1
0.0002-0.1
0.0005-0.1
0.0008-0.1
0.001-0.1
0.002-0.1
0.005-0.1
0.008-0.1
0.010-0.1
0.00001-0.10
0.00001-0.08
0.00001-0.05
0.00001-0.03
0.00001-0.02

Small particle sizes of N-containing precipitates have positive effect on high-temperature properties, since N-containing precipitates act as crack-initiation sites in conventionally manufactured alloys.

The argon content must be smaller than or equal to 0.08%, in order to ensure the manufacturability and usability of the alloy. Argon cannot be dissolved in the y-matrix, and so it may negatively influence the mechanical properties of the structural part, since argon inclusions may act as crack-initiation sites. A too low argon content increases the costs. The argon content is therefore ≥0.0000001% (≥1 ppb). The following restrictions of the argon content are conceivable, wherein the argon contents from the powder manufacture as well as from the structural part manufacture are included:
0.0000001-0.05
0.0000002-0.05
0.0000001-0.005
0.0000001-0.002
0.0000001-0.001

The alloying of Hf up to max. 3.0% if necessary may positively influence the strengthening of the γ' phase. Moreover, the alloying of Hf for the avoidance of crack formation may be used in the solidification process.

In case of high requirements on mechanical properties at high temperatures, the V content may be increased if necessary. In this case, V tends to become concentrated at the grain boundaries and positively influence the mechanical properties at higher temperatures.

In the following, a method according to the invention is presented for the manufacture of a powder described in advance of a nickel-cobalt alloy, in which
an alloy is smelted in a VIM furnace,
the molten melt is maintained for 5 minutes to 2 hours especially 20 minutes to 2 h, for homogenization,
a closed atomization system having a supplied gas is adjusted to a dew point of −10° C. to −120° C.,
the melt is blown by a nozzle in a gas stream with a gas flow rate of 2 m$^3$/min to 150 m$^3$/min,
the solidified powder particles are collected in a gas-tight closed container, wherein
the particles have a particle size of 5 μm to 250 μm,
the particles of the powder are spherical,
the powder has gas inclusions of 0.0 to 4% pore area (pores>1 μm) in relationship to the total area of evaluated objects,
the powder has a bulk density of 2 up to the density of the alloy, which is approximately 8 g/cm$^3$,
the powder is packed air-tightly under a protective-gas atmosphere with argon.

Advantageous further developments of the method according to the invention can be inferred from the associated dependent claims according to the method.

The following initial fabrication steps are conceivable:
a master alloy ingot having defined chemical analysis is generated by melting in the VIM furnace, VIM/ESR, VIM/ESR/VAR, VIM/VAR, VOD or VLF then remelting in the ESR and/or VAR if necessary, depending on the purity requirements of the material,
the master alloy ingot is cut into small pieces by sawing,
the pieces of the master alloy are melted in a VIM furnace, or
alloying elements of a defined weight corresponding to the chemical analysis are melted in a VIM furnace, or
the combination between master alloy material, process-related scrap (including scrap from customers, such as recycled powder as well as support structures or defective structural parts) as well as new alloying elements in the ratio from 0 to 100%. The exact ratio is estimated in each case with consideration of qualitative, economic and ecological aspects. It may be of advantage if the master alloy ingot is subjected prior to the dissection to a machining of the surface (e.g. by brushing, grinding, pickling, cutting, scalping, etc.). In the process, defects may be removed that are not eliminated by the further remelting and that may cause impairment for subsequent applications. Moreover, the use of possible master alloys leads to the maintenance of highest quality demands on the chemical purity of the powder that can be ensured only by previous remelting processes,
the molten melt is maintained for 5 minutes to 2 hours, especially 20 minutes to 2 h, for homogenization,
a closed atomization system is adjusted with argon gas to a dew point of −10° C. to −120° C., preferably in the range of −30° C. to −100° C.,
the melt is blown by a nozzle in an argon stream with a gas flow rate of 2 m$^3$/min to 150 m$^3$/min,
the solidified powder particles are collected in a gas-tight closed container,
the particles have a particle size of 5 μm to 250 μm, wherein preferred ranges lie between 5 and 150 μm, or 10 and 150 μm,
the particles of the powder are spherical,
the powder has gas inclusions of 0.0 to 4% pore area (pores>1 μm) in relationship to the total area of evaluated objects, wherein preferred ranges are 0.0 to 2%. The quantity of the gas inclusions of the powder permits a low residual porosity of the manufactured parts,
the powder has a bulk density of 2 up to the density of the alloy, which is approximately 8 g/cm$^3$, wherein preferred ranges have values from 4 to 5 g/cm$^3$,
the powder is packed air-tightly under the protective-gas atmosphere with argon.

The powder according to the invention is preferably produced in a vacuum inert gas atomization system (VILA). In this system, the alloy is melted in a vacuum induction melting furnace (VIM), directed into a casting gate that leads to a gas nozzle, in which the molten metal is atomized to metal particles with inert gas under high pressure of 5 to 100 bar. The melt is heated in the melting crucible to 5 to 400° C. above the melting point. The metal flow rate during atomization amounts to 0.5 to 80 kg/min and the gas flow rate is 2 to 150 m$^3$/min. Due to the rapid cooling, the metal particles solidify in the form of balls (spherical particles). The inert gas used for the atomization may contain 0.01 to 100% nitrogen if necessary. The gas phase is then separated from the powder in a cyclone, and then the powder is packaged.

Alternatively, the powder according to the invention may be manufactured via the so-called EIGA method instead of via VIGA. For this purpose, a prefabricated alloy ingot in the form of a rotating electrode is melted contactlessly in an induction coil. The melt drips from the electrode directly into the gas stream of a gas nozzle.

The alloy ingot for EIGA may in turn be manufactured by the VIM, ESR, VAR, VOD or VLF melting method and combinations thereof and optionally subjected to hot-forming processes such as forging and rolling. A cleaning of the surface of the ingot by a treatment such as grinding or/and scalping prior to the use in the EIGA method is of advantage.

The inert gas for the powder manufacture may optionally be argon or a mixture of argon with 0.01 to <100% nitrogen. Possible limits of the nitrogen content may be:
0.01 to 80%
0.01 to 50%
0.01 to 30%
0.01 to 20%
0.01 to 10%
0.01 to 10%
0.1 to 5%
0.5 to 10%
1 to 5%
2 to 3%

Alternatively, the inert gas may optionally be helium.

The inert gas may preferably have a purity of at least 99.996 vol %. In particular, the nitrogen content should be from 0.0 to 10 ppmv, the oxygen content from 0.0 to 4 ppmv and have an H$_2$O content of ≤5 ppmv.

In particular, the inert gas may preferably have a purity of at least 99.999 vol %. In particular, the nitrogen content should be from 0.0 to 5 ppmv, the oxygen content from 0.0 to 2 ppmv and have an H$_2$O content of ≤3 ppmv.

The dew point in the system lies in the range of −10 to −120° C. It preferably lies in the range of −30 to −100° C.

The pressure during powder atomization may preferably be 10 to 80 bar.

The structural parts and components or layers on structural parts and components manufactured by means of additive fabrication are built up from layer thicknesses of 5 to 500 μm and directly after manufacture have a textured microstructure with grains elongated in structure direction and having a mean grain size of 0.5 μm to 2000 μm. The preferred range lies between 5 μm and 500 μm. Moreover, the powder described above may be used for the manufacture of the structural parts by means of hot isostatic pressing (HIP) or conventional sintering and extrusion-pressing processes. Moreover, the method combination of additive fabrication and subsequent HIP treatment is possible. For this purpose it is possible to apply the postprocessing steps described below for HIP structural parts for the generative fabrication.

The structural parts and components or layers on structural parts and components manufactured by means of additive fabrication may optionally be subjected to a homogenization, stress-relief, solution and/or precipitation-hardening annealing. The heat treatments may take place if necessary under shield gas, such as argon or hydrogen, for example, followed by a cooling in the furnace, if necessary under shield gas, in air, in the agitated annealing atmosphere or in the water bath.

If necessary, the structural parts are stress-relief-annealed at temperatures between 300° C. and 600° C. for 0.5 h to 10 h and annealed between 1000° C. and 1250° C. for 1 h to 300 h under air or shield gas for the homogenization or for the stress relaxation. Thereafter the structural parts are solution-annealed or stress-relief-annealed if necessary at temperatures between 850° C. and 1,250° C. for 0.5 h to 30 h under air or shield gas. If necessary, the precipitation annealing may be one-stage or two-stage and be carried out at temperatures between 600° C. and 850° C. for 1 h to 30 h under air or shield gas.

Thereafter the surface may optionally be cleaned or machined by pickling, blasting, grinding, turning, peeling, milling. Optionally, such a machining may already take place partly or completely even before the annealing.

The structural parts and components or layers on structural parts and components manufactured by means of additive fabrication have after an annealing a mean grain size of 2 μm to 2000 μm. The preferred range lies between 20 μm and 500 μm.

The powders fabricated according to this method and also components fabricated from this powder (3D printed samples) are free of nitrides and also of carbides and/or carbonitrides. Should nitrides and also carbides nevertheless be present, these have a particle size in the diameter of <100 nm especially<50 nm.

After a heat treatment of components fabricated from this powder (3D printed samples) for homogenization, diffusion annealing above 900° C., especially above 1000° C., ideally above 1100° C. for more than 1 hour, nitrides and also of carbides and/or carbonitrides may appear in the fabricated components (3D printed samples). These have a particle size in the diameter of <8 μm, or respectively<5 μm, ideally<1 μm, especially<500 nm.

The structural parts and components or layers on structural parts and components manufactured from the powder generated according to the invention by means of additive fabrication are intended to be used preferably in areas in which the material is also used as wrought or cast alloy with related analysis. The term "additive/generative fabrication" may be subdivided into rapid prototyping, rapid tooling, rapid manufacturing or the like.

In general, the following are distinguished here:
3D printing with powders,
Selective laser sintering and
Selective laser melting
Electron beam melting
Laser deposit welding
Selective electron beam welding or the like.

The abbreviations used here are defined as follows:
VIM Vacuum Induction Melting
VIGA Vacuum Inert Melting and Inert Gas Atomization
VAR Vacuum Arc Remelting
VOD Vacuum Oxygen Decaburization
VLF Vacuum Ladle Furnace
EIGA Electrode Induction Melting Gas Atomization The range of values for the particle size of the powder lies between 5 and 250 μm, wherein preferred ranges lie between 5 and 150 μm or 10 and 150 μm.

The powder has gas inclusions of 0.0 to 4% pore area (pores>1 μm) in relationship to the total area of evaluated objects, wherein preferred ranges are
0.0 to 2%
0.0 to 0.5%
0.0 to 0.2%
0.0 to 0.1%
0.0 to 0.05%

The powder has a bulk density of 2 $g/cm^3$ up to the density of the alloy, which is approximately 8 $g/cm^3$, wherein preferred ranges may have the following values:
4-5 $g/cm^3$
2-8 $g/cm^3$
2-7 $g/cm^3$
3-6 $g/cm^3$ The quantity of the gas inclusions of the powder permits a low residual porosity of the manufactured parts.

Compared with the prior art, the centrifugation method is omitted. Hereby the operating time of the system is optimized. The subsequent refining processes optimize the quality of the powder for the additive fabrication. Moreover, the optimization of the composition of the alloy named VDM Alloy 780 is carried out for the application in generative fabrication methods as is the optimization of the composition for the application at higher temperatures with unchanged processability.

Chemical compositions of the powder manufactured with the method according to the invention are indicated in Table 2 (values in wt %).

Powders with a particle size from 5 μm to 250 μm are obtained.

A too small particle size below 5 μm impairs the flow behavior and is therefore to be avoided; a too large particle size above 250 μm impairs the behavior during additive fabrication.

A too low bulk density of 2 $g/cm^3$ impairs the behavior during additive fabrication. The greatest possible bulk density of approximately 8 $g/cm^3$ is imposed by the density of the alloy.

The powders manufactured according to this method may be used in the additive fabrication for construction of components that have the properties of the underlying alloys (VDM Alloy 780 and its high-temperature modification). Standard VDM Alloy 780 can be fabricated in crack-free condition from alloy 718 in the process parameter window of the SLM method. In the process, the relative density of 99.98% is achieved.

In the generative fabrication method, the process parameters can be described by means of several parameters. For the SLM and sometimes EBM method, the volume energy density is often considered to be characteristic. In principle, the volume energy density is calculated via the formula [L. A. Al-Juboori, T. Niendorf, F. Brenne; On the Tensile Properties of Inconel 718 Fabricated by EBM for As-Built and Heat-Treated Components; Metallurgical and Materials Transactions B, Volume 49B, 2018]:

$$E = \frac{P}{v*d*h}, \text{ in J/mm}^3$$

with laser power (P), scan speed (v), layer density (d) and track spacing (h)

For Alloy 718, an energy density between 40 and 120 J/mm³ is used. A typical value is approximately 90 J/mm³ for both methods.

During parameter finding for the Alloy 780 powder compositions P10047, P10048, P10056, P10085 and P10086, the energy densities in the range of Alloy 718, between 40 and 120 J/mm³ were used, with the relative density above 99%. For example, the energy density of approximately 80 J/mm³ and the relative density of 99.98% can be attained. For the high-temperature variants of powder alloy 780 (compositions 1 to 57, as well as N1 to N5), energy densities can be varied from 40 to 600 J/mm³, so that the high relative density of the material can be assured. However, the process parameters may differ greatly depending on method.

Samples were manufactured by the SLM method using material from batch P10056. Except for occasional process-related pores, it is possible to obtain crack-free microstructure.

In dependence on different heat treatments, a uniform microstructure with grain sizes of approximately 75 μm (approximately ASTM 4.5), for example, was achieved. Smaller grain sizes or larger grain sizes can also be adjusted by defined heat-treatment parameters.a)b)

TABLE 2

Chemical compositions of powder batches generated by atomization.

| Batch | P10047 | P10048 | P10056 | P10085 | P10086 |
|---|---|---|---|---|---|
| C  | 0.022   | 0.0214  | 0.024   | 0.022   | 0.022   |
| S  | 0.0005  | 0.0003  | 0.0005  | 0.0005  | 0.0005  |
| N  | 0.007   | 0.0068  | 0.007   | 0.006   | 0.005   |
| Cr | 17.86   | 17.76   | 17.81   | 17.64   | 17.64   |
| Ni | 45.2    | 45.08   | 45.18   | 46.1    | 46.15   |
| Mn | 0.02    | 0.02    | 0.02    | 0.01    | 0.01    |
| Si | 0.07    | 0.06    | 0.06    | 0.06    | 0.06    |
| Mo | 3.05    | 3.15    | 2.91    | 2.95    | 2.98    |
| Ti | 0.3     | 0.3     | 0.3     | 0.31    | 0.31    |
| Nb | 5.24    | 5.45    | 5.53    | 5.39    | 5.42    |
| Cu | 0.01    | 0.01    | 0.01    | 0.01    | 0.01    |
| Fe | 0.88    | 0.75    | 0.72    | 0.64    | 0.63    |
| P  | 0.013   | 0.013   | 0.013   | 0.014   | 0.011   |
| Al | 2.12    | 2.12    | 2.08    | 2.18    | 2.13    |
| Mg | 0.0002  | 0.00003 | 0.0003  | 0.001   | 0.001   |
| Ca | 0.0005  | 0.0001  | 0.0003  | 0.000   | 0.0002  |
| V  | 0.01    | 0.01    | 0.01    | 0.01    | 0.01    |
| Zr | 0.01    | 0.002   | 0.01    | 0.01    | 0.01    |
| W  | 0.02    | 0.02    | 0.02    | 0.02    | 0.02    |
| Co | 25.15   | 25.21   | 25.28   | 24.61   | 24.57   |
| B  | 0.004   | 0.0035  | 0.004   | 0.004   | 0.004   |
| Ta | 0.005   | 0.01    | 0.005   | 0.005   | 0.005   |
| Se | 0.0003  |         | 0.0003  | 0.0003  | 0.0003  |
| Te | 0.00005 |         | 0.00005 | 0.00005 | 0.00005 |

TABLE 2-continued

Chemical compositions of powder batches generated by atomization.

| Batch | P10047 | P10048 | P10056 | P10085 | P10086 |
|---|---|---|---|---|---|
| Bi | 0.00003 |       | 0.00003 | 0.00003 | 0.00003 |
| O  | 0.002   | 0.001 |         |         |         |
| Sb | 0.0005  |       | 0.0005  | 0.0005  | 0.0005  |
| Ag | 0.0001  |       | 0.0001  | 0.0001  | 0.0001  |

A typical chemical composition of a batch manufactured by way of example on the large industrial scale (batch no. 420420) of the alloy named Alloy 780 for hot-forged billets is listed, for example, in Table 3 (and in further tables). As regards the contents, especially of the elements Co, Al, Ti and Nb, the chemical composition of this batch 420420 manufactured on the large industrial scale is selected such that the gamma' solvus temperature is so high (determined experimentally as approximately 990° C.) that the microstructural stability is assured up to correspondingly high temperatures. Beyond that, the gamma' volume fraction is significantly higher compared with the standard alloy named Alloy 718. From this, an application temperature results that could possibly be significantly higher, with high strength values. On the other hand, the gamma' solvus temperature is not too high, by virtue of the well-defined chemical composition. Thus the alloy can still be readily hot-worked, i.e. readily forged, to billets, starting from a remelted ingot. With approximately 2.1% Al and 0.3% Ti, the chemical composition of this batch 420420 (reference material for the further considerations) generated on the large industrial scale for forged products lies in the analysis range of a material that can be readily welded (see FIG. 1 (Diagram 1)). This was verified experimentally by means of electron beam and plasma arc welding tests. This also agrees very well with the observation that no cracks of any kind appeared during 3D printing of test specimens with powder manufactured via powder atomization by means of a VIGA system and having a comparable chemical composition. From this, the chemical composition used for forged products can now be potentially so adapted in the case of powder products for additive fabrication methods, such as selective laser welding, within the limit analyses described in the patent specification, that not only the alloys having adapted chemical compositions can be printed in crack-free condition with the selective laser melting, but also the gamma' solvus temperature, for example, and even the gamma' volume fraction can be increased. From this, materials then result with chemical compositions that in the case of 3D-printed components can be used with even higher strength values at higher temperatures.

Moreover, in this way it is possible to make use of a VDM Alloy 780 alloy concept with simultaneous optimization according to the invention for the generative manufacturing methods:

(a) high Cr content ensures the improved oxidation resistance of the material at high temperatures;

(b) high Co content increases the stacking fault energy, becomes substituted in γ' phase on Ni sites, increases the lattice constant of the γ' phase;

(c) low Ti content slows the substitution of the Al in the γ' phase and thus the precipitation kinetics, and so the weldability is also improved (see FIG. 1 (Diagram 1)). Moreover, the high-temperature oxidation resistance is improved. Reduction of the Ti content acts positively on the destabilization of the eta phase and N-containing incoherent precipitates, and thus improves the high-temperature properties.

(d) adapted Nb and Ta contents as well as Hf additions slow the coarsening of the γ' phase at higher temperatures, increase the mismatch and strengthen the γ' phase;

(e) Reduction of minor elements improves the processability of the alloy and permits crack-free structural parts to be manufactured even at high γ' phase volume fractions;

By means of thermodynamic simulations (JMatPro and ThermoCalc) with the TTNi8 database, an extensive experimental matrix with variation of the chemical compositions was calculated and thus the gamma' solvus temperatures and the gamma' volume fractions of these alloys were determined (see following tables, diagrams on the next pages).

In the process, the following elements and element contents were varied:

Cr: 16/18/20%
Ni: from 43% up to 55.5% (element constituting the rest)
Mo: 3/3.5/4/6%
Ti: 0.1/0.3/0.6/0.9/1.2/1.6/2.1% (up to 3%)
Nb: 3.5/4.0/5.0/5.4%
Ta: 0.5/1/2%
Al: 1.6/1.9/2.2/2.4/2.5/2.6/2.8/3.1/3.5/4.0%
Co: 15/17.5/20/22.5/24.5/27.5%
W: 0.5/1/2%
Hf: 0.5/1/2%

Tables 3a to 3d contain selected alloy analyses with variation of the Al contents and calculated phase properties for a constant Co content of 24.5% (Tab. 3a and 3b-1) and 20% (Tab. 3c and 3d-1).

TABLE 3a

Selection of alloy analyses with variation of the Al contents with constant Co content of 24.5% (analysis no. 17, 18, 19, 25, 26; reference no. 420420 and 1 as well as analyses N1 and N2)

| Variant | 420420 | 1 | 17 | 18 | 19 | 25 | 26 | N1 | N2 |
|---|---|---|---|---|---|---|---|---|---|
| C | 0.021 | 0.021 | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 | 0.008 | 0.008 |
| Cr | 17.75 | 18 | 18 | 18 | 18 | 18 | 18 | 18 | 18 |
| Ni | 45.96 | 46.018 | 45.718 | 45.418 | 45.118 | 46.318 | 46.618 | 44.718 | 44.218 |
| Mn | 0.018 | 0.018 | 0.018 | 0.018 | 0.018 | 0.018 | 0.018 | 0.018 | 0.018 |
| Si | 0.065 | 0.065 | 0.065 | 0.065 | 0.065 | 0.065 | 0.065 | 0.065 | 0.065 |
| Mo | 2.94 | 3 | 3 | 3 | 3 | 3 | 3 | 3 | 3 |
| Ti | 0.31 | 0.3 | 0.3 | 0.3 | 0.3 | 0.3 | 0.3 | 0.3 | 0.3 |
| Nb | 5.41 | 5.4 | 5.4 | 5.4 | 5.4 | 5.4 | 5.4 | 5.4 | 5.4 |
| Ta | 0.01 | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 | 0.43 | 0.43 |
| P | 0.011 | 0.011 | 0.011 | 0.011 | 0.011 | 0.011 | 0.011 | 0.011 | 0.011 |
| Al | 2.16 | 2.2 | 2.5 | 2.8 | 3.1 | 1.9 | 1.6 | 3.5 | 4.0 |
| Mg | 0.0008 | 0.0008 | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 | 0.004 | 0.004 |
| V | 0.002 | 0.002 | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 | 0.002 | 0.002 |
| W | 0.02 | 0.02 | 0.02 | 0.02 | 0.02 | 0.02 | 0.02 | 0.02 | 0.02 |
| Co | 24.63 | 24.5 | 24.5 | 24.5 | 24.5 | 24.5 | 24.5 | 24.5 | 24.5 |
| Hf | 0 | 0 | 0 | 0 | 0 | 0 | 0 | 0 | 0 |
| B | 0.004 | 0.004 | 0.004 | 0.004 | 0.004 | 0.004 | 0.004 | 0.004 | 0.004 |
| O | 0.002 | 0.002 | 0.002 | 0.002 | 0.002 | 0.002 | 0.002 | 0.002 | 0.002 |

TABLE 3b-1

Calculated phase properties of the alloy analyses from Table 3a.

| Variant | 420420 | 1 | 17 | 18 | 19 | 25 | 26 | N1 | N2 |
|---|---|---|---|---|---|---|---|---|---|
| γ' sol. T-r (° C.) | 990 | 1016 | 1035 | 1053 | 1067 | 980 | 950 | 1083 | 1104 |
| γ' vol. (%) at 600° C. | 26 | 29 | 33.5 | 38 | 41 | 24.3 | 19.7 | 44.8 | 49.6 |
| eta sol. T-r (° C.) | 1020 | 996 | 1008 | 0 | 0 | 998 | 966 | 0 | 0 |
| eta max. vol. (%) | 2.5 | 2.8 | 0.9 | 0 | 0 | 1.9 | 1.4 | 0 | 0 |
| eta sol. T-r (° C.) | | 970 | 969 | 0 | 0 | 957 | 936 | 0 | 0 |
| Delta sol. T-r (° C.) | 1060 | 1014 | 978 | 908 | 0 | 1022 | 1031 | 0 | 0 |
| Delta vol.(%) at 600° C. | 2 | 4.5 | 2.4 | 0.7 | 0 | 6.7 | 8.2 | 0 | 0 |
| sigma sol. T-r (° C.) | — | 774 | 811 | 850 | 881 | 734 | 699 | 919 | 961 |
| sigma vol.(%) at 600° C. | — | 8.6 | 11.8 | 14 | 16 | 5.9 | 3.3 | 19.2 | 22.6 |

Besides the fractions [wt %] and the particle sizes [nm] of the gamma' phase, the values of the offset yield strengths Rp0.2 [MPa] were calculated in dependence on the test temperature [° C.] with the JMatPro program (Version 11.1). For these calculations, the temperature 1100° C. with a cooling rate of 10 K/s was used as parameter for the solution annealing. For alloy analyses in which the gamma' solvus temperature lies above 1100° C., the solution annealing temperature was set to 1150° C. For the precipitation heat treatment following the solution annealing, the results for Rp0.2 with annealing parameters of 700° C./8 h, 850° C./8 h and 850° C./24 h are listed in the following tables for most alloy variants. For selected alloy variants, the results for Rp0.2 for the precipitation temperatures 650° C., 700° C., 750° C., 800° C., 850° C. and 900° C. with the annealing duration of 8 h are listed in detail; for the precipitation temperatures at which Rp0.2 exhibits a highest value for the respective alloy, the results for the precipitation annealing durations of 16 h and 24 h are also additionally included. The fractions and the particle sizes of the gamma' phase are dependent not only on the chemical composition but also on the precipitation annealing parameters. The influence on the values of the offset yield strength Rp0.2 result from this. In addition, the values of the offset yield strength Rp0.2 are also dependent on the grain size of the microstructure (in the tables, the grain size is indicated in ASTM sizes). In this context, a grain size of ASTM 4.5 corresponds approximately to a coarser grain size for a solution annealing temperature of 1100° C. In contrast, ASTM 12 corresponds to a finer grain size, which can be adjusted at a lower solution annealing temperature (e.g. around 1000° C.)

In Tables 3b-2 to 3b-7, the calculated fractions and particle sizes of the gamma' phase and the calculated values of the offset yield strength Rp0.2 are listed in dependence on the annealing parameters and grain sizes described previously for the alloys of Table 3a.

TABLE 3b-2

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 3a.

| Variant | 1 | 17 | 18 | 19 | 25 | 26 | N1 | N2 |
|---|---|---|---|---|---|---|---|---|
| Gamma' [%] | 31 | 34 | 36.6 | 39 | 29 | 26 | 43 | 47 |
| Gamma' [nm] | 24 | 25 | 25 | 26 | 23 | 21 | 27 | 27 |
| Rp0.2 [MPa] | | | | | | | | |
| 650° C. | 871 | 905 | 920 | 951 | 834 | 781 | 983 | 993 |
| 700° C. | 875 | 910 | 926 | 957 | 824 | 784 | 989 | 1001 |

TABLE 3b-2-continued

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 3a.

| Variant | 1 | 17 | 18 | 19 | 25 | 26 | N1 | N2 |
|---|---|---|---|---|---|---|---|---|
| 750° C. | 848 | 882 | 898 | 927 | 812 | 759 | 957 | 965 |
| 800° C. | 690 | 745 | 791 | 842 | 633 | 570 | 920 | 927 |
| 850° C. | 474 | 515 | 547 | 583 | 431 | 382 | 627 | 802 |
| 900° C. | 328 | 361 | 387 | 415 | 292 | 229 | 448 | 478 |

TABLE 3b-3

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 12 of the alloy analyses from Table 3a.

| Variant | 1 | 17 | 18 | 19 | 25 | 26 | N1 | N2 |
|---|---|---|---|---|---|---|---|---|
| Gamma' [%] | 31 | 34 | 36.6 | 39 | 29 | 26 | 43 | 47 |
| Gamma' [nm] | 24 | 25 | 25 | 26 | 23 | 21 | 27 | 27 |
| Rp0.2 [MPa] | | | | | | | | |
| 650° C. | 919 | 954 | 969 | 999 | 883 | 830 | 1031 | 1041 |
| 700° C. | 923 | 958 | 974 | 1005 | 887 | 833 | 1037 | 1048 |
| 750° C. | 896 | 930 | 945 | 974 | 860 | 807 | 1005 | 1013 |
| 800° C. | 690 | 745 | 791 | 842 | 633 | 570 | 967 | 974 |
| 850° C. | 474 | 515 | 547 | 583 | 431 | 382 | 627 | 802 |
| 900° C. | 328 | 361 | 387 | 415 | 292 | 229 | 448 | 478 |

From the values of Table 3b-2, it is evident that the fraction of gamma' phase increases with increasing Al contents; at the same time, the particle size increases slightly. The offset yield strength Rp0.2 also increases with increasing Al content of the alloy, i.e. with increasing fraction of gamma' phase. Beyond this, it is evident from the variation of the Rp0.2 values in dependence on the test temperature that, for the alloys N1 and N2, i.e. with the higher Al contents of 3.5% and 4.0%, the steeper decrease of Rp0.2 occurring at higher test temperatures is shifted in the direction of a higher test temperature around 800° C. For the alloys with a lower Al content, the steeper decrease of Rp0.2 is already evident at a lower test temperature around 750° C. In comparison with this, it is evident from the data of Table 3a-3 that, in the case of the finer grain size of ASTM 12 in comparison with the coarser grain size of ASTM 4.5, the values of the offset yield strength Rp0.2 are significantly larger. The results for the precipitation heat treatment of 700° C./8 h are listed in Tables 3b-2 and 3b-3.

TABLE 3b-4

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 3a.

| Variant | 1 | 17 | 18 | 19 | 25 | 26 | N1 | N2 |
|---|---|---|---|---|---|---|---|---|
| Gamma' [%] | 25 | 28.1 | 31.1 | 34.5 | 21.2 | 17.1 | 38 | 42.2 |
| Gamma' [nm] | 45 | 44 | 45 | 44 | 45 | 45 | 45 | 45 |
| Rp0.2 [MPa] | | | | | | | | |
| 650° C. | 896 | 966 | 1016 | 1082 | 824 | 742 | 1135 | 1154 |
| 700° C. | 886 | 954 | 1004 | 1070 | 815 | 734 | 1123 | 1161 |
| 750° C. | 852 | 936 | 991 | 1056 | 764 | 670 | 1108 | 1164 |

TABLE 3b-4-continued

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 3a.

| Variant | 1 | 17 | 18 | 19 | 25 | 26 | N1 | N2 |
|---|---|---|---|---|---|---|---|---|
| 800° C. | 643 | 706 | 762 | 826 | 577 | 506 | 896 | 1153 |
| 850° C. | 502 | 552 | 595 | 646 | 450 | 393 | 701 | 901 |
| 900° C. | 348 | 392 | 429 | 468 | 303 | 236 | 511 | 565 |

TABLE 3b-5

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 12 of the alloy analyses from Table 3a.

| Variant | 1 | 17 | 18 | 19 | 25 | 26 | N1 | N2 |
|---|---|---|---|---|---|---|---|---|
| Gamma' [%] | 25 | 28.1 | 31.1 | 34.5 | 21.2 | 17.1 | 38 | 42.2 |
| Gamma' [nm] | 45 | 44 | 45 | 44 | 45 | 45 | 45 | 45 |
| Rp0.2 [MPa] | | | | | | | | |
| 650° C. | 944 | 1014 | 1064 | 1130 | 872 | 791 | 1183 | 1201 |
| 700° C. | 933 | 1002 | 1052 | 1117 | 863 | 782 | 1170 | 1208 |
| 750° C. | 852 | 936 | 1011 | 1095 | 764 | 670 | 1155 | 1211 |
| 800° C. | 643 | 706 | 762 | 826 | 577 | 506 | 896 | 1178 |
| 850° C. | 502 | 552 | 595 | 646 | 450 | 393 | 701 | 901 |
| 900° C. | 348 | 392 | 429 | 468 | 303 | 236 | 511 | 565 |

After the precipitation heat treatment of 850° C./8 h, the fractions of gamma' phase are indeed smaller than after the precipitation heat treatment of 700° C./8 h, but the precipitated particles of the gamma' phase are larger (the associated data are listed in Tables 3b-4 and 3b-5). The positive effect of the larger particle size on the offset yield strength Rp0.2 outweighs the negative effect of the smaller phase fraction. The level of the values of the offset yield strength Rp0.2 is significantly higher after the precipitation heat treatment of 850° C./8 h than after the annealing of 700° C./8 h.

After a longer annealing duration of 24 h at the precipitation temperature of 850° C., the level of the values of the offset yield strength Rp0.2 is significantly lower than after the annealing duration of 8 h at the same precipitation annealing temperature of 850° C. Apparently the coarser particle size of the gamma' phase is responsible for this. These results data are listed in the two Tables 3b-6 and 3b-7 for the grain sizes of ASTM 4.5 and ASTM 12.

TABLE 3b-6

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 3a.

| Variant | 1 | 17 | 18 | 19 | 25 | 26 | N1 | N2 |
|---|---|---|---|---|---|---|---|---|
| Gamma' [%] | 25*(21) | 28.1 | 31.1 | 34.5 | 21.2 | 17.1 | 38 | 42.2 |
| Gamma' [nm] | 64 | 62 | 62 | 61 | 64 | 64 | 62 | 62 |
| Rp0.2 [MPa] | | | | | | | | |
| 650° C. | 807 | 872 | 923 | 982 | 743 | 672 | 1033 | 1093 |
| 700° C. | 797 | 861 | 912 | 970 | 735 | 664 | 1021 | 1080 |
| 750° C. | 787 | 850 | 900 | 957 | 725 | 646 | 1007 | 1066 |
| 800° C. | 613 | 675 | 730 | 791 | 551 | 483 | 858 | 1049 |
| 850° C. | 472 | 521 | 564 | 612 | 424 | 371 | 664 | 860 |
| 900° C. | 324 | 365 | 401 | 437 | 282 | 221 | 478 | 529 |

TABLE 3b-7

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 12 of the alloy analyses from Table 3a.

| Variant | 1 | 17 | 18 | 19 | 25 | 26 | N1 | N2 |
|---|---|---|---|---|---|---|---|---|
| Gamma' [%] | 24.8 | 28.1 | 31.1 | 34.5 | 21.2 | 17.1 | 38 | 42.2 |
| Gamma' [nm] | 64 | 62 | 62 | 61 | 64 | 64 | 62 | 62 |
| Rp0.2 [MPa] | | | | | | | | |
| 650° C. | 855 | 920 | 971 | 1030 | 792 | 720 | 1080 | 1141 |
| 700° C. | 845 | 909 | 960 | 1018 | 783 | 712 | 1068 | 1128 |
| 750° C. | 822 | 897 | 947 | 1005 | 737 | 647 | 1054 | 1113 |
| 800° C. | 613 | 675 | 730 | 791 | 551 | 483 | 858 | 1096 |
| 850° C. | 473 | 52 | 564 | 612 | 424 | 371 | 664 | 860 |
| 900° C. | 324 | 365 | 401 | 437 | 282 | 221 | 478 | 529 |

Figure 3:
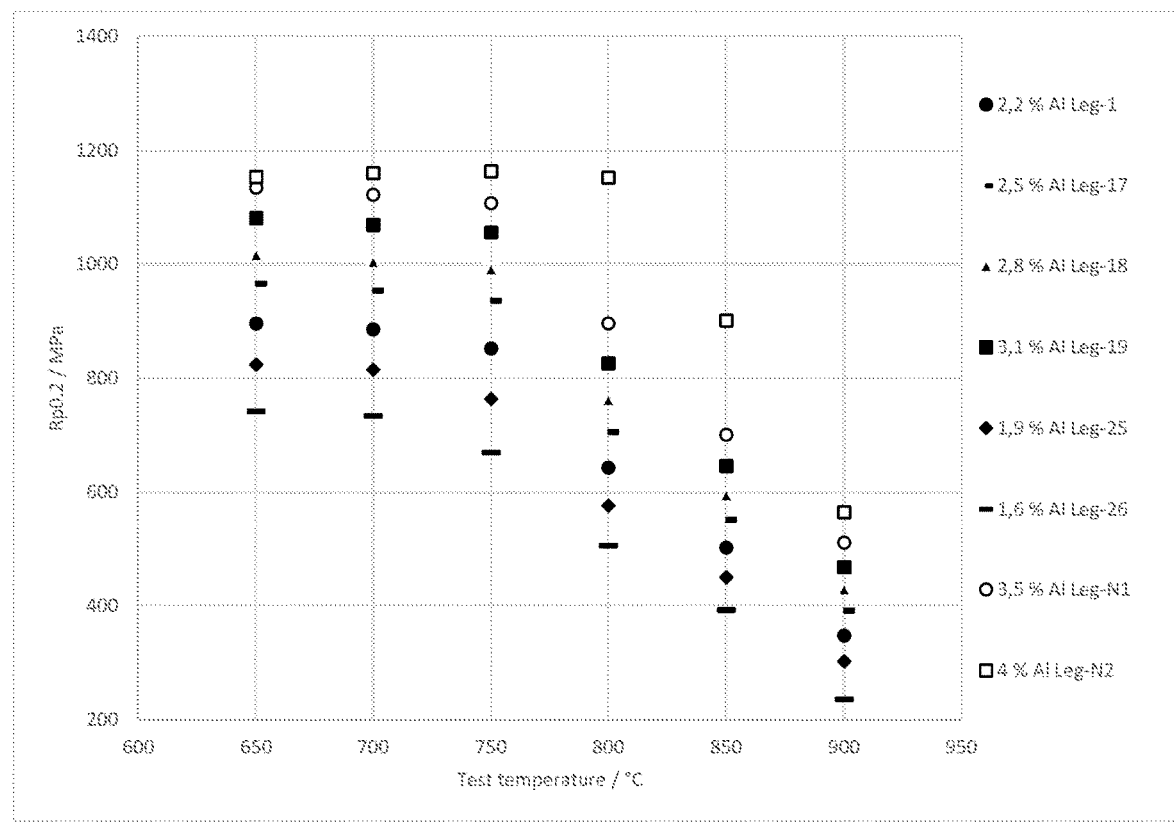

It can be inferred from FIG. 3 (Diagram 2a) that the offset yield strength Rp0.2 increases with increasing Al content at higher temperatures. Moreover, a steeper decrease of the offset yield strength Rp0.2 at higher Al contents is evident only at temperatures above 800° C.

TABLE 3c-1

Selection of alloy analyses with variation of the Al contents with constant Co content of 20% (analysis no. 8, 9, 10, 11, 36, 37; reference no. 420420 and 1)

| Variant | 420420 | 1 | 8 | 9 | 10 | 11 | 36 | 37 |
|---|---|---|---|---|---|---|---|---|
| C | 0.021 | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 | 0.008 |
| Cr | 17.75 | 18 | 18 | 18 | 18 | 18 | 18 | 18 |
| Ni | 45.96 | 46.018 | 50.518 | 50.118 | 50.818 | 51.118 | 49.218 | 48.718 |
| Mn | 0.018 | 0.018 | 0.018 | 0.018 | 0.018 | 0.018 | 0.018 | 0.018 |
| Si | 0.065 | 0.065 | 0.065 | 0.065 | 0.065 | 0.065 | 0.065 | 0.065 |
| Mo | 2.94 | 3 | 3 | 3 | 3 | 3 | 3 | 3 |
| Ti | 0.31 | 0.3 | 0.3 | 0.3 | 0.3 | 0.3 | 0.3 | 0.3 |
| Nb | 5.41 | 5.4 | 5.4 | 5.4 | 5.4 | 5.4 | 5.4 | 5.4 |
| Ta | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 | 0.43 |
| P | 0.011 | 0.011 | 0.011 | 0.011 | 0.011 | 0.011 | 0.011 | 0.011 |
| Al | 2.16 | 2.2 | 2.2 | 2.6 | 1.9 | 1.6 | 3.5 | 4 |
| Mg | 0.0008 | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 | 0.004 |
| V | 0.002 | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 | 0.002 |
| W | 0.02 | 0.02 | 0.02 | 0.02 | 0.02 | 0.02 | 0.02 | 0.02 |
| Co | 24.63 | 24.5 | 20 | 20 | 20 | 20 | 20 | 20 |
| Hf | 0 | 0 | 0 | 0 | 0 | 0 | 0 | 0 |
| B | 0.004 | 0.004 | 0.004 | 0.004 | 0.004 | 0.004 | 0.004 | 0.004 |
| O | 0.002 | 0.002 | 0.002 | 0.002 | 0.002 | 0.002 | 0.002 | 0.002 |

TABLE 3c-2

Selection of alloy analyses HT1, HT2, HT1-a and HT2-a with 20% Co or 24.5% Co and Al contents of 3.0% or 3.8% respectively and analyses of the reference no. 420420 and 1).

| Variant | 420420 | 1 | HT1 | HT2 | HT1-a | HT2-a |
|---|---|---|---|---|---|---|
| C | 0.021 | 0.021 | 0.021 | 0.021 | 0.021 | 0.021 |
| S | 0.0005 | 0.0005 | 0.0005 | 0.0005 | 0.0005 | 0.0005 |
| N | 0.008 | 0.008 | 0.008 | 0.008 | 0.008 | 0.008 |
| Cr | 17.75 | 18 | 18 | 18 | 18 | 18 |
| Ni | 45.96 | 46.018 | 49.718 | 48.918 | 45.218 | 44.418 |
| Mn | 0.018 | 0.018 | 0.018 | 0.018 | 0.018 | 0.018 |
| Si | 0.065 | 0.065 | 0.065 | 0.065 | 0.065 | 0.065 |
| Mo | 2.94 | 3 | 3 | 3 | 3 | 3 |
| Ti | 0.31 | 0.3 | 0.3 | 0.3 | 0.3 | 0.3 |
| Nb | 5.41 | 5.4 | 5.4 | 5.4 | 5.4 | 5.4 |
| Ta | 0.01 | 0.01 | 0.01 | 0.01 | 0.01 | 0.01 |
| Cu | 0.01 | 0.01 | 0.01 | 0.01 | 0.01 | 0.01 |
| Fe | 0.67 | 0.43 | 0.43 | 0.43 | 0.43 | 0.43 |
| P | 0.011 | 0.011 | 0.011 | 0.011 | 0.011 | 0.011 |
| Al | 2.16 | 2.2 | 3 | 3.8 | 3 | 3.8 |
| Mg | 0.0008 | 0.0008 | 0.0008 | 0.0008 | 0.0008 | 0.0008 |
| Ca | 0.0004 | 0.004 | 0.004 | 0.004 | 0.004 | 0.004 |
| V | 0.002 | 0.002 | 0.002 | 0.002 | 0.002 | 0.002 |
| Zr | 0.002 | 0.002 | 0.002 | 0.002 | 0.002 | 0.002 |
| W | 0.02 | 0.02 | 0.02 | 0.02 | 0.02 | 0.02 |

TABLE 3c-2-continued

Selection of alloy analyses HT1, HT2, HT1-a and HT2-a with 20% Co or 24.5% Co and Al contents of 3.0% or 3.8% respectively and analyses of the reference no. 420420 and 1).

| Variant | 420420 | 1 | HT1 | HT2 | HT1-a | HT2-a |
|---|---|---|---|---|---|---|
| Co | 24.63 | 24.5 | 20 | 20 | 24.5 | 24.5 |
| Hf | 0 | 0 | 0 | 0 | 0 | 0 |
| B | 0.004 | 0.004 | 0.004 | 0.004 | 0.004 | 0.004 |
| O | 0.002 | 0.002 | 0.002 | 0.002 | 0.002 | 0.002 |

TABLE 3d-1

Calculated phase properties of the alloy analyses from Table 3c-1.

| Variant | 420420 | 1 | 8 | 9 | 10 | 11 | 36 | 37 |
|---|---|---|---|---|---|---|---|---|
| γ' sol. T-r (° C.) | 990 | 1016 | 1013 | 1040 | 989 | 956 | 1086 | 1106 |
| γ' vol. (%) at 600° C. | 26 | 29 | 29 | 35 | 24 | 20 | 45.5 | 50 |
| eta sol. T-r (° C.) | 1020 | 996 | 0 | 0 | 0 | 0 | 0 | 0 |
| eta max. vol. (%) | 2.5 | 2.8 | 0 | 0 | 0 | 0 | 0 | 0 |
| eta sol. T-r (° C.) | | 970 | 0 | 0 | 0 | 0 | 0 | 0 |
| Delta sol. T-r (° C.) | 1060 | 1014 | 1000 | 960 | 1013 | 1021 | 0 | 0 |
| Delta vol.(%) at 600° C. | 2 | 4.5 | 4.8 | 2.4 | 6.5 | 8.3 | 0 | 0 |
| sigma sol. T-r (° C.) | — | 774 | 747 | 799 | 708 | 642 | 905 | 954 |
| sigma vol.(%) at 600° C. | — | 8.6 | 6.5 | 10 | 4.3 | 1 | 17 | 21 |

TABLE 3d-2

Calculated phase properties of the alloy analyses from Table 3c-2.

| Variant | 420420 | 1 | HT1 | HT2 | HT1-a | HT2-a |
|---|---|---|---|---|---|---|
| γ' sol. T-r (° C.) | 990 | 1016 | 1061 | 1099 | 1063 | 1098 |
| γ' vol. (%) at 600° C. | 26 | 29 | 40 | 48 | 40 | 48 |
| eta sol. T-r (° C.) | 1020 | 996 | 0 | 0 | 0 | 0 |
| eta max. vol. (%) | 2.5 | 2.8 | 0 | 0 | 0 | 0 |
| eta sol. T-r (° C.) | | 970 | 0 | 0 | 0 | 0 |
| Delta sol. T-r (° C.) | 1060 | 1014 | 659 | 0 | 0 | 0 |
| Delta vol.(%) at 600° C. | 2 | 4.5 | 0.7 | 0 | 0 | 0 |
| sigma sol. T-r (° C.) | — | 774 | 852.6 | 933 | 873 | 946 |
| sigma vol.(%) at 600° C. | — | 8.6 | 13.4 | 19 | 15.8 | 21 |

TABLE 3d-3

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Tables 3c-1 and 3c-2

| Variant | 1 | 8 | 9 | 10 | 11 | 36 | 37 | HT1 | HT2 | HT1-a | HT2-a |
|---|---|---|---|---|---|---|---|---|---|---|---|
| Gamma' [%] | 31 | 28 | 34.9 | 23 | 19 | 38 | 42 | 38 | 46 | 39 | 45 |
| Gamma' [nm] | 24 | 24 | 25 | 23 | 21 | 27 | 27 | 26 | 27 | 27 | 27 |
| Rp0.2 [MPa] | | | | | | | | | | | |
| 650° C. | 871 | 856 | 933 | 852 | 796 | 971 | 1027 | 973 | 1022 | 956 | 990 |
| 700° C. | 875 | 847 | 938 | 856 | 799 | 962 | 1034 | 979 | 1029 | 970 | 997 |
| 750° C. | 848 | 806 | 914 | 828 | 762 | 911 | 999 | 950 | 994 | 940 | 963 |

TABLE 3d-3-continued

Calculated fractions and particle sizes of the gamma' precipitation phase and
values of the mechanical offset yield strength Rp0.2 in dependence on the test
temperatures of 650° C. to 900° C. after a precipitation heat treatment
of 700° C./8 h for a grain size of ASTM 4.5 of the alloy analyses from Tables 3c-1 and 3c-2

| Variant | 1 | 8 | 9 | 10 | 11 | 36 | 37 | HT1 | HT2 | HT1-a | HT2-a |
|---|---|---|---|---|---|---|---|---|---|---|---|
| 800° C. | 690 | 608 | 701 | 580 | 518 | 806 | 914 | 765 | 885 | 833 | 925 |
| 850° C. | 474 | 414 | 497 | 402 | 352 | 555 | 645 | 544 | 627 | 578 | 654 |
| 900° C. | 328 | 278 | 356 | 275 | 228 | 386 | 470 | 394 | 457 | 412 | 467 |

Also from the values of Table 3d-3, it is evident that the fraction of gamma' phase increases with increasing Al contents; at the same time, the particle size increases slightly. The offset yield strength Rp0.2 also increases with increasing Al content of the alloy, i.e. with increasing fraction of gamma' phase. Beyond this, it is also evident here from the variation of the Rp0.2 values in dependence on the test temperature that, for the alloys 36, 37, HT1, HT2, HT1-a and HT2-a, i.e. with the higher Al contents of 3% to 4%, the steeper decrease of Rp0.2 occurring at higher test temperatures is shifted in the direction of a higher test temperature around 800° C. For the alloys with a lower Al content, the steeper decrease of Rp0.2 is already evident at a lower test temperature around 750° C. The results for the precipitation heat treatment of 700° C./8 h are listed in Table 3d-3.

TABLE 3d-4

Calculated fractions and particle sizes of the gamma' precipitation phase and
values of the mechanical offset yield strength Rp0.2 in dependence on the test
temperatures of 650° C. to 900° C. after a precipitation heat treatment
of 850° C./8 h for a grain size of ASTM 4.5 of the alloy analyses from Tables 3c-1 and 3c-2.

| Variant | 1 | 8 | 9 | 10 | 11 | 36 | 37 | HT1 | HT2 | HT1-a | HT2-a |
|---|---|---|---|---|---|---|---|---|---|---|---|
| Gamma' [%] | 25 | 22 | 29.3 | 17 | 12 | 33 | 42 | 33 | 41 | 33 | 40 |
| Gamma' [nm] | 45 | 45 | 45 | 45 | 45 | 45 | 45 | 44 | 45 | 45 | 46 |
| Rp0.2 [MPa] | | | | | | | | | | | |
| 650° C. | 896 | 878 | 987 | 811 | 724 | 1130 | 1197 | 1072 | 1190 | 1048 | 1152 |
| 700° C. | 886 | 863 | 975 | 801 | 716 | 1112 | 1204 | 1059 | 1178 | 1036 | 1149 |
| 750° C. | 852 | 761 | 874 | 684 | 591 | 1079 | 1188 | 976 | 1160 | 1022 | 1134 |
| 800° C. | 643 | 579 | 671 | 524 | 452 | 822 | 927 | 750 | 891 | 796 | 939 |
| 850° C. | 502 | 453 | 532 | 414 | 357 | 642 | 740 | 596 | 710 | 622 | 735 |
| 900° C. | 348 | 312 | 383 | 280 | 228 | 458 | 553 | 437 | 530 | 453 | 541 |

After the precipitation heat treatment of 850° C./8 h, the fractions of gamma' phase are again smaller than after the precipitation heat treatment of 700° C./8 h, and the precipitated particles of the gamma' phase are larger (the associated data are listed in Table 3d-4). The positive effect of the larger particle size on the offset yield strength Rp0.2 outweighs the negative effect of the smaller phase fraction. The level of the values of the offset yield strength Rp0.2 is significantly higher after the precipitation heat treatment of 850° C./8 h than after the annealing of 700° C./8 h.

After a longer annealing duration of 24 h at the precipitation temperature of 850° C., the level of the values of the offset yield strength Rp0.2 is significantly lower than after the annealing duration of 8 h at the same precipitation annealing temperature of 850° C. Apparently the coarser particle size of the gamma' phase is responsible for this. These results data are listed in Table 3d-5 for the grain size of ASTM 4.5.

TABLE 3d-5

Calculated fractions and particle sizes of the gamma' precipitation phase and
values of the mechanical offset yield strength Rp0.2 in dependence on the test
temperatures of 650° C. to 900° C. after a precipitation heat treatment
of 850° C./24 h for a grain size of ASTM 4.5 of the alloy analyses from Tables 3c-1 and 3c-2.

| Variant | 1 | 8 | 9 | 10 | 11 | 36 | 37 | HT1 | HT2 | HT1-a | HT2-a |
|---|---|---|---|---|---|---|---|---|---|---|---|
| Gamma' [%] | 25 | 22 | 29.3 | 20 | 12 | 33 | 42 | 33 | 41 | 32 | 40 |
| Gamma' [nm] | 64 | 63 | 62 | 64 | 64 | 62 | 62 | 61 | 62 | 63 | 64 |

TABLE 3d-5-continued

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Tables 3c-1 and 3c-2.

| Variant | 1 | 8 | 9 | 10 | 11 | 36 | 37 | HT1 | HT2 | HT1-a | HT2-a |
|---|---|---|---|---|---|---|---|---|---|---|---|
| Rp0.2 [MPa] | | | | | | | | | | | |
| 650° C. | 807 | 794 | 921 | 731 | 656 | 1029 | 1108 | 971 | 1083 | 948 | 1055 |
| 700° C. | 797 | 781 | 909 | 722 | 648 | 1011 | 1095 | 960 | 1070 | 937 | 1042 |
| 750° C. | 787 | 734 | 897 | 658 | 568 | 990 | 1080 | 941 | 1055 | 924 | 1028 |
| 800° C. | 613 | 553 | 711 | 498 | 430 | 786 | 884 | 715 | 850 | 761 | 899 |
| 850° C. | 473 | 428 | 549 | 389 | 335 | 612 | 698 | 561 | 670 | 588 | 695 |
| 900° C. | 324 | 291 | 357 | 259 | 212 | 442 | 516 | 407 | 494 | 423 | 506 |

Figure 4:
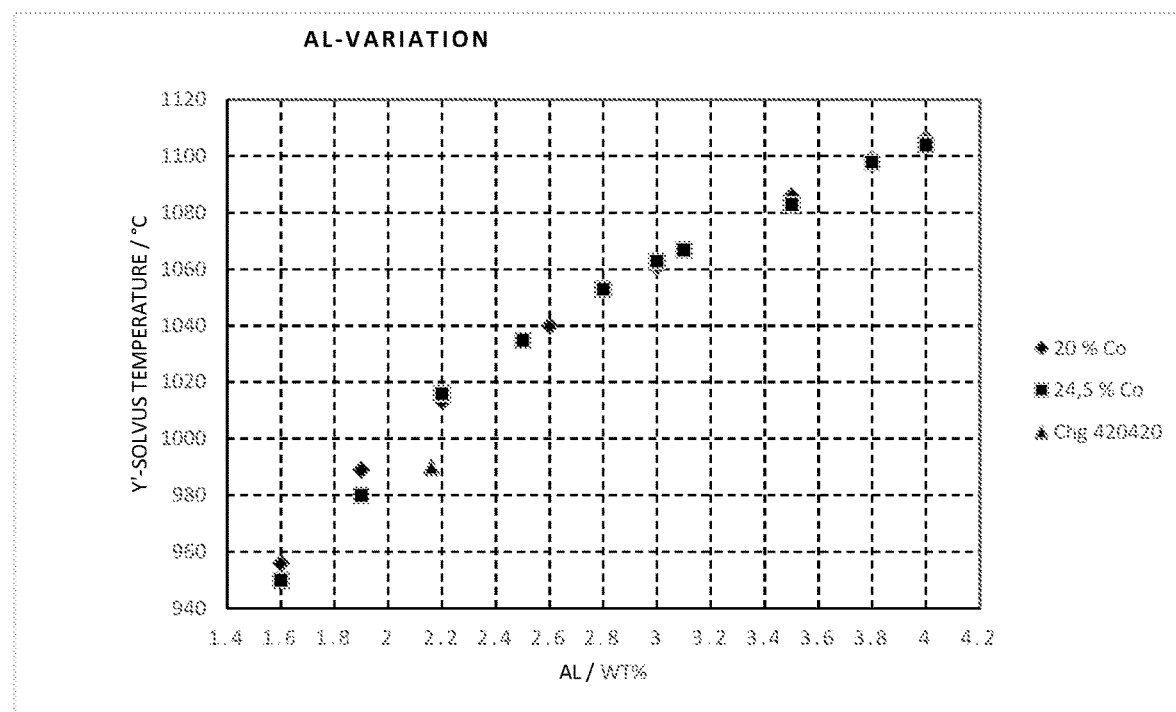
FIG. 4 is a diagram (Diagram 3) showing calculated γ' solvus temperatures of the alloy analyses from Tables 3a to 3d in dependence on the Al contents.

The calculated gamma' solvus temperatures of the alloy analyses from Tables 3a to 3d are plotted in FIG. 4 (Diagram 3) in dependence on the Al contents.

From this it is evident that, in the case of the reference alloy of batch 420420 with 2.16% Al, the γ' solvus temperature can be increased, starting from 1009° C., to 1105° C., when the Al content is increased to 4.0% Al.

Figure 5:
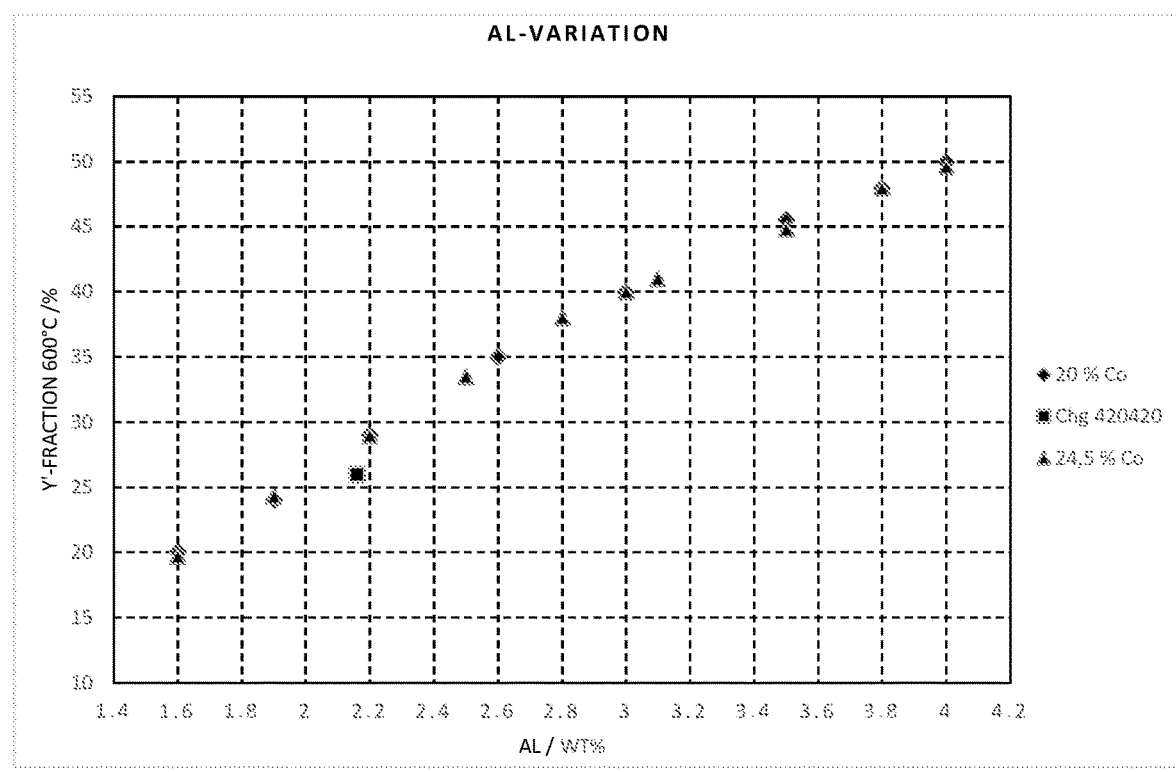
FIG. 5 is a diagram (Diagram 4) showing calculated gamma' fractions 600° C. (in wt %) of the alloy analyses from Tables 3a to 3d in dependence on the Al contents.

From this it is evident that, in the case of the reference alloy of batch 420420 with 2.16% Al, the gamma' fraction at 600° C. can be increased, starting from 25.3%, to approximately 47.7%, when the Al content is increased to 4.0% Al (see FIG. 5 (Diagram 4)).

From Tables 3a to 3d, it is evident that, with increase of the Al content, the γ' phase is stabilized: not only can the solvus temperature be increased to 1106° C. but also the volume fractions can be increased to 50%. Moreover, it can be inferred that Al at higher contents is able to destabilize the delta phase. With simultaneously high Co and Nb contents in combination with moderate Al contents, the delta phase is massively stabilized. As an example, alloy 19 may be considered in comparison with alloy 939. Alloy 939 exhibits the γ' solvus temperature at 1110° C. with max. γ' volume fraction at approximately 39.5%. The sigma phase is precipitated at 870° C. with the volume fraction of 15% at 600° C. The favorable combination of the alloy composition of alloy 19 permits the γ' solvus temperature up to 1067° C. to be achieved with volume fraction increased slightly to 41%. The reduction of the solvus temperature of the γ' phase improves the processability of the alloy enormously; moreover, the crack tendency is noticeably smaller while the mechanical properties are at least unchanged. Moreover, by virtue of lower Ti content, alloy 19 exhibits better oxidation resistance than alloy 939.

In alloy 19, the sigma solvus temperature is raised by 11° C. together with 1% increase of the volume fraction on the basis of high Co and Cr contents in comparison with alloy 939. In general, the sigma phase exhibits a very slow precipitation kinetic by reason of the incoherence, and so this phase was not present in the reference alloy 420420 even after high-temperature aging tests over 2000 h at 800° C. In alloy 1, which in the present work has an almost identical composition, the sigma phase shows its solvus temperature at 774° C. together with the volume fraction of 8.6% at 600° C. If the thermodynamic stability range of the sigma phase is shifted to higher temperatures, countermeasures such as adapted heat treatments may well be necessary.

In Table 3d-6, three selected chemical compositions are listed that were generated as laboratory heats. The analysis designated with LB 250756 contains 2.1% Al. The two further analyses LB 250757 and LB 250760 contain approximately 3% and 3.8% Al respectively.

TABLE 3d-6

Analyses of the alloys LB 250756, LB 250757 and LB 250760

| Variant | LB 250756 | LB 250757 | LB 250760 |
|---|---|---|---|
| C | 0.022 | 0.020 | 0.019 |
| S | 0.0016 | 0.0010 | 0.0014 |
| N | 0.003 | 0.003 | 0.003 |
| Cr | 18.15 | 18.08 | 17.90 |
| Ni | 45.86 | 45.12 | 44.54 |
| Mn | <0.01 | <0.01 | 0.018 |
| Si | 0.07 | 0.03 | 0.01 |
| Mo | 2.97 | 2.95 | 2.96 |
| Ti | 0.27 | 0.31 | 0.31 |
| Nb | 5.44 | 5.37 | 5.39 |
| Ta | | | |
| Cu | <0.01 | <0.01 | <0.01 |
| Fe | 0.09 | 0.11 | 0.10 |
| P | 0.01 | 0.013 | 0.013 |
| Al | 2.10 | 2.99 | 3.78 |
| Mg | 0.0005 | 0.0005 | 0.0005 |
| Ca | | | |
| V | <0.01 | <0.01 | <0.01 |
| Zr | <0.01 | <0.01 | <0.01 |
| W | <0.01 | 0.01 | 0.01 |
| Co | 24.95 | 24.94 | 24.91 |
| Hf | 0 | 0 | 0 |
| B | 0.005 | 0.004 | 0.004 |
| O | 0.002 | 0.002 | 0.002 |

In Tables 3d-7 to 3d-18, the values of the fraction and of the particle size of the gamma' phase calculated for these analyses are listed, as are those of the test-temperature-dependent offset yield strengths Rp0.2 after the precipitation heat treatments of 650° C./8 h, 700° C./8 h, 750° C./8 h, 800° C./8 h, 850° C./8 h and 900° C./8 h for the grain sizes of ASTM 4.5 and ASTM 12. At some precipitation annealing temperatures, the results for the two additional annealing durations of 16 h and 24 h are included.

TABLE 3d-7

Calculated fractions and particle sizes of the gamma' precipitation phase and values of the mechanical offset yield strength Rp0.2 in dependence on the test temperatures of 650° C. to 900° C. after a precipitation heat treatment of 650° C./8 h for a grain size of ASTM 4.5 of the alloy analyses from Table 3d-6.

| | Precipitation hardening temperature 650° C./8 h | | |
|---|---|---|---|
| Variant | LB 250756 | LB 250757 | LB 250760 |
| Gamma' [%] | 27 | 39 | 46 |
| Gamma' [nm] | 24 | 26 | 27 |

TABLE 3d-7-continued

Calculated fractions and particle sizes of the gamma' precipitation phase and values of the mechanical offset yield strength Rp0.2 in dependence on the test temperatures of 650° C. to 900° C. after a precipitation heat treatment of 650° C./8 h for a grain size of ASTM 4.5 of the alloy analyses from Table 3d-6.

| | Precipitation hardening temperature 650° C./8 h | | |
|---|---|---|---|
| Variant | LB 250756 | LB 250757 | LB 250760 |
| Rp0.2 [MPa] | | | |
| 650° C. | 880 | 975 | 1026 |
| 700° C. | 861 | 951 | 995 |
| 750° C. | 835 | 921 | 962 |
| 800° C. | 680 | 839 | 924 |
| 850° C. | 465 | 579 | 794 |
| 900° C. | 319 | 410 | 469 |

TABLE 3d-8

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 3d-6.

| | Precipitation hardening temperature 700° C./8 h | | |
|---|---|---|---|
| Variant | LB 250756 | LB 250757 | LB 250760 |
| Gamma' [%] | 31 | 38 | 45 |
| Gamma' [nm] | 23 | 26 | 27 |
| Rp0.2 [MPa] | | | |
| 650° C. | 844 | 949 | 993 |
| 700° C. | 848 | 955 | 1000 |
| 750° C. | 823 | 925 | 967 |
| 800° C. | 677 | 840 | 929 |
| 850° C. | 462 | 580 | 795 |
| 900° C. | 317 | 411 | 471 |

TABLE 3d-9

Calculated fractions and particle sizes of the gamma' precipitation phase and values of the mechanical offset yield strength Rp0.2 in dependence on the test temperatures of 650° C. to 900° C. after a precipitation heat treatment of 750° C./8 h for a grain size of ASTM 4.5 of the alloy analyses from Table 3d-6.

| | Precipitation hardening temperature 750° C./8 h | | |
|---|---|---|---|
| Variant | LB 250756 | LB 250757 | LB 250760 |
| Gamma' [%] | 29 | 37 | 44 |
| Gamma' [nm] | 24 | 27 | 28 |
| Rp0.2 [MPa] | | | |
| 650° C. | 840 | 940 | 980 |
| 700° C. | 844 | 945 | 987 |
| 750° C. | 845 | 947 | 990 |
| 800° C. | 684 | 847 | 950 |
| 850° C. | 468 | 587 | 803 |
| 900° C. | 321 | 417 | 477 |

TABLE 3d-10

Calculated fractions and particle sizes of the gamma' precipitation phase and values of the mechanical offset yield strength Rp0.2 in dependence on the test temperatures of 650° C. to 900° C. after a precipitation heat treatment of 800° C./8 h or 16 h and 24 h for a grain size of ASTM 4.5 of the alloy analyses from Table 3d-6.

| | Precipitation hardening temperature | | | | |
|---|---|---|---|---|---|
| | 800° C. | | | | |
| | 8 h | | | 16 h | 24 h |
| Variant | LB 250756 | LB 250757 | LB 250760 | LB 250756 | LB 250756 |
| Gamma' [%] | 27 | 36 | 42 | 23 | 23 |
| Gamma' [nm] | 30 | 31 | 32 | 35 | 39 |
| Rp0.2 [MPa] | | | | | |
| 650° C. | 898 | 974 | 1015 | 959 | 983 |
| 700° C. | 902 | 979 | 1022 | 963 | 971 |
| 750° C. | 902 | 980 | 1024 | 963 | 959 |
| 800° C. | 715 | 872 | 1022 | 735 | 730 |
| 850° C. | 495 | 609 | 829 | 513 | 505 |
| 900° C. | 343 | 436 | 500 | 356 | 349 |

TABLE 3d-11

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h or 16 h and 24 h for a grain size of ASTM 4.5 of the alloy analyses from Table 3d-6.

| | Precipitation hardening temperature 850° C./8 h | | | 16 h | 24 h | 16 h | 24 h |
|---|---|---|---|---|---|---|---|
| | LB | LB | LB | LB | LB | LB | LB |
| Variant | 250756 | 250757 | 250760 | 250757 | 250757 | 250760 | 250760 |
| Gamma' [%] | 24 | 33 | 32 | 33 | 31 | 40 | 40 |
| Gamma' [nm] | 45 | 45 | 46 | 55 | 62 | 56 | 64 |
| Rp0.2 [MPa] | | | | | | | |
| 650° C. | 875 | 1056 | 1167 | 995 | 959 | 1104 | 1060 |
| 700° C. | 865 | 1044 | 1156 | 983 | 948 | 1091 | 1048 |
| 750° C. | 835 | 1030 | 1141 | 970 | 935 | 1077 | 1033 |
| 800° C. | 630 | 814 | 1123 | 793 | 780 | 1060 | 1017 |
| 850° C. | 490 | 634 | 880 | 613 | 601 | 856 | 839 |
| 900° C. | 336 | 456 | 544 | 438 | 427 | 522 | 508 |

TABLE 3d-12

Calculated fractions and particle sizes of the gamma' precipitation phase and values of the mechanical offset yield strength Rp0.2 in dependence on the test temperatures of 650° C. to 900° C. after a precipitation heat treatment of 900° C./8 h for a grain size of ASTM 4.5 of the alloy analyses from Table 3d-6.

| | Precipitation hardening temperature 900° C./8 h | | |
|---|---|---|---|
| Variant | LB 250756 | LB 250757 | LB 250760 |
| Gamma' [%] | 19 | 28 | 37 |
| Gamma' [nm] | 73 | 72 | 74 |
| Rp0.2 [Mpa] | | | |
| 650° C | 677 | 854 | 959 |
| 700° C. | 696 | 844 | 948 |
| 750° C. | 660 | 832 | 935 |
| 800° C. | 492 | 667 | 788 |
| 850° C. | 378 | 514 | 610 |
| 900° C. | 300 | 411 | 490 |

TABLE 3d-13

Calculated fractions and particle sizes of the gamma' precipitation phase and values of the mechanical offset yield strength Rp0.2 in dependence on the test temperatures of 650° C. to 900° C. after a precipitation heat treatment of 650° C./8 h for a grain size of ASTM 12 of the alloy analyses from Table 3d-6.

| | Precipitation hardening temperature 650° C./8 h | | |
|---|---|---|---|
| Variant | LB 250756 | LB 250757 | LB 250760 |
| Gamma' [%] | 32 | 39 | 46 |
| Gamma' [nm] | 24 | 26 | 27 |
| Rp0.2 [MPa] | | | |
| 650° C. | 928 | 1023 | 1074 |
| 700° C. | 909 | 999 | 1042 |
| 750° C. | 883 | 969 | 1009 |
| 800° C. | 680 | 839 | 971 |
| 850° C. | 465 | 579 | 793 |
| 900° C. | 319 | 410 | 469 |

TABLE 3d-14

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 12 of the alloy analyses from Table 3d-6.

| | Precipitation hardening temperature 700° C./8 h | | |
|---|---|---|---|
| Variant | LB 250756 | LB 250757 | LB 250760 |
| Gamma' [%] | 31 | 38 | 45 |
| Gamma' [nm] | 23 | 26 | 27 |
| Rp0.2 [MPa] | | | |
| 650° C. | 893 | 997 | 1041 |
| 700° C. | 897 | 1002 | 1048 |
| 750° C. | 871 | 973 | 1015 |
| 800° C. | 677 | 840 | 976 |
| 850° C. | 462 | 580 | 795 |
| 900° C. | 317 | 411 | 471 |

TABLE 3d-15

Calculated fractions and particle sizes of the gamma' precipitation phase and values of the mechanical offset yield strength Rp0.2 in dependence on the test temperatures of 650° C. to 900° C. after a precipitation heat treatment of 750° C./8 h for a grain size of ASTM 12 of the alloy analyses from Table 3d-6.

| | Precipitation hardening temperature 750° C./8 h | | |
|---|---|---|---|
| Variant | LB 250756 | LB 250757 | LB 250760 |
| Gamma' [%] | 29 | 37 | 44 |
| Gamma' [nm] | 24 | 27 | 28 |
| Rp0.2 [MPa] | | | |
| 650° C. | 888 | 988 | 1028 |
| 700° C. | 892 | 993 | 1035 |
| 750° C. | 892 | 995 | 1037 |
| 800° C. | 684 | 847 | 997 |
| 850° C. | 468 | 587 | 803 |
| 900° C. | 322 | 417 | 477 |

TABLE 3d-16

Calculated fractions and particle sizes of the gamma' precipitation phase and values of the mechanical offset yield strength Rp0.2 in dependence on the test temperatures of 650° C. to 900° C. after a precipitation heat treatment of 800° C./8 h or 16 h and 24 h for a grain size of ASTM 12 of the alloy analyses from Table 3d-6.

| | Precipitation hardening temperature | | | | |
|---|---|---|---|---|---|
| | 800° C./8 h | | | 16 h | 24 h |
| Variant | LB 250756 | LB 250757 | LB 250760 | LB 250756 | LB 250756 |
| Gamma' [%] | 27 | 36 | 42 | 27 | 23 |
| Gamma' [nm] | 30 | 31 | 32 | 35 | 39 |
| Rp0.2 [MPa] | | | | | |
| 650° C. | 947 | 1021 | 1063 | 1007 | 1031 |
| 700° C. | 950 | 1027 | 1069 | 1011 | 1020 |
| 750° C. | 950 | 1028 | 1071 | 973 | 971 |
| 800° C. | 715 | 872 | 1069 | 735 | 730 |
| 850° C. | 495 | 609 | 828 | 513 | 505 |
| 900° C. | 343 | 436 | 500 | 356 | 349 |

TABLE 3d-17

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h or 16 h and 24 h for a grain size of ASTM 12 of the alloy analyses from Table 3d-6.

| | Precipitation hardening temperature 850° C./8 h | | | 16 h | 24 h | 16 h | 24 h |
|---|---|---|---|---|---|---|---|
| | LB | LB | LB | LB | LB | LB | LB |
| Variant | 250756 | 250757 | 250760 | 250757 | 250757 | 250760 | 250760 |
| Gamma' [%] | 24 | 33 | 40 | 33 | 31 | 40 | 32 |
| Gamma' [nm] | 45 | 45 | 46 | 55 | 62 | 56 | 64 |
| Rp0.2 [MPa] | | | | | | | |
| 650° C. | 924 | 1104 | 1214 | 1043 | 1007 | 1152 | 1108 |
| 700° C. | 913 | 1091 | 1203 | 1031 | 995 | 1139 | 1095 |
| 750° C. | 835 | 1077 | 1188 | 1017 | 982 | 1124 | 1080 |
| 800° C. | 630 | 814 | 1155 | 793 | 780 | 1107 | 1064 |
| 850° C. | 490 | 634 | 880 | 613 | 601 | 856 | 839 |
| 900° C. | 363 | 456 | 544 | 438 | 427 | 522 | 508 |

TABLE 3d-18

Calculated fractions and particle sizes of the gamma' precipitation phase and values of the mechanical offset yield strength Rp0.2 in dependence on the test temperatures of 650° C. to 900° C. after a precipitation heat treatment of 900° C./8 h for a grain size of ASTM 12 of the alloy analyses from Table 3d-6.

| | Precipitation hardening temperature 900° C./8 h | | |
|---|---|---|---|
| Variant | LB 250756 | LB 250757 | LB 250760 |
| Gamma' [%] | 19 | 30 | 37 |
| Gamma' [nm] | 73 | 72 | 74 |
| Rp0.2 [MPa] | | | |
| 650° C. | 725 | 902 | 1007 |
| 700° C. | 717 | 891 | 995 |
| 750° C. | 661 | 880 | 982 |
| 800° C. | 492 | 667 | 788 |
| 850° C. | 378 | 514 | 610 |
| 900° C. | 300 | 411 | 490 |

From the tables, it can be inferred that the offset yield strength Rp0.2 is greater the higher the Al content of the alloy analysis. Beyond that, the steeper decrease of the offset yield strength Rp0.2 is shifted to a test temperature that is higher the higher the Al content. These effects are associated on the one hand with the higher fraction of the gamma' phase with increasing Al content (for optimum particle size of the gamma' phase) and on the other hand with the higher solvus temperature of the gamma' phase with increasing Al content.

In the alloy LB 250756, which contains 2.1% Al, the maximum of the offset yield strength Rp0.2 for the precipitation temperatures under consideration lies at the precipitation annealing temperature of 800° C. (considered in comparison with the annealing duration of 8 h). In the two other alloys LB 250757 and LB 250760, which contain 3% and 3.8% Al respectively, the maximum of the offset yield strength Rp0.2 lies at the precipitation annealing temperature of 850° C. At the precipitation annealing temperature of 900° C. considered additionally here, the values of the offset yield strength Rp0.2 are lower, i.e. the precipitation annealing temperature that is optimum for highest values of the offset yield strength Rp0.2 has been exceeded here (nevertheless, a precipitation annealing temperature above 850° C. could also be favorable and practical for other mechanical properties).

In comparison with the grain sizes under consideration, it can be inferred from the tables that, in the case of the finer grain size of ASTM 12, significantly larger values of the offset yield strength Rp0.2 exist than for the coarser grain size of ASTM 4.5.

In the case of the alloy LB 250756, which contains 2.1% Al, and for which the maximum of the offset yield strength Rp0.2 occurs after the precipitation annealing temperature at 8 h under consideration, it is evident that the values of the offset yield strength Rp0.2 increase during the longer annealing durations of 16 h and 24 h (see Tables 3d-10 and 3d-16). In contrast, the values of the offset yield strength Rp0.2 decrease with longer annealing durations of 16 h and 24 h for the precipitation annealing temperature of 850° C. under consideration in the case of the two alloys LB 250757 and LB 250760.

Alloys with a maximum Al content of 4% are considered. For alloys with an Al content of greater than 4%, the risk increases so much that the welding and solidification behavior is so negatively influenced that both the processes of the additive printing methods and of the subsequent heat treatments may lead to considerable defect sites, i.e. cracks, in the microstructure.

Figure 6:
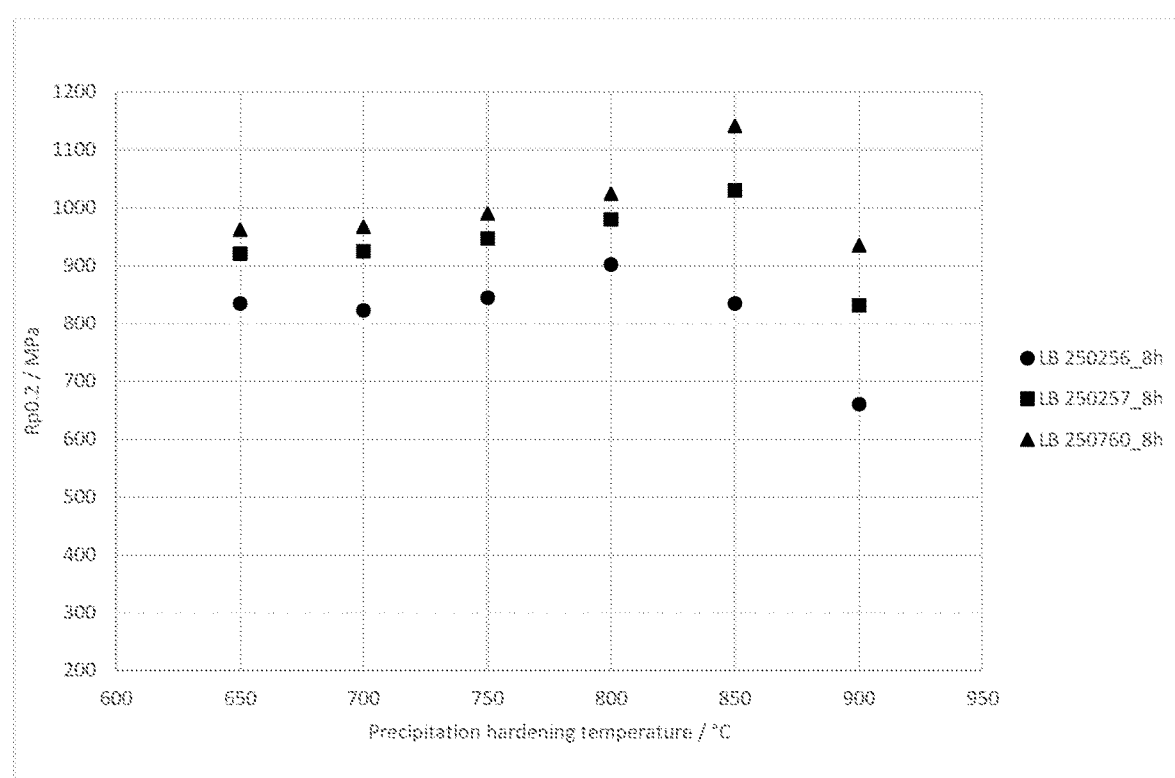
FIG. 6 is a diagram (Diagram 4a) showing calculated values of the mechanical offset yield strength Rp0.2 in dependence on the precipitation-hardening temperatures of 650° C. to 900° C. after 8 h at a test temperature of 750° C. for a grain size of ASTM 4.5 of the alloy analyses from Table 3d-6.

FIG. 6 (Diagram 4a) shows that the maximum of the offset yield strength Rp0.2 to be attained is shifted to higher precipitation-hardening temperatures with increasing Al content. Whereas the highest offset yield strength Rp0.2 is reached at an Al content of 2.1% (LB 250256) for a precipitation-hardening temperature of 800° C., a precipitation-hardening temperature of 850° C. serves for the highest value at the temperatures considered here at an Al content of 3% and 3.8%. At a temperature of 900° C., the values of the offset yield strength Rp0.2 decrease again for all three compositions. However, it cannot be ruled out that a temperature between 850 and 900° C. could lead to a further increase of the offset yield strength Rp0.2 at the higher Al contents (3% and 3.8%).

In Table 3d-19, chemical compositions of the LB 250756 and P10231, which have very similar analysis contents, are listed in comparison.

TABLE 3d-19

Analyses of the alloys LB 250756 and P10231.

| Variant | LB 250756 | P10231 |
| --- | --- | --- |
| C | 0.022 | 0.024 |
| S | 0.0016 | 0.0029 |
| N | 0.003 | 0.004 |
| Cr | 18.15 | 17.7 |
| Ni | 45.86 | 46.49 |
| Mn | <0.01 | <0.01 |
| Si | 0.07 | 0.01 |
| Mo | 2.97 | 2.96 |
| Ti | 0.27 | 0.29 |
| Nb | 5.44 | 5.42 |
| Ta | | 0.008 |
| Cu | <0.01 | <0.01 |
| Fe | 0.09 | 0.08 |
| P | 0.01 | 0.012 |
| Al | 2.10 | 2.14 |
| Mg | 0.0005 | <0.001 |
| Ca | | 0.0002 |
| V | <0.01 | <0.01 |
| Zr | <0.01 | <0.01 |
| W | <0.01 | <0.01 |
| Co | 24.95 | 24.79 |
| Hf | 0 | |
| B | 0.005 | 0.003 |
| O | 0.002 | 0.012 |

As already described in the foregoing, test-temperature-dependent values of the offset yield strength were calculated for the LB 250756 analysis. Excerpts from Table 3d-6 at test temperatures of 650° C. and 700° C. for the precipitation heat treatments of 800° C./8 h and 650° C./8 h are listed in Table 3d-20. Hot tension tests were performed at 650° C. and 700° C. on printed samples of P10231 (in the three spatial orientations of 45°, 90° and 180° C.), and in this way values of the offset yield strength Rp0.2 were measured. Before the hot tension tests, the printed samples were subjected to a two-stage precipitation heat treatment of 800° C./8 h+650° C./8 h. Even for the selected solution annealing of the samples of P10231, the microstructure exhibits a grain size of approximately ASTM 4.5. The Rp0.2 values measured for P10231 are listed for comparison in Table 3d-20.

The calculated values of the offset yield strengths Rp0.2 of LB 250756 lie on a level very similar to that of the measured Rp0.2 values of P10231.

TABLE 3d-20

Calculated values of the offset yield strength Rp0.2 for the LB 250756 analysis of Table 3d-6 at test temperatures of 650° C. and 700° C. for the precipitation annealing heat treatments of 800° C./8 h and 650° C./8 h (excerpts from tables 3d-10 and 3d-7) in comparison with measured values of the offset yield strength Rp0.2 on printed samples of P10231 of the analysis from Table 3d-19, in which a two-stage precipitation heat treatment of 800° C./8 h + 650° C./8 h was performed. Even for the selected solution annealing of the samples of P10231, the microstructure exhibits a grain size of approximately ASTM 4.5.

| | | 650° C. | | |
| --- | --- | --- | --- | --- |
| | 800° C. 8 h | 8 h | Print orientation | Rp0.2 [MPa] |
| Rp0.2 [MPa] | | Variant | | |
| | LB 250756 | LB 250756 | P10231 | P10231 |
| 650° C. | 898 | 880 | 45° | 890 |
| | | | 90° | 868 |
| | | | 180° | 895 |
| 700° C | 902 | 861 | 45° | 881 |
| | | | 90° | 840 |
| | | | 180° | 879 |

TABLE 4a

Selected alloy analyses with variation of Cr, Ni and Co contents. Tables 4a to 11c-3 contain calculated properties of the phases and mechanical yield strengths of further selected alloys.

| Variant | 420420 | 1 | 2 | 3 | 4 |
| --- | --- | --- | --- | --- | --- |
| C | 0.021 | 0.021 | 0.021 | 0.021 | 0.021 |
| S | 0.0005 | 0.0005 | 0.0005 | 0.0005 | 0.0005 |
| N | 0.008 | 0.008 | 0.008 | 0.008 | 0.008 |
| Cr | 17.75 | 18 | 16 | 20 | 20 |
| Ni | 45.96 | 46.018 | 48.018 | 44.018 | 46.018 |
| Mn | 0.018 | 0.018 | 0.018 | 0.018 | 0.018 |
| Si | 0.065 | 0.065 | 0.065 | 0.065 | 0.065 |
| Mo | 2.94 | 3 | 3 | 3 | 3 |
| Ti | 0.31 | 0.3 | 0.3 | 0.3 | 0.3 |
| Nb | 5.41 | 5.4 | 5.4 | 5.4 | 5.4 |
| Ta | 0.01 | 0.01 | 0.01 | 0.01 | 0.01 |
| Cu | 0.01 | 0.01 | 0.01 | 0.01 | 0.01 |
| Fe | 0.67 | 0.43 | 0.43 | 0.43 | 0.43 |
| P | 0.011 | 0.011 | 0.011 | 0.011 | 0.011 |
| Al | 2.16 | 2.2 | 2.2 | 2.2 | 2.2 |
| Mg | 0.0008 | 0.0008 | 0.0008 | 0.0008 | 0.0008 |
| Ca | 0.0004 | 0.004 | 0.004 | 0.004 | 0.004 |
| V | 0.002 | 0.002 | 0.002 | 0.002 | 0.002 |
| Zr | 0.002 | 0.002 | 0.002 | 0.002 | 0.002 |
| W | 0.02 | 0.02 | 0.02 | 0.02 | 0.02 |

TABLE 4a-continued

Selected alloy analyses with variation of Cr, Ni and Co contents. Tables 4a to 11c-3 contain calculated properties of the phases and mechanical yield strengths of further selected alloys.

| Variant | 420420 | 1 | 2 | 3 | 4 |
|---|---|---|---|---|---|
| Co | 24.63 | 24.5 | 24.5 | 24.5 | 22.5 |
| Hf | 0 | 0 | 0 | 0 | 0 |
| B | 0.004 | 0.004 | 0.004 | 0.004 | 0.004 |
| O | 0.002 | 0.002 | 0.002 | 0.002 | 0.002 |

TABLE 4b

Calculated properties of the phases and alloys from Table 4a.

| Variant | 420420 | 1 | 2 | 3 | 4 |
|---|---|---|---|---|---|
| γ' sol. T-r (° C.) | 990 | 1016 | 1008 | 1010 | 1022 |
| γ' vol. (%) at 600° C. | 26 | 29 | 28 | 29 | 29 |
| eta sol. T-r (° C.) | 1020 | 996 | 1005 | 1032 | 0 |
| eta max. vol. (%) | 2.5 | 2.8 | 0.8 | 3.4 | 0 |
| eta sol. T-r (° C.) | | 970 | 985 | 958 | 0 |
| Delta sol. T-r (° C.) | 1060 | 1014 | 988 | 1119 | 1022 |
| Delta vol.(%) at 600° C. | 2 | 4.5 | 4.5 | 4.5 | 4.8 |
| sigma sol. T-r (° C.) | — | 774 | 0 | 865 | 853 |
| sigma vol.(%) at 600° C. | — | 8.6 | 0 | 16 | 15 |

It is evident from the tables that, between 16 and 20% Cr, the gamma' solvus temperature and also the gamma' fraction at 600° C. increase slightly with increasing Cr content. In addition, it will also be noted that the reduction of the Cr content destabilizes the sigma phase (see Table 4b Alloy 2)

A further effect of the Cr content that is important for the application is the improvement of the high-temperature oxidation resistance of these alloys. In experimentally performed oxidation tests at 800° C. and 900° C., the alloy analysis of the reference batch 420420 containing 17.75% Cr exhibited mass growth smaller by a factor of approximately 10 compared with the alloy named Alloy 720 L1, which contains approximately 16% Cr. With a Cr content of 20%, the oxidation resistance of the new alloys on the basis of Alloy 780 could be increased still further.

In Tables 4c-1 to 4c-3, the calculated values are listed for the fractions and particle sizes of the gamma' phase as well as for the test-temperature-dependent values of the offset yield strength Rp0.2 of the alloys from Table 4a for the precipitation heat treatments of 700° C./8 h, 850° C./8 h and 850° C./24 h for the grain size of ASTM 4.5.

TABLE 4c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 4a.

| Variant | 1 | 2 | 3 | 4 |
|---|---|---|---|---|
| Gamma' [%] | 31 | 31 | 32 | 28 |
| Gamma' [nm] | 24 | 24 | 24 | 24 |
| Rp0.2 [MPa] | | | | |
| 650° C. | 871 | 870 | 870 | 880 |
| 700° C | 875 | 874 | 875 | 884 |
| 750° C. | 848 | 847 | 847 | 857 |
| 800° C | 690 | 635 | 753 | 722 |
| 850° C. | 474 | 439 | 511 | 496 |
| 900° C | 328 | 304 | 352 | 345 |

TABLE 4c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 4a.

| Variant | 1 | 2 | 3 | 4 |
|---|---|---|---|---|
| Gamma' [%] | 25 | 23 | 26 | 26 |
| Gamma' [nm] | 45 | 46 | 44 | 44 |
| Rp0.2 [MPa] | | | | |
| 650° C. | 896 | 861 | 920 | 920 |
| 700° C | 886 | 851 | 909 | 909 |
| 750° C. | 852 | 763 | 897 | 897 |
| 800° C | 643 | 582 | 706 | 678 |
| 850° C. | 502 | 458 | 544 | 527 |
| 900° C. | 348 | 315 | 380 | 370 |

TABLE 4c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 4a.

| Variant | 1 | 2 | 3 | 4 |
|---|---|---|---|---|
| Gamma' [%] | 25 | 23 | 22 | 26 |
| Gamma' [nm] | 64 | 66 | 62 | 62 |
| Rp0.2 [MPa] | | | | |
| 650° C. | 807 | 773 | 831 | 831 |
| 700° C | 797 | 763 | 822 | 821 |
| 750° C. | 787 | 734 | 811 | 810 |
| 800° C | 613 | 553 | 676 | 649 |
| 850° C. | 472 | 430 | 516 | 498 |
| 900° C. | 324 | 292 | 355 | 345 |

From Tables 4c-1 to 4c-3, it may be inferred that the two alloys 3 and 4, which with 20% contain a higher Cr content compared with the two alloys 1 and 2, attain higher values of the offset yield strength Rp0.2.

TABLE 5a

Selected alloy analyses with variation of Ni and Co contents

| Variant | 420420 | 1 | 5 | 6 | 7 | 8 | 16 |
|---|---|---|---|---|---|---|---|
| C | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 |
| Cr | 17.75 | 18 | 18 | 18 | 18 | 18 | 18 |
| Ni | 45.96 | 46.018 | 48.018 | 55.518 | 53.018 | 50.518 | 43.018 |
| Mn | 0.018 | 0.018 | 0.018 | 0.018 | 0.018 | 0.018 | 0.018 |
| Si | 0.065 | 0.065 | 0.065 | 0.065 | 0.065 | 0.065 | 0.065 |
| Mo | 2.94 | 3 | 3 | 3 | 3 | 3 | 3 |
| Ti | 0.31 | 0.3 | 0.3 | 0.3 | 0.3 | 0.3 | 0.3 |
| Nb | 5.41 | 5.4 | 5.4 | 5.4 | 5.4 | 5.4 | 5.4 |
| Ta | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 |
| P | 0.011 | 0.011 | 0.011 | 0.011 | 0.011 | 0.011 | 0.011 |
| Al | 2.16 | 2.2 | 2.2 | 2.2 | 2.2 | 2.2 | 2.2 |
| Mg | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 |
| V | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 |
| W | 0.02 | 0.02 | 0.02 | 0.02 | 0.02 | 0.02 | 0.02 |
| Co | 24.63 | 24.5 | 22.5 | 15 | 17.5 | 20 | 27.5 |
| Hf | 0 | 0 | 0 | 0 | 0 | 0 | 0 |
| B | 0.004 | 0.004 | 0.004 | 0.004 | 0.004 | 0.004 | 0.004 |
| O | 0.002 | 0.002 | 0.002 | 0.002 | 0.002 | 0.002 | 0.002 |

TABLE 5b

Calculated properties of the phases and alloys from Table 5a.

| Variant | 420420 | 1 | 5 | 6 | 7 | 8 | 16 |
|---|---|---|---|---|---|---|---|
| γ' sol. T-r (° C.) | 990 | 1016 | 1015 | 1005 | 1010 | 1013 | 944 |
| γ' vol. (%) at 600° C. | 26 | 29 | 29 | 29 | 29 | 29 | 29 |
| eta sol. T-r (° C.) | 1020 | 996 | 0 | 0 | 0 | 0 | 1048 |
| eta max. vol. (%) | 2.5 | 2.8 | 0 | 0 | 0 | 0 | 14.5 |
| eta sol. T-r (° C.) | | 970 | 0 | 0 | 0 | 0 | 770 |
| Delta sol. T-r (° C.) | 1060 | 1014 | 1007 | 985 | 992 | 1000 | 932 |
| Delta vol.(%) at 600° C. | 2 | 4.5 | 4.6 | 4.8 | 5 | 4.8 | 3.8 |
| sigma sol. T-r (° C.) | — | 774 | 763 | 705 | 720 | 747 | 788 |
| sigma vol.(%) at 600° C. | — | 8.6 | 7.7 | 4.8 | 6.2 | 6.5 | 10 |

TABLE 5b

Calculated properties of the phases and alloys from Table 5a.

| Variant | 420420 | 1 | 5 | 6 | 7 | 8 | 16 |
|---|---|---|---|---|---|---|---|
| γ' sol. T-r (° C.) | 990 | 1016 | 1015 | 1005 | 1010 | 1013 | 944 |
| γ' vol. (%) at 600° C. | 26 | 29 | 29 | 29 | 29 | 29 | 29 |
| eta sol. T-r (° C.) | 1020 | 996 | 0 | 0 | 0 | 0 | 1048 |
| eta max. vol. (%) | 2.5 | 2.8 | 0 | 0 | 0 | 0 | 14.5 |
| eta sol. T-r (° C.) | | 970 | 0 | 0 | 0 | 0 | 770 |
| Delta sol. T-r (° C.) | 1060 | 1014 | 1007 | 985 | 992 | 1000 | 932 |
| Delta vol.(%) at 600° C. | 2 | 4.5 | 4.6 | 4.8 | 5 | 4.8 | 3.8 |
| sigma sol. T-r (° C.) | — | 774 | 763 | 705 | 720 | 747 | 788 |
| sigma vol.(%) at 600° C. | — | 8.6 | 7.7 | 4.8 | 6.2 | 6.5 | 10 |

From Tables 5a and 5b, it is evident that, with reduced Co content, the gamma' solvus temperature decreases by only a few degrees Celsius, and that delta as well as sigma phase is destabilized. From the commercial viewpoint, therefore, a lower-cost new alloy on the basis of Alloy 780 is possible due to a lower metal value at reduced Co contents. Moreover, the eta phase is destabilized with reduced Co content, thus positively affecting mechanical properties at higher temperatures In Tables 5c-1 to 5c-3, the calculated values are listed for the fractions and particle sizes of the gamma' phase as well as for the test-temperature-dependent values of the offset yield strength Rp0.2 of the alloys from Table 5a for the precipitation heat treatments of 700° C./8 h, 850° C./8 h and 850° C./24 h for the grain size of ASTM 4.5.

TABLE 5c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 5a.

| Variant | 1 | 5 | 6 | 7 | 8 | 16 |
|---|---|---|---|---|---|---|
| Gamma' [%] | 31 | 31 | 31 | 31 | 31 | 31 |
| Gamma' [nm] | 24 | 24 | 24 | 24 | 24 | 24 |
| Rp0.2 [MPa] | | | | | | |
| 650° C. | 871 | 880 | 911 | 901 | 891 | 857 |
| 700° C. | 875 | 884 | 915 | 905 | 895 | 861 |
| 750° C. | 848 | 857 | 823 | 868 | 868 | 834 |
| 800° C. | 690 | 666 | 581 | 607 | 635 | 732 |
| 850° C. | 474 | 462 | 415 | 430 | 445 | 494 |
| 900° C. | 328 | 322 | 294 | 303 | 313 | 336 |

TABLE 5c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 5a.

| Variant | 1 | 5 | 6 | 7 | 8 | 16 |
|---|---|---|---|---|---|---|
| Gamma' [%] | 25 | 25 | 24 | 24 | 25 | 25 |
| Gamma' [nm] | 45 | 45 | 45 | 45 | 45 | 46 |
| Rp0.2 [MPa] | | | | | | |
| 650° C. | 896 | 894 | 874 | 881 | 895 | 889 |
| 700° C. | 886 | 884 | 864 | 870 | 885 | 879 |

TABLE 5c-2-continued

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 5a.

| Variant | 1 | 5 | 6 | 7 | 8 | 16 |
|---|---|---|---|---|---|---|
| 750° C. | 852 | 814 | 681 | 724 | 768 | 867 |
| 800° C. | 643 | 619 | 531 | 560 | 590 | 678 |
| 850° C. | 502 | 486 | 426 | 446 | 467 | 523 |
| 900° C. | 348 | 340 | 298 | 312 | 326 | 357 |

TABLE 5c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 5a.

| Variant | 1 | 5 | 6 | 7 | 8 | 16 |
|---|---|---|---|---|---|---|
| Gamma' [%] | 25 | 25 | 24 | 24 | 25 | 25 |
| Gamma' [nm] | 64 | 64 | 63 | 63 | 64 | 65 |
| Rp0.2 [MPa] | | | | | | |
| 650° C. | 807 | 805 | 789 | 796 | 805 | 803 |
| 700° C. | 797 | 795 | 780 | 786 | 796 | 793 |
| 750° C. | 787 | 784 | 653 | 696 | 738 | 783 |
| 800° C. | 613 | 589 | 503 | 532 | 560 | 649 |
| 850° C. | 472 | 457 | 399 | 419 | 438 | 495 |
| 900° C. | 324 | 315 | 276 | 290 | 302 | 334 |

Considering first of all the test temperatures of 650° C. and 700° C. in Tables 5c-1 to 5c-3, it will be seen that the values of the offset yield strength Rp0.2 hardly change within the test temperature in dependence on the Co content. In contrast, at the higher test temperatures above 700° C., it is evident that the values of the offset yield strength Rp0.2 increase with increasing Co content within any test temperature (for those alloys having an Al content of 2.2%).

In the case of alloy 6 with the Co content of 15%, which is the lowest considered here, higher values of the offset yield strength Rp0.2 can be attained in the precipitation heat treatment of 700° C./8 h; in contrast, higher values of the offset yield strength Rp0.2 are obtained during the precipitation heat treatment of 850° C./8 h for the alloy 16, which contains the highest Co content, i.e. 27.5%, among the alloys considered here.

Chemical compositions in which the Ti content varies for two different Al contents are listed in Tables 6a-1 and 6a-2.

TABLE 6a-1

Selected alloy analyses with 20% and 24.5% Co and variation of Ni and Ti contents

| Variant | 420420 | 1 | 20 | 22 | 23 | 24 | 11 | 12 | 13 | 14 | 15 |
|---|---|---|---|---|---|---|---|---|---|---|---|
| C | 0.021 | 0.021 | 0.021 | 0.021 | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 | 0.008 | 0.008 | 0.008 | 0.008 |
| Cr | 17.75 | 18 | 18 | 18 | 18 | 18 | 18 | 18 | 18 | 18 | 18 |
| Ni | 45.96 | 46.018 | 46.218 | 45.718 | 45.418 | 45.118 | 51.118 | 50.818 | 50.518 | 49.818 | 49.318 |
| Mn | 0.018 | 0.018 | 0.018 | 0.018 | 0.018 | 0.018 | 0.018 | 0.018 | 0.018 | 0.018 | 0.018 |
| Si | 0.065 | 0.065 | 0.065 | 0.065 | 0.065 | 0.065 | 0.065 | 0.065 | 0.065 | 0.065 | 0.065 |
| Mo | 2.94 | 3 | 3 | 3 | 3 | 3 | 3 | 3 | 3 | 3 | 3 |
| Ti | 0.31 | 0.3 | 0.1 | 0.6 | 0.9 | 1.2 | 0.3 | 0.6 | 0.9 | 1.6 | 2.1 |
| Nb | 5.41 | 5.4 | 5.4 | 5.4 | 5.4 | 5.4 | 5.4 | 5.4 | 5.4 | 5.4 | 5.4 |

TABLE 6a-1-continued

Selected alloy analyses with 20% and 24.5% Co and variation of Ni and Ti contents

| Variant | 420420 | 1 | 20 | 22 | 23 | 24 | 11 | 12 | 13 | 14 | 15 |
|---|---|---|---|---|---|---|---|---|---|---|---|
| Ta | 0.01 | 0.01 | 0.01 | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 | 0.43 | 0.43 | 0.43 | 0.43 |
| P | 0.011 | 0.011 | 0.011 | 0.011 | 0.011 | 0.011 | 0.011 | 0.011 | 0.011 | 0.011 | 0.011 |
| Al | 2.16 | 2.2 | 2.2 | 2.2 | 2.2 | 2.2 | 1.6 | 1.6 | 1.6 | 1.6 | 1.6 |
| Mg | 0.0008 | 0.0008 | 0.0008 | 0.0008 | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 | 0.004 | 0.004 | 0.004 | 0.004 |
| V | 0.002 | 0.002 | 0.002 | 0.002 | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 | 0.002 | 0.002 | 0.002 | 0.002 |
| W | 0.02 | 0.02 | 0.02 | 0.02 | 0.02 | 0.02 | 0.02 | 0.02 | 0.02 | 0.02 | 0.02 |
| Co | 24.63 | 24.5 | 24.5 | 24.5 | 24.5 | 24.5 | 20 | 20 | 20 | 20 | 20 |
| Hf | 0 | 0 | 0 | 0 | 0 | 0 | 0 | 0 | 0 | 0 | 0 |
| B | 0.004 | 0.004 | 0.004 | 0.004 | 0.004 | 0.004 | 0.004 | 0.004 | 0.004 | 0.004 | 0.004 |
| O | 0.002 | 0.002 | 0.002 | 0.002 | 0.002 | 0.002 | 0.002 | 0.002 | 0.002 | 0.002 | 0.002 |

TABLE 6a-2

Selected alloy analyses with variation of Ni and Ti contents

| Variant | 420420 | 1 | N3 | N4 | N5 |
|---|---|---|---|---|---|
| C | 0.021 | 0.021 | 0.021 | 0.021 | 0.021 |
| S | 0.0005 | 0.0005 | 0.0005 | 0.0005 | 0.0005 |
| N | 0.008 | 0.008 | 0.008 | 0.008 | 0.008 |
| Cr | 17.75 | 18 | 18 | 18 | 18 |
| Ni | 45.96 | 46.018 | 46.218 | 45.718 | 45.718 |
| Mn | 0.018 | 0.018 | 0.018 | 0.018 | 0.018 |
| Si | 0.065 | 0.065 | 0.065 | 0.065 | 0.065 |
| Mo | 2.94 | 3 | 3 | 3 | 3 |
| Ti | 0.31 | 0.3 | 1.0 | 2.0 | 3.0 |
| Nb | 5.41 | 5.4 | 5.4 | 5.4 | 5.4 |
| Ta | 0.01 | 0.01 | 0.01 | 0.01 | 0.01 |
| Cu | 0.01 | 0.01 | 0.01 | 0.01 | 0.01 |
| Fe | 0.67 | 0.43 | 0.43 | 0.43 | 0.43 |
| P | 0.011 | 0.011 | 0.011 | 0.011 | 0.011 |
| Al | 2.16 | 2.2 | 2.2 | 2.2 | 2.2 |
| Mg | 0.0008 | 0.0008 | 0.0008 | 0.0008 | 0.0008 |
| Ca | 0.0004 | 0.004 | 0.004 | 0.004 | 0.004 |
| V | 0.002 | 0.002 | 0.002 | 0.002 | 0.002 |
| Zr | 0.002 | 0.002 | 0.002 | 0.002 | 0.002 |
| W | 0.02 | 0.02 | 0.02 | 0.02 | 0.02 |
| Co | 24.63 | 24.5 | 24.5 | 24.5 | 24.5 |
| Hf | 0 | 0 | 0 | 0 | 0 |
| B | 0.004 | 0.004 | 0.004 | 0.004 | 0.004 |
| O | 0.002 | 0.002 | 0.002 | 0.002 | 0.002 |

From Tables 6a-1 and 6b, it is evident that both the gamma' solvus temperature and the gamma' solvus fraction at 600° C. increase with increasing Ti contents, as expected. However, higher Ti contents stabilize the eta and sigma phases at the costs of the delta and γ' phase. If the eta phase is to be destabilized or if the fraction of eta phase is to be kept as small as possible, the Ti content should be as small as possible.

TABLE 6b

Calculated properties of the phases and alloys from Table 6a-1.

| Variant | 420420 | 1 | 20 | 22 | 23 | 24 | 11 | 13 | 14 | 15 | N3 | N4 | N5 |
|---|---|---|---|---|---|---|---|---|---|---|---|---|---|
| γ' | 990 | 1016 | 1000 | 995 | 986 | 979 | 956 | 978 | 948 | 931 | 985 | 964 | 961.7 |
| γ' vol. (%) at 600° C. | 26 | 29 | 28 | 30.4 | 32.5 | 35 | 20 | 24 | 28 | 32 | 33 | 39 | 33.5 |
| eta sol. T-r (° C.) | 1020 | 996 | 0 | 1060 | 1090 | 1120 | 0 | 1032 | 1100 | 1140 | 1100 | 1175 | 1222 |
| eta max. vol. (%) | 2.5 | 2.8 | 0 | 9.8 | 15 | 19 | 0 | 5.5 | 18.5 | 25 | 16.5 | 27.7 | 35.6 |
| eta sol. T-r (° C.) | | 970 | 0 | 844 | 770 | 715 | 0 | 910 | 740 | 637 | 752 | 602 | RT |
| Delta sol. T-r (° C.) | 1060 | 1014 | 1011 | 956 | 889 | 801 | 1021 | 1015 | 951 | 885 | 856 | 663 | 0 |
| Delta vol.(%) at 600° C. | 2 | 4.5 | 4.7 | 4.3 | 3.3 | 3.1 | 8.3 | 7.4 | 6.5 | 6 | 3.3 | 2.4 | 0 |
| sigma sol. T-r (° C.) | — | 774 | 756 | 803 | 825 | 849 | 642 | 722 | 784 | 825 | 832 | 918 | 1000 |
| sigma vol.(%) at 600° C. | — | 8.6 | 7.2 | 10 | 11.7 | 13.7 | 1 | 4.5 | 8.8 | 11.4 | 12.5 | 18 | 22 |

In Tables 6c-1 to 6c-3, the calculated values are listed for the fractions and particle sizes of the gamma' phase as well as for the test-temperature-dependent values of the offset yield strength Rp0.2 of the alloys from Table 6a-1 for the precipitation heat treatments of 700° C./8 h, 850° C./8 h and 850° C./24 h for the grain size of ASTM 4.5.

TABLE 6c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 6a-1.

| Variant | 1 | 20 | 22 | 23 | 24 | 11 | 12 | 13 | 14 | 15 |
|---|---|---|---|---|---|---|---|---|---|---|
| Gamma' [%] | 31 | 30 | 33 | 35 | 36 | 19 | 27 | 29 | 33 | 36 |
| Gamma' [nm] | 24 | 23 | 24 | 25 | 25 | 21 | 22 | 23 | 24 | 24 |
| Rp0.2 [MPa] | | | | | | | | | | |
| 650° C. | 871 | 824 | 913 | 976 | 1021 | 796 | 864 | 914 | 1077 | 1156 |
| 700° C. | 875 | 828 | 918 | 981 | 1027 | 799 | 868 | 918 | 1082 | 1162 |
| 750° C. | 848 | 802 | 892 | 956 | 1002 | 762 | 829 | 898 | 1051 | 1137 |
| 800° C. | 690 | 651 | 740 | 795 | 847 | 518 | 573 | 614 | 750 | 829 |
| 850° C. | 474 | 443 | 504 | 560 | 597 | 352 | 390 | 450 | 551 | 613 |
| 900° C. | 328 | 300 | 363 | 400 | 435 | 228 | 280 | 322 | 408 | 463 |

TABLE 6c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 6a-1.

| Variant | 1 | 20 | 22 | 23 | 24 | 11 | 12 | 13 | 14 | 15 |
|---|---|---|---|---|---|---|---|---|---|---|
| Gamma' [%] | 25 | 23 | 28 | 30 | 32 | 16 | 16 | 22 | 28 | 32 |
| Gamma' [nm] | 45 | 46 | 44 | 44 | 42 | 45 | 45 | 44 | 42 | 41 |
| Rp0.2 [MPa] | | | | | | | | | | |
| 650° C. | 896 | 845 | 972 | 1024 | 1095 | 724 | 781 | 886 | 1059 | 1170 |
| 700° C. | 886 | 836 | 961 | 1012 | 1083 | 716 | 772 | 875 | 1046 | 1156 |
| 750° C. | 852 | 800 | 928 | 998 | 1068 | 591 | 645 | 740 | 905 | 1023 |
| 800° C. | 643 | 603 | 702 | 753 | 813 | 452 | 495 | 569 | 698 | 789 |
| 850° C. | 502 | 470 | 549 | 589 | 637 | 357 | 391 | 452 | 557 | 631 |
| 900° C. | 348 | 319 | 388 | 424 | 467 | 228 | 276 | 318 | 411 | 475 |

TABLE 6c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 6a-1.

| Variant | 1 | 20 | 22 | 23 | 24 | 11 | 12 | 13 | 14 | 15 |
|---|---|---|---|---|---|---|---|---|---|---|
| Gamma' [%] | 25 | 23 | 28 | 26 | 25 | 12 | 19 | 22 | 24 | 22 |
| Gamma' [nm] | 64 | 65 | 62 | 61 | 60 | 64 | 63 | 61 | 58 | 57 |
| Rp0.2 [MPa] | | | | | | | | | | |
| 650° C. | 807 | 764 | 877 | 927 | 982 | 656 | 732 | 802 | 957 | 1054 |
| 700° C. | 797 | 755 | 866 | 916 | 970 | 648 | 723 | 792 | 945 | 1041 |
| 750° C. | 787 | 745 | 854 | 903 | 957 | 569 | 640 | 713 | 870 | 982 |
| 800° C. | 613 | 577 | 670 | 720 | 774 | 430 | 486 | 542 | 664 | 749 |
| 850° C. | 472 | 444 | 518 | 557 | 599 | 335 | 380 | 425 | 523 | 591 |
| 900° C. | 324 | 297 | 361 | 396 | 433 | 212 | 258 | 296 | 381 | 440 |

From the data of Tables 6c-1 to 6c-3, it is evident that, for the two alloys with 24.5% and 20% Co, respectively the two alloys with the highest additive contents of the elements Al and Ti attain the highest values of the offset yield strength Rp0.2. For 24.5% Co, these are the two considered alloys 23 with 2.2% Al and 0.9% Ti and 24 with 2.2% Al and 1.2% Ti, while in the series with 20% Co they are the alloys 14 with 1.6% Al and 1.6% Ti and 15 with 1.6% Al and 2.1% Ti. In the case of the two alloys 23 and 24, the precipitation heat treatment of 850° C./8 h leads to somewhat higher values of the offset yield strength Rp0.2 in comparison with the heat treatment of 700° C./8 h. For the two alloys 14 and 15, the level of the values of the offset yield strength Rp0.2 during these two precipitation heat treatments lies at a comparable level. A precipitation annealing temperature between 700° C. and 850° C. with an annealing duration of 8 h could increase the level of the offset yield strengths still further. For all four alloys considered here, the level of the offset yield strength after the precipitation heat treatment of 850° C./24 h is lower in comparison with the two other heat treatments.

In Tables 6c-4 to 6c-7, the calculated values are listed for the fractions and particle sizes of the gamma' phase as well as for the test-temperature-dependent values of the offset yield strength Rp0.2 of the alloys from Table 6a-2 for the precipitation heat treatments of 650° C./8 h, 700° C./8 h, 850° C./8 h and 850° C./24 h for the grain size of ASTM 4.5.

TABLE 6c-4

Calculated fractions and particle sizes of the gamma' precipitation phase and values of the mechanical offset yield strength Rp0.2 in dependence on the test temperatures of 650° C. to 900° C. after a precipitation heat treatment of 650° C./8 h for a grain size of ASTM 4.5 of the alloy analyses from Table 6a-2.

|  | 1 | N3 | N4 | N5 |
|---|---|---|---|---|
| Gamma' [%] | 32 | 36 | 42 | 46 |
| Gamma' [nm] | 24 | 25 | 24 | 24 |
| Rp0.2 |  |  |  |  |
| 650 | 891 | 1001 | 1137 | 1257 |
| 700 | 870 | 977 | 1109 | 1227 |
| 750 | 844 | 970 | 1080 | 1194 |
| 800 | 689 | 812 | 1044 | 1155 |
| 850 | 473 | 573 | 698 | 1012 |
| 900 | 327 | 413 | 508 | 712 |

TABLE 6c-5

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 6a-2.

|  | 1 | N3 | N4 | N5 |
|---|---|---|---|---|
| Gamma' [%] | 31 | 35 | 41 | 46 |
| Gamma' [nm] | 24 | 25 | 24 | 23 |
| Rp0.2 [MPa] |  |  |  |  |
| 650 | 871 | 992 | 1108 | 1200 |
| 700 | 875 | 997 | 1114 | 1207 |
| 750 | 848 | 972 | 1085 | 1169 |
| 800 | 690 | 812 | 1049 | 1131 |
| 850 | 474 | 574 | 700 | 1004 |
| 900 | 328 | 413 | 509 | 704 |

TABLE 6c-6

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 6a-2.

| Variant | 1 | N3 | N4 | N5 |
|---|---|---|---|---|
| Gamma' [%] | 25 | 30 | 37 | 43 |
| Gamma' [nm] | 45 | 43 | 43 | 42 |
| Rp0.2 [MPa] |  |  |  |  |
| 650 | 896 | 933 | 1230 | 1386 |
| 700 | 886 | 938 | 1215 | 1369 |
| 750 | 852 | 939 | 1198 | 1350 |
| 800 | 643 | 747 | 970 | 1329 |
| 850 | 502 | 582 | 757 | 1088 |
| 900 | 348 | 424 | 557 | 786 |

TABLE 6c-7

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 6a-2

|  | 1 | N3 | N4 | N5 |
|---|---|---|---|---|
| Gamma' [%] | 25 | 30 | 37 | 43 |
| Gamma' [nm] | 64 | 61 | 59 | 59 |
| Rp0.2 [MPa] |  |  |  |  |
| 650 | 807 | 941 | 1114 | 1246 |
| 700 | 797 | 930 | 1100 | 1230 |
| 750 | 787 | 917 | 1085 | 1213 |
| 800 | 613 | 735 | 928 | 1193 |
| 850 | 473 | 568 | 716 | 1035 |
| 900 | 324 | 408 | 521 | 738 |

From the data of Tables 6c-4 to 6c-7, it is evident that, for the alloy series with higher Ti contents, the alloy with the highest additive content of the elements Al and Ti attains the highest value of the offset yield strength Rp0.2. At a precipitation temperature of 850° C., the alloys N4 and N5 attain the highest values in the offset yield strength Rp0.2. However, a precipitation time of 8 h is more favorable than 24 h. This could be due to the smaller particle size of 40 nm compared with approximately 60 nm for 24 h. At a titanium content of 1%, the highest offset yield strength Rp0.2 is attained with a precipitation heat treatment of 700° C./8 h. At a Ti content of 3%, the strength level at 850° C. is still very high, over 1000 MPa. Moreover, the steeper decrease at a higher additive content of the elements Al and Ti at higher temperatures above 800° C. and at a Ti content of 3% is even shifted to above 850° C.

TABLE 7a

Selected alloy analyses with 24.5% Co and variation of Ni, Ti and Al contents

| Variant | 420420 | 1 | 20 | 21 | 22 | 23 | 24 | 25 | 26 |
|---|---|---|---|---|---|---|---|---|---|
| C | 0.021 | 0.021 | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 | 0.008 | 0.008 |
| Cr | 17.75 | 18 | 18 | 18 | 18 | 18 | 18 | 18 | 18 |
| Ni | 45.96 | 46.018 | 46.218 | 46.018 | 45.718 | 45.418 | 45.118 | 46.318 | 46.618 |
| Mn | 0.018 | 0.018 | 0.018 | 0.018 | 0.018 | 0.018 | 0.018 | 0.018 | 0.018 |
| Si | 0.065 | 0.065 | 0.065 | 0.065 | 0.065 | 0.065 | 0.065 | 0.065 | 0.065 |
| Mo | 2.94 | 3 | 3 | 3 | 3 | 3 | 3 | 3 | 3 |
| Ti | 0.31 | 0.3 | 0.1 | 0.1 | 0.6 | 0.9 | 1.2 | 0.3 | 0.3 |
| Nb | 5.41 | 5.4 | 5.4 | 5.4 | 5.4 | 5.4 | 5.4 | 5.4 | 5.4 |
| Ta | 0.01 | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 | 0.43 | 0.43 |
| P | 0.011 | 0.011 | 0.011 | 0.011 | 0.011 | 0.011 | 0.011 | 0.011 | 0.011 |
| Al | 2.16 | 2.2 | 2.2 | 2.4 | 2.2 | 2.2 | 2.2 | 1.9 | 1.6 |
| Mg | 0.0008 | 0.0008 | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 | 0.004 | 0.004 |
| V | 0.002 | 0.002 | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 | 0.002 | 0.002 |
| W | 0.02 | 0.02 | 0.02 | 0.02 | 0.02 | 0.02 | 0.02 | 0.02 | 0.02 |
| Co | 24.63 | 24.5 | 24.5 | 24.5 | 24.5 | 24.5 | 24.5 | 24.5 | 24.5 |
| Hf | 0 | 0 | 0 | 0 | 0 | 0 | 0 | 0 | 0 |
| B | 0.004 | 0.004 | 0.004 | 0.004 | 0.004 | 0.004 | 0.004 | 0.004 | 0.004 |
| O | 0.002 | 0.002 | 0.002 | 0.002 | 0.002 | 0.002 | 0.002 | 0.002 | 0.002 |

TABLE 7b

Calculated properties of the phases and alloys from Table 7a

| Variant | 420420 | 1 | 20 | 21 | 22 | 23 | 24 | 25 | 26 |
|---|---|---|---|---|---|---|---|---|---|
| γ' sol. T-r (° C.) | 990 | 1016 | 1000 | 1013 | 995 | 986 | 979 | 980 | 950 |
| γ' vol. (%) at 600° C. | 26 | 29 | 28 | 30.5 | 30.4 | 32.5 | 35 | 24.3 | 19.7 |
| eta sol. T-r (° C.) | 1020 | 996 | 0 | 0 | 1060 | 1090 | 1120 | 998 | 966 |
| eta max. vol. (%) | 2.5 | 2.8 | 0 | 0 | 9.8 | 15 | 19 | 1.9 | 1.4 |
| eta sol. T-r (° C.) | — | 970 | 0 | 0 | 844 | 770 | 715 | 957 | 936 |
| Delta sol. T-r (° C.) | 1060 | 1014 | 1011 | 1002 | 956 | 889 | 801 | 1022 | 1031 |
| Delta vol.(%) at 600° C. | 2 | 4.5 | 4.7 | 3.7 | 4.3 | 3.3 | 3.1 | 6.7 | 8.2 |
| sigma sol. T-r (° C.) | — | 774 | 756 | 784 | 803 | 825 | 849 | 734 | 699 |
| sigma vol.(%) at 600° C. | — | 8.6 | 7.2 | 9.4 | 10 | 11.7 | 13.7 | 5.9 | 3.3 |

From Tables 6 and 7, it is evident that, as already described in the foregoing, the gamma' solvus temperature and the gamma' fraction at 600° C. increase with increasing Ti content. In the case of 0.3% Ti, both the gamma' solvus temperatures and the gamma' fractions at 600° C. increase with increasing Al contents. For further reduced Ti content and a higher Al content of 2.4%, the gamma' solvus temperature remains approximately equal, while the gamma' fraction at 600° C. increases slightly. Moreover, it may be inferred from the tables that the combination of high Ti content with high Nb and Co contents stabilizes the eta phase extremely. In this context it is clearly evident that the boundary regions have also been taken into consideration in the present work. The matching of compositions on the basis of the understanding of the effects of individual elements can be inferred from the following tables. In comparison with alloy 420420, the alloys do not exhibit any eta phase.

In Tables 7c-1 to 7c-3, the calculated values are listed for the fractions and particle sizes of the gamma' phase as well for as the test-temperature-dependent values of the offset yield strength Rp0.2 of the alloys from Table 7a for the precipitation heat treatments of 700° C./8 h, 850° C./8 h and 850° C./24 h for the grain size of ASTM 4.5.

TABLE 7c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 7a.

| Variant | 1 | 20 | 21 | 22 | 23 | 24 | 25 | 26 |
|---|---|---|---|---|---|---|---|---|
| Gamma' [%] | 31 | 31 | 32 | 33 | 35 | 36 | 29 | 26 |
| Gamma' [nm] | 24 | 23 | 24 | 24 | 25 | 25 | 23 | 21 |

TABLE 7c-1-continued

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 7a.

| Variant | 1 | 20 | 21 | 22 | 23 | 24 | 25 | 26 |
|---|---|---|---|---|---|---|---|---|
| Rp0.2 [MPa] | | | | | | | | |
| 650° C. | 871 | 823 | 854 | 913 | 976 | 1021 | 835 | 781 |
| 700° C. | 875 | 827 | 858 | 918 | 981 | 1027 | 838 | 784 |
| 750° C. | 848 | 800 | 831 | 892 | 954 | 999 | 812 | 758 |
| 800° C. | 690 | 650 | 688 | 739 | 795 | 846 | 633 | 568 |
| 850° C. | 474 | 442 | 471 | 514 | 559 | 595 | 432 | 380 |
| 900° C. | 328 | 300 | 325 | 313 | 402 | 433 | 282 | 246 |

TABLE 7c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 7a.

| Variant | 1 | 20 | 21 | 22 | 23 | 24 | 25 | 26 |
|---|---|---|---|---|---|---|---|---|
| Gamma' [%] | 25 | 23 | 25 | 28 | 30 | 32 | 21 | 17 |
| Gamma' [nm] | 45 | 46 | 46 | 44 | 44 | 43 | 45 | 45 |
| Rp0.2 [MPa] | | | | | | | | |
| 650° C. | 896 | 845 | 891 | 972 | 1026 | 1088 | 824 | 742 |
| 700° C. | 886 | 834 | 880 | 960 | 1014 | 1076 | 814 | 733 |
| 750° C. | 852 | 799 | 856 | 928 | 1000 | 1061 | 763 | 669 |
| 800° C. | 643 | 603 | 645 | 702 | 754 | 811 | 576 | 505 |
| 850° C. | 502 | 470 | 503 | 549 | 590 | 635 | 449 | 393 |
| 900° C. | 348 | 318 | 347 | 378 | 425 | 463 | 294 | 252 |

TABLE 7c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 7a.

| Variant | 1 | 20 | 21 | 22 | 23 | 24 | 25 | 26 |
|---|---|---|---|---|---|---|---|---|
| Gamma' [%] | 25 | 23 | 25 | 28 | 30 | 32 | 21 | 12 |
| Gamma' [nm] | 64 | 65 | 65 | 62 | 61 | 60 | 64 | 65 |
| Rp0.2 [MPa] | | | | | | | | |
| 650° C. | 807 | 801 | 804 | 876 | 928 | 982 | 743 | 669 |
| 700° C. | 797 | 792 | 794 | 866 | 917 | 970 | 734 | 660 |
| 750° C. | 787 | 781 | 784 | 854 | 904 | 954 | 725 | 645 |
| 800° C. | 613 | 622 | 616 | 670 | 721 | 775 | 550 | 481 |
| 850° C. | 472 | 476 | 475 | 518 | 558 | 599 | 424 | 370 |
| 900° C. | 324 | 297 | 324 | 352 | 397 | 431 | 274 | 234 |

From the data of Tables 7c-1 to 7c-3, it is likewise evident that, for the chemical compositions considered here, the two alloys with the highest additive contents of the elements Al and Ti attain the highest values of the offset yield strength Rp0.2. For 24.5% Co, these are the alloys already considered in Table 7a: 23 with 2.2% Al and 0.9% Ti and 24 with 2.2% Al and 1.2% Ti.

TABLE 8a

Selected alloy analyses with variation of Ni, Nb, Ti and Al contents.

| Variant | 420420 | 1 | 27 | 28 | 29 |
|---|---|---|---|---|---|
| C | 0.021 | 0.021 | 0.021 | 0.021 | 0.021 |
| S | 0.0005 | 0.0005 | 0.0005 | 0.0005 | 0.0005 |
| N | 0.008 | 0.008 | 0.008 | 0.008 | 0.008 |
| Cr | 17.75 | 18 | 18 | 18 | 18 |
| Ni | 45.96 | 46.018 | 46.418 | 46.018 | 46.218 |
| Mn | 0.018 | 0.018 | 0.018 | 0.018 | 0.018 |
| Si | 0.065 | 0.065 | 0.065 | 0.065 | 0.065 |
| Mo | 2.94 | 3 | 3 | 3 | 3 |
| Ti | 0.31 | 0.3 | 0.3 | 0.3 | 0.1 |
| Nb | 5.41 | 5.4 | 5 | 5 | 5 |
| Ta | 0.01 | 0.01 | 0.01 | 0.01 | 0.01 |
| Cu | 0.01 | 0.01 | 0.01 | 0.01 | 0.01 |
| Fe | 0.67 | 0.43 | 0.43 | 0.43 | 0.43 |
| P | 0.011 | 0.011 | 0.011 | 0.011 | 0.011 |
| Al | 2.16 | 2.2 | 2.2 | 2.6 | 2.6 |
| Mg | 0.0008 | 0.0008 | 0.0008 | 0.0008 | 0.0008 |
| Ca | 0.0004 | 0.004 | 0.004 | 0.004 | 0.004 |
| V | 0.002 | 0.002 | 0.002 | 0.002 | 0.002 |
| Zr | 0.002 | 0.002 | 0.002 | 0.002 | 0.002 |
| W | 0.02 | 0.02 | 0.02 | 0.02 | 0.02 |
| Co | 24.63 | 24.5 | 24.5 | 24.5 | 24.5 |
| Hf | 0 | 0 | 0 | 0 | 0 |
| B | 0.004 | 0.004 | 0.004 | 0.004 | 0.004 |
| O | 0.002 | 0.002 | 0.002 | 0.002 | 0.002 |

TABLE 8b

Calculated properties of the phases and alloys from Table 8a.

| Variant | 420420 | 1 | 27 | 28 | 29 |
|---|---|---|---|---|---|
| γ' sol. T-r (° C.) | 990 | 1016 | 1012 | 1032 | 1015 |
| γ' vol. (%) at 600° C. | 26 | 29 | 29 | 33.4 | 32 |
| eta sol. T-r (° C.) | 1020 | 996 | 0 | 0 | 0 |
| eta max. vol. (%) | 2.5 | 2.8 | 0 | 0 | 0 |
| eta sol. T-r (° C.) | — | 970 | 0 | 0 | 0 |
| Delta sol. T-r (° C.) | 1060 | 1014 | 976 | 930 | 952 |
| Delta vol.(%) at 600° C. | 2 | 4.5 | 3.3 | 1.6 | 1.9 |
| sigma sol. T-r (° C.) | — | 774 | 748 | 791 | 772 |
| sigma vol.(%) at 600° C. | — | 8.6 | 6.5 | 9.4 | 8.4 |

From Tables 8a and 8b, it is evident that, in the case of 0.3% Ti and 2.2% Al, the gamma' solvus temperature decreases by a few degrees Celsius from 5.4 to 5.0% Nb. The gamma' fraction at 600° C. remains almost unchanged. In the case of 5.0% Nb and 0.3% Ti, the gamma' solvus temperature increases significantly at the higher Al content of 2.6%, as does the gamma' fraction at 600° C. For the combination of 5.0% Nb, 2.6% Al and the lower Ti content of 0.1%, the gamma' solvus temperature increases only slightly, but the gamma' fraction at 600° C. increases significantly in comparison with the alloy containing 5.0% Nb, 0.3% Ti and 2.2% Al.

In Tables 8c-1 to 8c-3, the calculated values are listed for the fractions and particle sizes of the gamma' phase as well as for the test-temperature-dependent values of the offset yield strength Rp0.2 of the alloys from Table 8a for the precipitation heat treatments of 700° C./8 h, 850° C./8 h and 850° C./24 h for the grain size of ASTM 4.5.

TABLE 8c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 8a.

| Variant | 1 | 27 | 28 | 29 |
|---|---|---|---|---|
| Gamma' [%] | 31 | 30.1 | 33.9 | 32.9 |
| Gamma' [nm] | 24 | 24 | 25 | 25 |
| Rp0.2 [MPa] | | | | |
| 650° C. | 871 | 868 | 907 | 880 |
| 700° C | 875 | 872 | 912 | 884 |
| 750° C. | 848 | 844 | 883 | 853 |
| 800° C | 690 | 671 | 736 | 701 |
| 850° C. | 474 | 463 | 511 | 484 |
| 900° C. | 328 | 317 | 361 | 338 |

TABLE 8c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 8a.

| Variant | 1 | 27 | 28 | 29 |
|---|---|---|---|---|
| Gamma' [%] | 25 | 23.7 | 28.1 | 26 |
| Gamma' [nm] | 45 | 45 | 45 | 45 |
| Rp0.2 [MPa] | | | | |
| 650° C. | 896 | 874 | 958 | 909 |
| 700° C | 886 | 864 | 947 | 899 |
| 750° C. | 852 | 823 | 928 | 876 |
| 800° C | 643 | 622 | 700 | 661 |
| 850° C. | 502 | 485 | 547 | 516 |
| 900° C. | 348 | 332 | 388 | 361 |

TABLE 8c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 8a.

| Variant | 1 | 27 | 28 | 29 |
|---|---|---|---|---|
| Gamma' [%] | 25 | 23.7 | 28.1 | 26 |
| Gamma' [nm] | 64 | 64 | 63 | 63 |
| Rp0.2 [MPa] | | | | |
| 650° C. | 807 | 787 | 866 | 822 |
| 700° C | 797 | 778 | 855 | 813 |
| 750° C. | 787 | 767 | 844 | 802 |
| 800° C | 613 | 593 | 669 | 632 |
| 850° C. | 472 | 457 | 517 | 487 |
| 900° C. | 324 | 309 | 362 | 337 |

From the data of Tables 8c-1 to 8c-3, it is evident that the alloy 28, which in this alloy series has the highest additive content of the elements Al (2.6%) and Ti (0.3%), attains the highest values of the offset yield strength Rp0.2 in comparison with the other alloys considered here. The alloy 29 indeed likewise contains the same higher Al content of 2.6% as alloy 28, but in this alloy 29 the Ti content is reduced to 0.1%.

TABLE 9a

Selected alloy analyses with variation of Ni, Nb and Mo contents

| Variant | 420420 | 1 | 30 | 31 | 32 | 33 | 34 | 35 |
|---|---|---|---|---|---|---|---|---|
| C | 0.021 | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 | 0.008 |
| Cr | 17.75 | 18 | 18 | 18 | 18 | 18 | 18 | 18 |
| Ni | 45.96 | 46.018 | 45.518 | 45.918 | 45.018 | 45.418 | 43.018 | 43.418 |
| Mn | 0.018 | 0.018 | 0.018 | 0.018 | 0.018 | 0.018 | 0.018 | 0.018 |
| Si | 0.065 | 0.065 | 0.065 | 0.065 | 0.065 | 0.065 | 0.065 | 0.065 |
| Mo | 2.94 | 3 | 3.5 | 3.5 | 4 | 4 | 6 | 6 |
| Ti | 0.31 | 0.3 | 0.3 | 0.3 | 0.3 | 0.3 | 0.3 | 0.3 |
| Nb | 5.41 | 5.4 | 5.4 | 5 | 5.4 | 5 | 5.4 | 5 |
| Ta | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 | 0.43 |
| P | 0.011 | 0.011 | 0.011 | 0.011 | 0.011 | 0.011 | 0.011 | 0.011 |
| Al | 2.16 | 2.2 | 2.2 | 2.2 | 2.2 | 2.2 | 2.2 | 2.2 |
| Mg | 0.0008 | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 | 0.004 |
| V | 0.002 | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 | 0.002 |
| W | 0.02 | 0.02 | 0.02 | 0.02 | 0.02 | 0.02 | 0.02 | 0.02 |
| Co | 24.63 | 24.5 | 24.5 | 24.5 | 24.5 | 24.5 | 24.5 | 24.5 |
| B | 0.004 | 0.004 | 0.004 | 0.004 | 0.004 | 0.004 | 0.004 | 0.004 |
| O | 0.002 | 0.002 | 0.002 | 0.002 | 0.002 | 0.002 | 0.002 | 0.002 |

TABLE 9b

Calculated properties of the phases and alloys from Table 9a.

| Variant | 420420 | 1 | 30 | 31 | 32 | 33 | 34 | 35 |
|---|---|---|---|---|---|---|---|---|
| γ' sol. T-r (° C.) | 990 | 1016 | 1006 | 1009 | 1002 | 1009 | 996 | 1006 |
| γ' vol. (%) at 600° C. | 26 | 29 | 29 | 29 | 29.5 | 29 | 30 | 30 |
| eta sol. T-r (° C.) | 1020 | 996 | 1021 | 0 | 1024 | 0 | 1020 | 1004 |
| eta max. vol. (%) | 2.5 | 2.8 | 2.9 | 0 | 3.3 | 0 | 4.7 | 0.9 |
| eta sol. T-r (° C.) | | 970 | 968 | 0 | 953 | 0 | 915 | 946 |
| Delta sol. T-r (° C.) | 1060 | 1014 | 1000 | 971 | 993 | 964 | 981 | 956 |
| Delta vol.(%) at 600° C. | 2 | 4.5 | 4.7 | 2.6 | 4.4 | 2.8 | 4.6 | 2.6 |
| sigma sol. T-r (° C.) | — | 774 | 800 | 779 | 837 | 808 | 931 | 910 |
| sigma vol.(%) at 600° C. | — | 8.6 | 8.5 | 7 | 9.3 | 7 | 11 | 8.9 |

From Tables 9a and 9b, it is evident that the gamma' solvus temperature decreases slightly with increasing Mo content. The gamma' fraction at 600° C. increases slightly with increasing Mo content. The increase of the Mo content with constant Nb content stabilizes delta, eta and sigma phases. For this reason, the Nb content should be adapted when the alloys need high contents of solid-solution-strengthening elements for the γ-matrix strengthening at high temperatures.

In Tables 9c-1 to 9c-3, the calculated values are listed for the fractions and particle sizes of the gamma' phase as well as for the test-temperature-dependent values of the offset yield strength Rp0.2 of the alloys from Table 9a for the precipitation heat treatments of 700° C./8 h, 850° C./8 h and 850° C./24 h for the grain size of ASTM 4.5.

TABLE 9c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 9a.

| Variant | 1 | 30 | 31 | 32 | 33 | 34 | 35 |
|---|---|---|---|---|---|---|---|
| Gamma' [%] | 31 | 31.4 | 30.7 | 31.5 | 30.8 | 31.9 | 30.7 |
| Gamma' [nm] | 24 | 24 | 24 | 24 | 24 | 24 | 24 |
| Rp0.2 [MPa] | | | | | | | |
| 650° C. | 871 | 873 | 868 | 875 | 871 | 882 | 880 |
| 700° C. | 875 | 877 | 872 | 879 | 875 | 886 | 884 |
| 750° C. | 848 | 850 | 844 | 852 | 846 | 855 | 853 |
| 800° C. | 690 | 696 | 676 | 701 | 682 | 726 | 706 |
| 850° C. | 474 | 477 | 465 | 480 | 468 | 489 | 478 |
| 900° C. | 328 | 329 | 321 | 331 | 322 | 332 | 325 |

TABLE 9c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 9a.

| Variant | 1 | 30 | 31 | 32 | 33 | 34 | 35 |
|---|---|---|---|---|---|---|---|
| Gamma' [%] | 25 | 24.9 | 22.6 | 25 | 23.5 | 25.1 | 23.8 |
| Gamma' [nm] | 45 | 45 | 45 | 45 | 45 | 45 | 45 |

TABLE 9c-2-continued

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 9a.

| Variant | 1 | 30 | 31 | 32 | 33 | 34 | 35 |
|---|---|---|---|---|---|---|---|
| Rp0.2 [MPa] | | | | | | | |
| 650° C. | 896 | 900 | 849 | 904 | 874 | 914 | 890 |
| 700° C. | 886 | 890 | 839 | 894 | 864 | 904 | 880 |
| 750° C. | 852 | 860 | 806 | 867 | 835 | 893 | 867 |
| 800° C. | 643 | 648 | 607 | 653 | 629 | 673 | 651 |
| 850° C. | 502 | 505 | 473 | 509 | 490 | 522 | 505 |
| 900° C. | 348 | 350 | 336 | 351 | 339 | 355 | 343 |

TABLE 9c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 9a.

| Variant | 1 | 30 | 31 | 32 | 33 | 34 | 35 |
|---|---|---|---|---|---|---|---|
| Gamma' [%] | 25 | 24.9 | 22.6 | 25 | 23.5 | 25.1 | 23.8 |
| Gamma' [nm] | 64 | 64 | 64 | 64 | 64 | 64 | 64 |
| 650 | 807 | 811 | 766 | 815 | 788 | 826 | 804 |
| 700 | 797 | 801 | 756 | 805 | 779 | 817 | 795 |
| 750 | 787 | 791 | 746 | 795 | 769 | 806 | 785 |
| 800 | 613 | 619 | 580 | 624 | 601 | 644 | 623 |
| 850 | 472 | 576 | 446 | 480 | 462 | 493 | 477 |
| 900 | 324 | 326 | 313 | 327 | 315 | 331 | 320 |

The higher Mo contents of the alloys 30 to 35 of 3.5%, 4% and 6% (for two different Nb contents of 5.4% and 5%) exhibit hardly any noticeable effect on the level of the offset yield strength Rp0.2 in comparison with the reference alloy 1, which has a Mo content of 3%.

In Table 10a, not only the analyses of the reference batch 420420 and of the reference analyses numbers 1 and 9 are considered, but so also are further analyses with variations in the contents of Nb, Ta, W and Hf. These are the analysis numbers 38 to 48. The results of the calculations for these analysis variations are listed in Table 10b. In comparison with the standard VDM Alloy 780, the γ' volume fraction increases up to max. 36.5%. Moreover, none of the listed alloys contains any eta phase. In these alloys, an almost identical γ' phase volume can be attained at significantly lower γ' solvus temperature. Due to the alloying of Ta, higher mismatch and thus associated slow precipitation kinetics of the γ' phase can be achieved besides the strengthening of the γ' phase. For the alloys 9, 39, 43-48, small quantities of delta phase are able to precipitate at the grain boundaries at 900° C., thus acting positively on high-temperature properties, since the grain boundaries become strengthened. Moreover, the stability of the sigma phase is significantly lower in comparison with alloy 939.

TABLE 10a

Selected alloy analyses with variation of Ni, Nb. Ta, W and Hf contents.

| Variante | 420420 | 1 | 9 | 38 | 39 | 40 | 41 | 42 | 43 | 44 | 45 | 46 | 47 | 48 |
|---|---|---|---|---|---|---|---|---|---|---|---|---|---|---|
| C | 0.021 | 0.021 | 0.021 | 0.021 | 0.021 | 0.021 | 0.021 | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 | 0.008 | 0.008 | 0.008 | 0.008 | 0.008 | 0.008 | 0.008 |
| Cr | 17.75 | 18 | 18 | 18 | 18 | 18 | 18 | 18 | 18 | 18 | 18 | 18 | 18 | 18 |
| Ni | 45.96 | 46.018 | 50.118 | 51.508 | 49.618 | 51.018 | 50.518 | 49.518 | 49.628 | 49.128 | 48.128 | 49.608 | 49.108 | 48.108 |
| Mn | 0.018 | 0.018 | 0.018 | 0.018 | 0.018 | 0.018 | 0.018 | 0.018 | 0.018 | 0.018 | 0.018 | 0.018 | 0.018 | 0.018 |
| Si | 0.065 | 0.065 | 0.065 | 0.065 | 0.065 | 0.065 | 0.065 | 0.065 | 0.065 | 0.065 | 0.065 | 0.065 | 0.065 | 0.065 |
| Mo | 2.94 | 3 | 3 | 3 | 3 | 3 | 3 | 3 | 3 | 3 | 3 | 3 | 3 | 3 |
| Ti | 0.31 | 0.3 | 0.3 | 0.3 | 0.3 | 0.3 | 0.3 | 0.3 | 0.3 | 0.3 | 0.3 | 0.3 | 0.3 | 0.3 |
| Nb | 5.41 | 5.4 | 5.4 | 4 | 5.4 | 4 | 4 | 4 | 5.4 | 5.4 | 5.4 | 5.4 | 5.4 | 5.4 |
| Ta | 0.01 | 0.01 | 0.01 | 0.01 | 0.5 | 0.5 | 1 | 2 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 | 0.43 | 0.43 | 0.43 | 0.43 | 0.43 | 0.43 | 0.43 |
| P | 0.011 | 0.011 | 0.011 | 0.011 | 0.011 | 0.011 | 0.011 | 0.011 | 0.011 | 0.011 | 0.011 | 0.011 | 0.011 | 0.011 |
| Al | 2.16 | 2.2 | 2.6 | 2.6 | 2.6 | 2.6 | 2.6 | 2.6 | 2.6 | 2.6 | 2.6 | 2.6 | 2.6 | 2.6 |
| Mg | 0.0008 | 0.0008 | 0.0008 | 0.0008 | 0.0008 | 0.0008 | 0.0008 | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 | 0.004 | 0.004 | 0.004 | 0.004 | 0.004 | 0.004 | 0.004 |
| V | 0.002 | 0.002 | 0.002 | 0.002 | 0.002 | 0.002 | 0.002 | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 | 0.002 | 0.002 | 0.002 | 0.002 | 0.002 | 0.002 | 0.002 |
| W | 0.02 | 0.02 | 0.02 | 0.02 | 0.02 | 0.02 | 0.02 | 0.02 | 0.5 | 1 | 2 | 0.02 | 0.02 | 0.02 |
| Co | 24.63 | 24.5 | 20 | 20 | 20 | 20 | 20 | 20 | 20 | 20 | 20 | 20 | 20 | 20 |
| Hf | 0 | 0 | 0 | 0 | 0 | 0 | 0 | 0 | 0 | 0 | 0 | 0.5 | 1 | 2 |
| B | 0.004 | 0.004 | 0.004 | 0.004 | 0.004 | 0.004 | 0.004 | 0.004 | 0.004 | 0.004 | 0.004 | 0.004 | 0.004 | 0.004 |
| O | 0.002 | 0.002 | 0.002 | 0.002 | 0.002 | 0.002 | 0.002 | 0.002 | 0.002 | 0.002 | 0.002 | 0.002 | 0.002 | 0.002 |

TABLE 10b

Calculated properties of the phases and alloys from Table 10a.

| Variant | 420420 | 1 | 9 | 38 | 39 | 40 | 41 | 42 | 43 | 44 | 45 | 46 | 47 | 48 |
|---|---|---|---|---|---|---|---|---|---|---|---|---|---|---|
| γ' sol. T-r (° C.) | 990 | 1016 | 1040 | 1022 | 1044 | 1030 | 1037 | 1045 | 1038 | 1039 | 1039 | 1045 | 1048 | 1060 |
| γ' vol. (%) at 600° C. | 26 | 29 | 35 | 33 | 35 | 33.7 | 34.6 | 36.5 | 35.1 | 35.3 | 35.8 | 35 | 36 | 36 |
| eta sol. T-r (° C.) | 1020 | 996 | 0 | 0 | 0 | 0 | 0 | 0 | 0 | 0 | 0 | 0 | 0 | 0 |
| eta max. vol. (%) | 2.5 | 2.8 | 0 | 0 | 0 | 0 | 0 | 0 | 0 | 0 | 0 | 0 | 0 | 0 |
| eta sol. T-r (° C.) | | 970 | 0 | 0 | 0 | 0 | 0 | 0 | 0 | 0 | 0 | 0 | 0 | 0 |
| Delta sol. T-r (° C.) | 1060 | 1014 | 960 | 0 | 972 | 0 | 0 | 0 | 958 | 956 | 950 | 968 | 968 | 964 |
| Delta vol.(%) at 600° C. | 2 | 4.5 | 2.4 | 0 | 2.7 | 0 | 0 | 0 | 2.3 | 2.6 | 2.5 | 2.3 | 2.3 | 2.3 |
| sigma sol. T-r (° C.) | | 774 | 799 | 719 | 818 | 744 | 762 | 798 | 816 | 826 | 852 | 819 | 838 | 875 |
| sigma vol.(%) at 600° C. | | 8.6 | 10 | 5.3 | 11 | 6.5 | 7.4 | 10 | 10.6 | 11.7 | 13 | 11.7 | 12.5 | 15 |

In Tables 10c-1 to 10c-3, the calculated values are listed for the fractions and particle sizes of the gamma' phase as well as for the test-temperature-dependent values of the offset yield strength Rp0.2 of the alloys from Table 10a for the precipitation heat treatments of 700° C./8 h, 850° C./8 h and 850° C./24 h for the grain size of ASTM 4.5.

TABLE 10c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 10a.

| Variant | 1 | 9 | 38 | 39 | 40 | 41 | 42 | 43 | 44 | 45 | 46 | 47 | 48 |
|---|---|---|---|---|---|---|---|---|---|---|---|---|---|
| Gamma' [%] | 31 | 34.9 | 30.4 | 35.8 | 31.3 | 32.7 | 34.4 | 35.2 | 35.5 | 36.1 | 36 | 36.8 | 38.6 |
| Gamma' [nm] | 24 | 25 | 25 | 25 | 25 | 25 | 25 | 25 | 25 | 25 | 25 | 25 | 25 |
| Rp0.2 [MPa] | | | | | | | | | | | | | |
| 650° C. | 871 | 933 | 917 | 935 | 922 | 925 | 929 | 935 | 936 | 937 | 936 | 938 | 943 |
| 700° C. | 875 | 938 | 921 | 940 | 927 | 930 | 934 | 940 | 941 | 942 | 941 | 943 | 948 |
| 750° C. | 848 | 914 | 888 | 914 | 895 | 898 | 908 | 912 | 913 | 914 | 914 | 916 | 922 |
| 800° C. | 690 | 701 | 635 | 721 | 652 | 669 | 706 | 707 | 713 | 726 | 714 | 737 | 778 |
| 850° C. | 474 | 497 | 447 | 510 | 465 | 476 | 504 | 500 | 503 | 508 | 508 | 520 | 548 |
| 900° C. | 328 | 356 | 323 | 365 | 334 | 340 | 365 | 357 | 359 | 361 | 365 | 373 | 394 |

TABLE 10c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 10a.

| Variant | 1 | 9 | 38 | 39 | 40 | 41 | 42 | 43 | 44 | 45 | 46 | 47 | 48 |
|---|---|---|---|---|---|---|---|---|---|---|---|---|---|
| Gamma' [%] | 25 | 29.3 | 22.8 | 30.5 | 24.9 | 26.4 | 28.9 | 29.6 | 29.9 | 30.4 | 30 | 31.4 | 33.7 |
| Gamma' [nm] | 45 | 45 | 44 | 44 | 44 | 44 | 44 | 44 | 44 | 44 | 44 | 44 | 44 |
| Rp0.2 [MPa] | | | | | | | | | | | | | |
| 650° C. | 896 | 987 | 857 | 1016 | 903 | 935 | 986 | 999 | 1004 | 1015 | 1007 | 1033 | 1077 |
| 700° C. | 886 | 975 | 847 | 1005 | 893 | 924 | 974 | 887 | 993 | 1003 | 995 | 1021 | 1065 |
| 750° C. | 852 | 874 | 754 | 909 | 793 | 829 | 891 | 886 | 895 | 914 | 900 | 936 | 1007 |
| 800° C. | 643 | 671 | 577 | 698 | 607 | 635 | 682 | 680 | 686 | 699 | 690 | 718 | 770 |
| 850° C. | 502 | 532 | 455 | 554 | 480 | 502 | 540 | 539 | 544 | 553 | 547 | 569 | 609 |
| 900° C. | 348 | 383 | 328 | 400 | 347 | 358 | 393 | 387 | 390 | 396 | 398 | 412 | 444 |

TABLE 10c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 10a.

| Variant | 1 | 9 | 38 | 39 | 40 | 41 | 42 | 43 | 44 | 45 | 46 | 47 | 48 |
|---|---|---|---|---|---|---|---|---|---|---|---|---|---|
| Gamma' [%] | 25 | 29.3 | 22.8 | 30.5 | 24.9 | 26.4 | 28.9 | 29.6 | 29.9 | 30.4 | 30 | 31.4 | 33.7 |
| Gamma' [nm] | 64 | 62 | 62 | 62 | 62 | 62 | 62 | 62 | 62 | 62 | 62 | 62 | 62 |
| 650 | 807 | 921 | 773 | 917 | 814 | 842 | 888 | 901 | 906 | 917 | 908 | 932 | 973 |
| 700 | 797 | 909 | 763 | 906 | 805 | 832 | 878 | 890 | 896 | 906 | 897 | 921 | 961 |
| 750 | 787 | 897 | 726 | 875 | 763 | 798 | 859 | 852 | 861 | 890 | 868 | 901 | 948 |
| 800 | 613 | 711 | 549 | 664 | 578 | 604 | 650 | 647 | 653 | 666 | 657 | 683 | 733 |
| 850 | 472 | 549 | 428 | 520 | 451 | 472 | 507 | 507 | 511 | 521 | 514 | 535 | 573 |
| 900 | 324 | 357 | 305 | 371 | 322 | 333 | 365 | 359 | 362 | 368 | 369 | 382 | 413 |

Let us first consider the alloys 9 and 38 to 42, which contain constant contents of Co (20%), Al (2.6%) and Ti (0.3%) and vary in the contents of the elements Nb and Ta. Among these, the alloys 9 and 39, both of which contain the somewhat higher Nb content of 5.4%, achieve the highest values of the offset yield strength Rp0.2. In the case of the precipitation heat treatment of 850° C./8 h, the alloy 39, which contains a higher Ta content, i.e. 0.5%, than alloy 9, has somewhat higher values of the offset yield strength Rp0.2. The level of the offset yield strengths of the alloys 38, 40 and 41 lies lower in comparison with the two alloys 9 and 39. The alloys 38, 40 and 41 contain a somewhat lower Nb content, i.e., 5% Nb, than the two alloys 9 and 39. Among the three alloys 38, 40 and 41, the alloy 41 attains somewhat higher offset yield strength values. The alloy contains a somewhat higher Ta content, i.e. 1%. The values of the offset yield strengths of the alloy 42 are approximately comparable with the level of the offset yield strength values of the alloy 9, although alloy 42 has a somewhat lower Nb content, although its Ta content of 2% is also the highest in this alloy series.

Let us now consider the alloys 43, 44 and 45 with W contents of 0.5%, 1% and 2% in comparison with alloy 9, which has a very low W content of only 0.02%. In the case of the precipitation heat treatment of 850° C./8 h, the level of the values of the offset yield strength of the alloys 43, 44 and 45 increases only slightly with increasing W content compared with the level of the offset yield strength values of the alloy 9.

Let us now consider the alloys 46, 47 and 48 with Hf contents of 0.5%, 1% and 2% in comparison with alloy 9, which contains no Hf. In the case of the precipitation heat treatment of 850° C./8 h, the level of the values of the offset yield strengths increases with increasing Hf content, and so the values of the offset yield strengths of the alloy 48, i.e. with the highest Hf content (2%) in this alloy series, are significantly higher in comparison with the Hf-free alloy 9.

In Table 11a, not only the analyses of the reference batch 420420 and of the reference analyses number 1 are considered, but so also are further analyses with variations in the contents of Nb, Ta and W. These are the analysis numbers 50 to 57. The results of the calculations for these analysis variations are listed in Table 11b. For the high-temperature applications, high thermomechanical loads may be imposed, depending on structural part requirements, and for those applications it may be advisable to replace Nb partly with Ta. Ta slows not only the substitution of Al in γ' phase but also the diffusion processes in the alloy. Moreover, this effect is strongly increased. Thus the precipitation kinetics is favorably influenced for the processability. In the alloys 50-52 and 57, the delta phase may be utilized for the high-temperature grain-boundary strengthening.

TABLE 11a

Selected alloy analyses with variation of Ni, Nb, Ta and W contents

| Variante | 420420 | 1 | 50 | 51 | 52 | 53 | 54 | 55 | 56 | 57 |
|---|---|---|---|---|---|---|---|---|---|---|
| C | 0.021 | 0.021 | 0.021 | 0.021 | 0.021 | 0.021 | 0.021 | 0.018 | 0.018 | 0.018 |
| S | 0.0005 | 0.0005 | 0.0005 | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 | 0.008 | 0.008 | 0.008 |
| Cr | 17.75 | 18 | 18 | 18 | 18 | 18 | 18 | 18 | 18 | 18 |
| Ni | 45.96 | 46.018 | 49.038 | 49.238 | 48.738 | 49.218 | 50.818 | 49.318 | 49.218 | 49.518 |
| Mn | 0.018 | 0.018 | 0.018 | 0.018 | 0.018 | 0.018 | 0.018 | 0.018 | 0.018 | 0.018 |
| Si | 0.065 | 0.065 | 0.065 | 0.065 | 0.065 | 0.065 | 0.065 | 0.065 | 0.065 | 0.065 |
| Mo | 2.94 | 3 | 3.5 | 3.5 | 4 | 4 | 3 | 3 | 3 | 3 |
| Ti | 0.31 | 0.3 | 0.3 | 0.1 | 0.1 | 0.1 | 0.1 | 0.1 | 0.1 | 0.1 |
| Nb | 5.41 | 5.4 | 5 | 5 | 5 | 4.5 | 3.5 | 5 | 5 | 5 |
| Ta | 0.01 | 0.01 | 0.5 | 0.5 | 0.5 | 0.5 | 0.5 | 1 | 1 | 1 |
| Cu | 0.01 | 0.01 | 0.01 | 0.01 | 0.01 | 0.01 | 0.01 | 0.01 | 0.01 | 0.01 |
| Fe | 0.67 | 0.43 | 0.43 | 0.43 | 0.43 | 0.43 | 0.43 | 0.43 | 0.43 | 0.43 |
| P | 0.011 | 0.011 | 0.011 | 0.011 | 0.011 | 0.011 | 0.011 | 0.011 | 0.011 | 0.011 |
| Al | 2.16 | 2.2 | 2.6 | 2.6 | 2.6 | 2.6 | 3.5 | 3 | 3.1 | 2.8 |
| Mg | 0.0008 | 0.0008 | 0.0008 | 0.0008 | 0.0008 | 0.0008 | 0.0008 | 0.0008 | 0.0008 | 0.0008 |
| Ca | 0.0004 | 0.004 | 0.004 | 0.004 | 0.004 | 0.004 | 0.004 | 0.004 | 0.004 | 0.004 |
| V | 0.002 | 0.002 | 0.002 | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 | 0.002 | 0.002 | 0.002 |
| W | 0.02 | 0.02 | 0.5 | 0.5 | 0.5 | 0.5 | 0.02 | 0.02 | 0.02 | 0.02 |
| Co | 24.63 | 24.5 | 20 | 20 | 20 | 20 | 20 | 20 | 20 | 20 |
| Hf | 0 | 0 | 0 | 0 | 0 | 0 | 0 | 0 | 0 | 0 |
| B | 0.004 | 0.004 | 0.004 | 0.004 | 0.004 | 0.004 | 0.004 | 0.004 | 0.004 | 0.004 |
| O | 0.002 | 0.002 | 0.002 | 0.002 | 0.002 | 0.002 | 0.002 | 0.002 | 0.002 | 0.002 |

TABLE 11b

Calculated properties of the phases and alloys from Table 11a.

| Variant | 420420 | 1 | 50 | 51 | 52 | 53 | 54 | 55 | 56 | 57 |
|---|---|---|---|---|---|---|---|---|---|---|
| γ' sol. T-r (° C.) | 990 | 1016 | 1040 | 1027 | 1026 | 1020 | 1065 | 1058 | 1064 | 1046 |
| γ' vol. (%) at 600° C. | 26 | 29 | 36 | 34.2 | 34.4 | 34.4 | 40 | 40.2 | 41 | 37.5 |
| eta sol. T-r (° C.) | 1020 | 996 | 0 | 0 | 0 | 0 | 0 | 0 | 0 | 0 |
| eta max. vol. (%) | 2.5 | 2.8 | 0 | 0 | 0 | 0 | 0 | 0 | 0 | 0 |

TABLE 11b-continued

Calculated properties of the phases and alloys from Table 11a.

| Variant | 420420 | 1 | 50 | 51 | 52 | 53 | 54 | 55 | 56 | 57 |
|---|---|---|---|---|---|---|---|---|---|---|
| eta sol. T-r (° C.) | | 970 | 0 | 0 | 0 | 0 | 0 | 0 | 0 | 0 |
| Delta sol. T-r (° C.) | 1060 | 1014 | 916 | 936 | 930 | 0 | 0 | 0 | 0 | 888 |
| Delta vol.(%) at 600° C. | 2 | 4.5 | 1.6 | 1.9 | 1.6 | 0 | 0 | 0 | 0 | 0.75 |
| sigma sol. T-r (° C.) | — | 774 | 840 | 823 | 850 | 829 | 806 | 846 | 860 | 824 |
| sigma vol.(%) at 600° C. | — | 8.6 | 10.8 | 10 | 10.5 | 8.8 | 11 | 13.4 | 13.7 | 12 |

In Tables 11c-1 to 11c-3, the calculated values are listed for the fractions and particle sizes of the gamma' phase as well as for the test-temperature-dependent values of the offset yield strength Rp0.2 of the alloys from Table 11a for the precipitation heat treatments of 700° C./8 h, 850° C./8 h and 850° C./24 h for the grain size of ASTM 4.5.

TABLE 11c-1

Calculated fractions and particle sizes of the gamma' precipitation phase and values of the mechanical offset yield strength Rp0.2 in dependence on the test temperatures of 650° C. to 900° C. after a precipitation heat treatment of 700° C./8 h for a grain size of ASTM 4.5 of the alloy analyses from Table 11a.

| Variant | 1 | 50 | 51 | 52 | 53 | 54 | 55 | 56 | 57 |
|---|---|---|---|---|---|---|---|---|---|
| Gamma' [%] | 31 | 35.1 | 34.2 | 34.3 | 32.5 | 36.8 | 37.9 | 39 | 36.4 |
| Gamma' [nm] | 24 | 23 | 23 | 23 | 23 | 27 | 26 | 26 | 25 |
| Rp0.2 [MPa] | | | | | | | | | |
| 650° C. | 871 | 899 | 873 | 875 | 872 | 968 | 950 | 957 | 920 |
| 700° C. | 875 | 904 | 877 | 880 | 876 | 973 | 956 | 962 | 925 |
| 750° C. | 848 | 877 | 849 | 852 | 847 | 937 | 927 | 930 | 897 |
| 800° C. | 690 | 700 | 671 | 677 | 653 | 707 | 756 | 764 | 720 |
| 850° C. | 474 | 492 | 469 | 471 | 457 | 509 | 535 | 541 | 508 |
| 900° C. | 328 | 351 | 330 | 331 | 322 | 374 | 386 | 391 | 364 |

TABLE 11c-2

Calculated fractions and particle sizes of the gamma' precipitation phase and values of the mechanical offset yield strength Rp0.2 in dependence on the test temperatures of 650° C. to 900° C. after a precipitation heat treatment of 850° C./8 h for a grain size of ASTM 4.5 of the alloy analyses from Table 11a.

| Variant | 1 | 50 | 51 | 52 | 53 | 54 | 55 | 56 | 57 |
|---|---|---|---|---|---|---|---|---|---|
| Gamma' [%] | 25 | 29.4 | 27.4 | 27.5 | 25.6 | 29.9 | 32.4 | 33.4 | 30.4 |
| Gamma' [nm] | 45 | 45 | 45 | 45 | 45 | 45 | 44 | 44 | 44 |
| Rp0.2 [MPa] | | | | | | | | | |
| 650° C. | 896 | 991 | 943 | 947 | 910 | 982 | 1043 | 1061 | 1005 |
| 700° C. | 886 | 980 | 932 | 937 | 899 | 971 | 1031 | 1049 | 993 |
| 750° C. | 852 | 891 | 845 | 853 | 814 | 882 | 960 | 982 | 912 |
| 800° C. | 643 | 682 | 646 | 651 | 621 | 677 | 735 | 752 | 698 |
| 850° C. | 502 | 540 | 510 | 514 | 490 | 537 | 582 | 596 | 553 |
| 900° C. | 348 | 388 | 364 | 366 | 348 | 398 | 429 | 437 | 404 |

TABLE 11c-3

Calculated fractions and particle sizes of the gamma' precipitation phase and values of the mechanical offset yield strength Rp0.2 in dependence on the test temperatures of 650° C. to 900° C. after a precipitation heat treatment of 850° C./24 h for a grain size of ASTM 4.5 of the alloy analyses from Table 11a.

| Variant | 1 | 50 | 51 | 52 | 53 | 54 | 55 | 56 | 57 |
|---|---|---|---|---|---|---|---|---|---|
| Gamma' [%] | 25 | 29.4 | 27.4 | 27.5 | 25.6 | 29.9 | 32.4 | 33.4 | 30.4 |
| Gamma' [nm] | 64 | 63 | 63 | 63 | 63 | 62 | 61 | 61 | 61 |
| Rp0.2 [MPa] | | | | | | | | | |
| 650° C. | 807 | 896 | 853 | 857 | 823 | 891 | 946 | 962 | 911 |
| 700° C. | 797 | 885 | 843 | 847 | 813 | 880 | 934 | 951 | 900 |
| 750° C. | 787 | 859 | 815 | 822 | 785 | 851 | 922 | 938 | 879 |
| 800° C. | 613 | 650 | 616 | 621 | 593 | 646 | 701 | 717 | 667 |
| 850° C. | 472 | 508 | 481 | 484 | 462 | 506 | 549 | 562 | 552 |
| 900° C. | 324 | 361 | 339 | 340 | 324 | 371 | 400 | 407 | 376 |

In particular, when the data of Table 11c-2 are considered, i.e. in the case of the precipitation heat treatment of 850° C./8 h, it can be seen that the alloys 54, 55, 56 and 57, which have the highest Al contents of 3.5%, 3%, 3.1% and 2.8% in this alloy series, attain a high level of the offset yield strength values. The alloys 54 to 57 additionally contain a higher Ta content of 0.5% or 1%, but a lower Ti content of only 0.1%. The alloy 50, which has a not so high Al content of 2.6%, likewise attains a quite high level of the offset yield strength values. Besides 0.5% Ta, the alloy 50 contains a somewhat higher Ti content of 0.3%.

In Table 12, the exemplary analyses according to the invention are presented that, due to adapted compositions, are able to substitute for the conventional benchmark alloys on the basis of improved processability with the same and/or better high-temperature properties:

TABLE 12

| | Benchmark alloy | | | | | |
|---|---|---|---|---|---|---|
| | Alloy 718 Waspaloy Udimet 720 25% < γ' vol.(%) < 30%, Delta vol. < 6% | VDM Alloy 780 25% < γ' vol.(%) < 30%, Delta vol. < 6% No eta phase | Alloy 939 30% < γ' vol.(%) ≤ 35%, no eta phase | | Alloy 738LC 35% < γ' vol.(%) ≤ 45%, no eta phase | |
| Microstructural requirements | | | With delta ph. | Without delta ph. | With delta ph. | Without delta ph. |
| Group no. | 0 | 1 | 2 | 3 | 4 | 5 |
| Alloys | 1; 27 | 5; 6; 7; 8; | 9; 28; 29; 39; 46; 51; 52 | 38; 40; 41; 53 | 43; 44; 45; 47; 48; 50; 57 | 42; 55; 56 |
| Element ranges based on VDM Alloy 780 | | 1.8-2.4 Al 15-23 Co | 2.3-2.8 Al 19-25 Co 4.5-5.5 Nb 3.0-5.0 Mo | 2.4-3.0 Al 18-22 Co 3.5-5.0 Nb | 2.4-3.0 Al 18-22 Co 4.5-6.0 Nb | 2.4-3.3 Al 18-22 Co 3.8-6.0 Nb 0.5-2.5 Ta |

Group 0: Standard VDM alloy 780 (Table 13)

Group 1: Adapted compositions of VDM Alloy 780 powder-Table 14 (a,b) with improved processability and microstructural stability.

Group 2: Optimized compositions of VDM Alloy 780HT powder for the applications at higher temperatures in comparison with VDM Alloy 780 standard powder. These alloys have increased γ' volume fraction, albeit limited to 35%. In this group, the alloys that have low fractions of delta phase in the temperature range between 800° C. and 900° C. are presented by way of example (Table 15).

Group 3: Optimized compositions of VDM Alloy 780HT powder for the applications at higher temperatures in comparison with VDM Alloy 780 standard powder. These alloys have increased γ' volume fraction, albeit limited to 35%. In this group, the alloys that in comparison with Group 2 have no delta phase are presented by way of example (Table 16).

Group 4 and 5: Optimized compositions of VDM Alloy 780HT powder for the applications at higher temperatures in comparison with VDM Alloy 780 powder. These alloys have higher volume fractions of γ' phase. By analogy with Groups 2 and 3, the alloys with and without delta phase are presented. In all 5 groups, the eta phase is not present or is thermodynamically unstable (Tables 17 and 18).

TABLE 13

| | Group 0 | | |
|---|---|---|---|
| Variant | 420420 | 1 | 27 |
| C | 0.021 | 0.021 | 0.021 |
| S | 0.0005 | 0.0005 | 0.0005 |
| N | 0.008 | 0.008 | 0.008 |
| Cr | 17.75 | 18 | 18 |

TABLE 13-continued

| | Group 0 | | |
|---|---|---|---|
| Variant | 420420 | 1 | 27 |
| Ni | 45.96 | 46.018 | 46.518 |
| Mn | 0.018 | 0.018 | 0.018 |
| Si | 0.065 | 0.065 | 0.065 |
| Mo | 2.94 | 3 | 3 |
| Ti | 0.31 | 0.3 | 0.3 |
| Nb | 5.41 | 5.4 | 4.9 |
| Cu | 0.01 | 0.01 | 0.01 |
| Fe | 0.67 | 0.43 | 0.43 |
| P | 0.011 | 0.011 | 0.011 |
| Al | 2.16 | 2.2 | 2.2 |
| Mg | 0.0008 | 0.0008 | 0.0008 |
| Ca | 0.0004 | 0.004 | 0.004 |
| V | 0.002 | 0.002 | 0.002 |
| Zr | 0.002 | 0.002 | 0.002 |
| W | 0.02 | 0.02 | 0.02 |
| Co | 24.63 | 24.5 | 24.5 |
| B | 0.004 | 0.004 | 0.004 |
| O | 0.002 | 0.002 | 0.002 |

TABLE 14a

| | Group 1 | | | |
|---|---|---|---|---|
| Variant | 5 | 6 | 7 | 8 |
| C | 0.021 | 0.021 | 0.021 | 0.021 |
| S | 0.0005 | 0.0005 | 0.0005 | 0.0005 |
| N | 0.008 | 0.008 | 0.008 | 0.008 |
| Cr | 18 | 18 | 18 | 18 |
| Ni | 48.018 | 55.518 | 53.018 | 50.518 |
| Mn | 0.018 | 0.018 | 0.018 | 0.018 |
| Si | 0.065 | 0.065 | 0.065 | 0.065 |
| Mo | 3 | 3 | 3 | 3 |
| Ti | 0.3 | 0.3 | 0.3 | 0.3 |
| Nb | 5.4 | 5.4 | 5.4 | 5.4 |
| Cu | 0.01 | 0.01 | 0.01 | 0.01 |
| Fe | 0.43 | 0.43 | 0.43 | 0.43 |
| P | 0.011 | 0.011 | 0.011 | 0.011 |
| Al | 2.2 | 2.2 | 2.2 | 2.2 |
| Mg | 0.0008 | 0.0008 | 0.0008 | 0.0008 |
| Ca | 0.004 | 0.004 | 0.004 | 0.004 |
| V | 0.002 | 0.002 | 0.002 | 0.002 |
| Zr | 0.002 | 0.002 | 0.002 | 0.002 |
| W | 0.02 | 0.02 | 0.02 | 0.02 |
| Co | 22.5 | 15 | 17.5 | 20 |
| B | 0.004 | 0.004 | 0.004 | 0.004 |
| O | 0.002 | 0.002 | 0.002 | 0.002 |

TABLE 14b

| | Group 1 | | | |
|---|---|---|---|---|
| Variant | 5 | 6 | 7 | 8 |
| γ' sol. T-r (° C.) | 1015 | 1005 | 1010 | 1013 |
| γ' vol. (%) at 600° C. | 29 | 29 | 29 | 29 |
| eta sol. T-r (° C.) | 0 | 0 | 0 | 0 |
| eta max. vol. (%) | 0 | 0 | 0 | 0 |
| eta sol. T-r (° C.) | 0 | 0 | 0 | 0 |
| Delta sol. T-r (° C.) | 1007 | 985 | 992 | 1000 |
| Delta vol.(%) at 600° C. | 4.6 | 4.8 | 5 | 4.8 |
| sigma sol. T-r (° C.) | 763 | 705 | 720 | 747 |
| sigma vol.(%) at 600° C. | 7.7 | 4.8 | 6.2 | 6.5 |

TABLE 15c

| | Group 2 | | | | | | |
|---|---|---|---|---|---|---|---|
| Variant | 9 | 28 | 29 | 39 | 46 | 51 | 52 |
| C | 0.021 | 0.021 | 0.021 | 0.021 | 0.021 | 0.021 | 0.021 |
| S | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 |
| Cr | 18 | 18 | 18 | 18 | 18 | 18 | 18 |
| Ni | 50.118 | 46.218 | 46.418 | 49.618 | 49.608 | 49.238 | 48.738 |
| Mn | 0.018 | 0.018 | 0.018 | 0.018 | 0.018 | 0.018 | 0.018 |
| Si | 0.065 | 0.065 | 0.065 | 0.065 | 0.065 | 0.065 | 0.065 |
| Mo | 3 | 3 | 3 | 3 | 3 | 3.5 | 4 |
| Ti | 0.3 | 0.3 | 0.1 | 0.3 | 0.3 | 0.1 | 0.1 |
| Nb | 5.4 | 4.9 | 4.9 | 5.4 | 5.4 | 5 | 5 |
| Ta | 0 | 0 | 0 | 0.5 | 0.01 | 0.5 | 0.5 |
| Cu | 0.01 | 0.01 | 0.01 | 0.01 | 0.01 | 0.01 | 0.01 |
| Fe | 0.43 | 0.43 | 0.43 | 0.43 | 0.43 | 0.43 | 0.43 |
| P | 0.011 | 0.011 | 0.011 | 0.011 | 0.011 | 0.011 | 0.011 |
| Al | 2.6 | 2.5 | 2.5 | 2.6 | 2.6 | 2.6 | 2.6 |
| Mg | 0.0008 | 0.0008 | 0.0008 | 0.0008 | 0.0008 | 0.0008 | 0.0008 |
| Ca | 0.004 | 0.004 | 0.004 | 0.004 | 0.004 | 0.004 | 0.004 |
| V | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 |
| W | 0.02 | 0.02 | 0.02 | 0.02 | 0.02 | 0.5 | 0.5 |
| Co | 20 | 24.5 | 24.5 | 20 | 20 | 20 | 20 |
| Hf | 0 | 0 | 0 | 0 | 0.5 | 0 | 0 |
| B | 0.004 | 0.004 | 0.004 | 0.004 | 0.004 | 0.004 | 0.004 |
| O | 0.002 | 0.002 | 0.002 | 0.002 | 0.002 | 0.002 | 0.002 |

TABLE 15b

| | Group 2 | | | | | | |
|---|---|---|---|---|---|---|---|
| Variant | 9 | 28 | 29 | 39 | 46 | 51 | 52 |
| γ' sol. T-r (° C.) | 1040 | 1032 | 1015 | 1044 | 1045 | 1027 | 1026 |
| γ' vol. (%) at 600° C. | 35 | 33.4 | 32 | 35 | 35 | 34.2 | 34.4 |
| eta sol. T-r (° C.) | 0 | 0 | 0 | 0 | 0 | 0 | 0 |
| eta max. vol. (%) | 0 | 0 | 0 | 0 | 0 | 0 | 0 |
| eta sol. T-r (° C.) | 0 | 0 | 0 | 0 | 0 | 0 | 0 |
| Delta sol. T-r (° C.) | 960 | 930 | 952 | 972 | 968 | 936 | 930 |
| Delta vol.(%) at 600° C. | 2.4 | 1.6 | 1.9 | 2.7 | 2.3 | 1.9 | 1.6 |
| sigma sol. T-r (° C.) | 799 | 791 | 772 | 818 | 819 | 823 | 850 |
| sigma vol.(%) at 600° C. | 10 | 9.4 | 8.4 | 11 | 11.7 | 10 | 10.5 |

TABLE 16a

| | Group 3 | | | |
|---|---|---|---|---|
| Variant | 38 | 40 | 41 | 53 |
| C | 0.021 | 0.021 | 0.021 | 0.021 |
| S | 0.0005 | 0.0005 | 0.0005 | 0.0005 |
| N | 0.008 | 0.008 | 0.008 | 0.008 |
| Cr | 18 | 18 | 18 | 18 |
| Ni | 51.508 | 51.018 | 50.518 | 49.218 |
| Mn | 0.018 | 0.018 | 0.018 | 0.018 |
| Si | 0.065 | 0.065 | 0.065 | 0.065 |
| Mo | 3 | 3 | 3 | 4 |
| Ti | 0.3 | 0.3 | 0.3 | 0.1 |
| Nb | 4 | 4 | 4 | 4.5 |
| Ta | 0.01 | 0.5 | 1 | 0.5 |
| Cu | 0.01 | 0.01 | 0.01 | 0.01 |
| Fe | 0.43 | 0.43 | 0.43 | 0.43 |
| P | 0.011 | 0.011 | 0.011 | 0.011 |
| Al | 2.6 | 2.6 | 2.6 | 2.6 |
| Mg | 0.0008 | 0.0008 | 0.0008 | 0.0008 |
| Ca | 0.004 | 0.004 | 0.004 | 0.004 |
| V | 0.002 | 0.002 | 0.002 | 0.002 |
| Zr | 0.002 | 0.002 | 0.002 | 0.002 |
| W | 0.02 | 0.02 | 0.02 | 0.5 |
| Co | 20 | 20 | 20 | 20 |
| Hf | 0 | 0 | 0 | 0 |
| B | 0.004 | 0.004 | 0.004 | 0.004 |
| O | 0.002 | 0.002 | 0.002 | 0.002 |

TABLE 16b

| | Group 3 | | | |
|---|---|---|---|---|
| Variant | 38 | 40 | 41 | 53 |
| γ' sol. T-r (° C.) | 1022 | 1030 | 1037 | 1020 |
| γ' vol. (%) at 600° C. | 33 | 33.7 | 34.6 | 34.4 |
| eta sol. T-r (° C.) | 0 | 0 | 0 | 0 |
| eta max. vol. (%) | 0 | 0 | 0 | 0 |
| eta sol. T-r (° C.) | 0 | 0 | 0 | 0 |
| Delta sol. T-r (° C.) | 0 | 0 | 0 | 0 |
| Delta vol.(%) at 600° C. | 0 | 0 | 0 | 0 |
| sigma sol. T-r (° C.) | 719 | 744 | 762 | 829 |
| sigma vol.(%) at 600° C. | 5.3 | 6.5 | 7.4 | 8.8 |

TABLE 17a

| | Group 4 | | | | | | |
|---|---|---|---|---|---|---|---|
| Variant | 43 | 44 | 45 | 47 | 48 | 50 | 57 |
| C | 0.021 | 0.021 | 0.021 | 0.021 | 0.021 | 0.021 | 0.018 |
| S | 0.0005 | 0.0005 | 0.0005 | 0.0005 | 0.0005 | 0.0005 | 0.0005 |
| N | 0.008 | 0.008 | 0.008 | 0.008 | 0.008 | 0.008 | 0.008 |
| Cr | 18 | 18 | 18 | 18 | 18 | 18 | 18 |
| Ni | 49.628 | 49.128 | 48.128 | 49.108 | 48.108 | 49.038 | 49.518 |
| Mn | 0.018 | 0.018 | 0.018 | 0.018 | 0.018 | 0.018 | 0.018 |
| Si | 0.065 | 0.065 | 0.065 | 0.065 | 0.065 | 0.065 | 0.065 |
| Mo | 3 | 3 | 3 | 3 | 3 | 3.5 | 3 |
| Ti | 0.3 | 0.3 | 0.3 | 0.3 | 0.3 | 0.3 | 0.1 |
| Nb | 5.4 | 5.4 | 5.4 | 5.4 | 5.4 | 5 | 5 |
| Ta | 0.01 | 0.01 | 0.01 | 0.01 | 0.01 | 0.5 | 1 |
| Cu | 0.01 | 0.01 | 0.01 | 0.01 | 0.01 | 0.01 | 0.01 |
| Fe | 0.43 | 0.43 | 0.43 | 0.43 | 0.43 | 0.43 | 0.43 |
| P | 0.011 | 0.011 | 0.011 | 0.011 | 0.011 | 0.011 | 0.011 |
| Al | 2.6 | 2.6 | 2.6 | 2.6 | 2.6 | 2.6 | 2.8 |
| Mg | 0.0008 | 0.0008 | 0.0008 | 0.0008 | 0.0008 | 0.0008 | 0.0008 |
| Ca | 0.004 | 0.004 | 0.004 | 0.004 | 0.004 | 0.004 | 0.004 |
| V | 0.002 | 0.002 | 0.002 | 0.002 | 0.002 | 0.002 | 0.002 |
| Zr | 0.002 | 0.002 | 0.002 | 0.002 | 0.002 | 0.002 | 0.002 |
| W | 0.5 | 1 | 2 | 0.02 | 0.02 | 0.5 | 0.02 |
| Co | 20 | 20 | 20 | 20 | 20 | 20 | 20 |

TABLE 17a-continued

| | | | Group 4 | | | | |
|---|---|---|---|---|---|---|---|
| Variant | 43 | 44 | 45 | 47 | 48 | 50 | 57 |
| Hf | 0 | 0 | 0 | 1 | 2 | 0 | 0 |
| B | 0.004 | 0.004 | 0.004 | 0.004 | 0.004 | 0.004 | 0.004 |
| O | 0.002 | 0.002 | 0.002 | 0.002 | 0.002 | 0.002 | 0.002 |

TABLE 17b

| | | | Group 4 | | | | |
|---|---|---|---|---|---|---|---|
| Variant | 43 | 44 | 45 | 47 | 48 | 50 | 57 |
| γ' sol. T-r (° C.) | 1038 | 1039 | 1039 | 1048 | 1060 | 1040 | 1046 |
| γ' vol. (%) at 600° C. | 35.1 | 35.3 | 35.8 | 36 | 36 | 36 | 37.5 |
| eta sol. T-r (° C.) | 0 | 0 | 0 | 0 | 0 | 0 | 0 |
| eta max. vol. | 0 | 0 | 0 | 0 | 0 | 0 | 0 |
| eta sol. T-r (° C.) | 0 | 0 | 0 | 0 | 0 | 0 | 0 |
| Delta sol. T-r (° C.) | 958 | 956 | 950 | 968 | 964 | 916 | 888 |
| Delta vol.(%) at 600° C. | 2.3 | 2.6 | 2.5 | 2.3 | 2.3 | 1.6 | 0.75 |
| sigma sol. T-r (° C.) | 816 | 826 | 852 | 838 | 875 | 840 | 824 |
| sigma vol.(%) at 600° C. | 10.6 | 11.7 | 13 | 12.5 | 15 | 10.8 | 12 |

TABLE 18a

| | | Group 5 | |
|---|---|---|---|
| Variant | 42 | 55 | 56 |
| C | 0.021 | 0.018 | 0.018 |
| S | 0.0005 | 0.0005 | 0.0005 |
| N | 0.008 | 0.008 | 0.008 |
| Cr | 18 | 18 | 18 |
| Ni | 49.518 | 49.318 | 49.218 |
| Mn | 0.018 | 0.018 | 0.018 |
| Si | 0.065 | 0.065 | 0.065 |
| Mo | 3 | 3 | 3 |
| Ti | 0.3 | 0.1 | 0.1 |
| Nb | 4 | 5 | 5 |
| Ta | 2 | 1 | 1 |
| Cu | 0.01 | 0.01 | 0.01 |
| Fe | 0.43 | 0.43 | 0.43 |
| P | 0.011 | 0.011 | 0.011 |
| Al | 2.6 | 3 | 3.1 |
| Mg | 0.0008 | 0.0008 | 0.0008 |
| Ca | 0.004 | 0.004 | 0.004 |
| V | 0.002 | 0.002 | 0.002 |
| Zr | 0.002 | 0.002 | 0.002 |
| W | 0.02 | 0.02 | 0.02 |
| Co | 20 | 20 | 20 |
| Hf | 0 | 0 | 0 |
| B | 0.004 | 0.004 | 0.004 |
| O | 0.002 | 0.002 | 0.002 |

TABLE 18b

| | | Group 5 | |
|---|---|---|---|
| Variant | 42 | 55 | 56 |
| γ' sol. T-r (° C.) | 1045 | 1058 | 1064 |
| γ' vol. (%) at 600° C. | 36.5 | 40.2 | 41 |
| eta sol. T-r (° C.) | 0 | 0 | 0 |
| eta max. vol. (%) | 0 | 0 | 0 |
| eta sol. T-r (° C.) | 0 | 0 | 0 |
| Delta sol. T-r (° C.) | 0 | 0 | 0 |
| Delta vol.(%) at 600° C. | 0 | 0 | 0 |
| sigma sol. T-r (° C.) | 798 | 846 | 860 |
| sigma vol.(%) at 600° C. | 10 | 13.4 | 13.7 |

In comparison with VDM Alloy 780 powder, the powder alloy according to the invention has an improved processability and microstructural stability, provided the requirements and criteria below are fulfilled:

Al 1.8-2.4 wt %
Co 15-23 wt %

Due to an optimized composition of VDM Alloy 780 HT powder, the powder alloy according to the invention is suitable for the application at higher temperatures in comparison with VDM Alloy 780 standard powder. This alloy has higher γ' volume fractions, albeit limited to 35%. Low fractions of delta phase are present in the temperature range between 800° C. and 900° C. The alloy has a particularly good combination between processability and low cycle fatigue at higher temperatures. The following requirements and criteria are to be fulfilled.

Al 2.3-2.8 wt %
Co 19-25 wt %
Nb 4.5-5.5 wt %
Mo 3.0-5.0 wt %

Due to an optimized composition of VDM Alloy 780 HT powder, the powder alloy according to the invention is suitable for the application at higher temperatures in comparison with VDM Alloy 780 standard powder. This alloy has higher γ' volume fractions, albeit limited to 35%. Low fractions of delta phase are present in the temperature range between 800° C. and 900° C. This alloy likewise has a particularly good combination between processability and low cycle fatigue at higher temperatures. The following requirements and criteria are to be fulfilled.

Al 2.4-3.0 wt %
Co 18-22 wt %
Nb 3.5-5.0 wt %

Due to an optimized composition of VDM Alloy 780 HT powder, the powder alloy according to the invention is suitable for the application at higher temperatures in comparison with VDM Alloy 780 standard powder. This alloy has higher γ' volume fractions, albeit limited to 35%. Low fractions of delta phase are present in the temperature range between 800° C. and 900° C. This alloy also has a particularly good combination between processability and low cycle fatigue at higher temperatures. The following requirements and criteria are to be fulfilled.

Al 2.4-3.0 wt %
Co 18-22 wt %
Nb 4.5-6.0 wt %

Due to an optimized composition of VDM Alloy 780 HT powder, the powder alloy according to the invention is suitable for the application at higher temperatures in comparison with VDM Alloy 780 standard powder. This alloy has higher γ' volume fractions, albeit limited to 35%. Low fractions of delta phase are present in the temperature range between 800° C. and 900° C. The alloy has a particularly good combination between processability and low cycle fatigue at higher temperatures. The following requirements and criteria are to be fulfilled.

Al 2.4-3.3 wt %
Co 18-22 wt %
Nb 3.8-6.0 wt %
Ta 0.5-2.5 wt %

Due to an optimized composition of VDM Alloy 780 HT powder, the powder alloy according to the invention is suitable for the application at higher temperatures in comparison with VDM Alloy 780 standard powder. This alloy has higher γ' volume fractions. The alloy has a particularly good combination between processability and high mechanical strength at higher temperatures. The following requirements and criteria are to be fulfilled.

Al 2.4-4 wt %
Co 12-35 wt %
Nb 3.8-6.0 wt %
Ti 0-1 wt %

Due to an optimized composition of VDM Alloy 780 HT powder, the powder alloy according to the invention is suitable for the application at higher temperatures in comparison with VDM Alloy 780 standard powder. This alloy has higher γ' volume fractions. The alloy has a particularly good combination between processability and high mechanical strength at higher temperatures. The following requirements and criteria are to be fulfilled.

Al 2.4-3.2 wt %
Co 12-35 wt %
Nb 3.8-6.0 wt %
Ti 0.5-3.0 wt %

The described powder alloys of Alloy 780 HT according to the invention achieve a strength level equal to or significantly higher than the Alloy 780 that has been the standard reference analysis heretofore, as is observed in test-temperature-dependent values of the offset yield strength Rp0.2. In particular, the steep decrease of the offset yield strength Rp0.2 is shifted to higher test temperatures in alloys that have a higher gamma' solvus temperature (e.g. alloys with Al contents significantly higher than 2.2%). This is interesting in particular for a possible higher application temperature of a structural part.

Within a defined chemical composition, several parameters have an influence on the level of the test-temperature-dependent mechanical strength:

The annealing temperature and the annealing duration of the precipitation heat treatment and even already the cooling rate after the solution heat treatment influence both the fraction and the particle size of the gamma' phase. These variables in combination influence in turn the level of the test-temperature-dependent strength.

The grain size of the microstructure influences the level of the test-temperature-dependent strength. The microstructure and especially the grain size are influenced by, among other factors, the annealing temperature and annealing duration of the solution heat treatment.

The invention claimed is:

1. A method for the manufacture of a powder from a nickel-cobalt alloy, wherein the contents (in wt %) are defined as follows:

C>0-max. 0.1%
S max. 0.015%
Cr 13-23%
Ni the rest (>30%)
Mn max. 1.0%
Si max. 1.0%
Mo 1-6%
Ti>0-3.0%
Nb+Ta 3-8%
Cu max. 0.5%
Fe>0-max. 10%
Al>0-<4.0%
V up to 4%
Zr>0-max. 0.1%
Co>12-<35%
W up to 4%
Hf up to 3.0%
O max. 0.1%
N>0-max. 0.1%
Mg>0-max. 0.01%
B>0-max. 0.02%
P>0-max. 0.03%
Ar 0-max. 0.08%
Se max. 0.0005%
Bi max. 0.00005%
Pb max. 0.002% in which
an alloy is smelted in a VIM furnace,
the molten melt is maintained for 5 minutes to 2 hours for homogenization,
a closed atomization system having a supplied gas is adjusted to a dew point of −10° C. to −120° C.,
the melt is blown by a nozzle in a gas stream with a gas flow rate of 2 m$^3$/min to 150 m$^3$/min,
the solidified powder particles are collected in a gas-tight closed container, wherein
the particles have a particle size of 5 μm to 250 μm,
the particles of the powder are spherical,
the powder has gas inclusions of 0.0 to 4% pore area (pores >1 μm) in relationship to the total area of evaluated objects,
the powder has a bulk density of 2 up to the density of the alloy, which is approximately 8 g/cm$^3$,
the powder is packed air-tightly under a protective-gas atmosphere with argon.

2. The method according to claim 1, wherein the alloy has contents (in wt %) that are defined as follows:
Fe>0-max. 5%
Co>15-<27%
Cr 16-22%
Mo 2-6%
W up to 4%
Hf up to 2.5%
Nb+Ta 3.5-7.5%
Al 1.6-3.5%
Mn max. 0.6%
Ti 0.0005-<2%, especially <1.0%
Si 0.0005-0.4%
C>0-max. 0.05%
P>0-max. 0.025%
N>0-max. 0.1%
Mg>0-max. 0.008%
B>0-max. 0.02%
Zr>0-max. 0.1%
Ar max. 0.05%
Ni Rest (>30%).

3. The method according to claim 1, wherein requirements and criteria listed in the following are to be fulfilled in the alloy:
Mo+W≥2.5
0.0005<B+Zr+P<0.15
S+Se+Bi+Pb<0.1
900° C.<γ' solvus<1130° C.
20%<γ' volume fraction<45% in the precipitation-annealed condition.

4. The method according to claim 1, wherein the alloy has contents (in wt %): Al 1.8-2.4; Co 15-23.

5. The method according to claim 1, wherein the alloy has contents (in wt %): Al 2.3-2.8; Co 19-25, Nb 4.5-5.5; Mo 3.0-5.0.

6. The method according to claim 1, wherein the alloy has contents (in wt %): Al 2.4-3.0; Co 18-22; Nb 3.5-5.0.

7. The method according to claim 1, wherein the alloy has contents (in wt %): Al 2.4-3.0; Co 18-22, Nb 4.5-6.0.

8. The method according to claim 1, wherein the alloy has contents (in wt %): Al 2.4-3.3; Co 18-22, Nb 3.8-6.0; Ta 0.5-2.5.

9. The method according to claim 1, wherein
the alloy is first generated as a master alloy ingot having defined chemical analysis by melting in the VIM furnace, VIM/ESR, VIM/ESR/VAR, VIM/VAR, VOD or VLF then remelting in the ESR and/or VAR if necessary,
the master alloy ingot is cut into small pieces by sawing, the pieces of the master alloy are melted in a VIM furnace.

10. The method according to claim 1, wherein the supplied gas is an inert gas.

11. The method according to claim 1, wherein the supplied gas is argon.

12. The method according to claim 1, wherein the gas stream in which atomization takes place is argon.

13. The method according to claim 1, wherein the gas stream in which atomization takes place is nitrogen.

14. The method according to claim 1, wherein the gas stream in which atomization takes place is a mixture of nitrogen and argon.

15. The method according to claim 1, wherein the atomization takes place at 0.5 to 80 kg/min.

16. The method according to claim 1, with stress-relief annealings, to be performed on structural parts printed therefrom, between 300° C. and 600° C. for annealing durations of 0.5 h to 10 h and solution annealing temperatures between 850° C. and 1250° C. for annealing durations between 30 minutes and 30 hours and one-stage or two-stage precipitation heat treatments at annealing temperatures in the range between 600° C. and 900° C. and annealing durations in the range of 1 to 30 hours, in order to adjust defined grain sizes of 0.5 μm-2000 μm, fractions (>25%) and particle sizes (10-300 nm) of the gamma' phase and mechanical strength properties.

* * * * *

UNITED STATES PATENT AND TRADEMARK OFFICE
CERTIFICATE OF CORRECTION

PATENT NO. : 11,807,916 B2  
APPLICATION NO. : 17/606820  
DATED : November 7, 2023  
INVENTOR(S) : Bodo Gehrmann et al.

Page 1 of 1

It is certified that error appears in the above-identified patent and that said Letters Patent is hereby corrected as shown below:

In the Claims

In Claim 2, Line 12 (Column 73, Line 12): please delete ", especially <1.0%"

Signed and Sealed this  
Fifth Day of December, 2023

Katherine Kelly Vidal  
*Director of the United States Patent and Trademark Office*